(12) United States Patent
Chua et al.

(10) Patent No.: US 7,904,192 B2
(45) Date of Patent: Mar. 8, 2011

(54) FINITE CAPACITY SCHEDULING USING JOB PRIORITIZATION AND MACHINE SELECTION

(75) Inventors: Tay Jin Chua, Singapore (SG); Xiaofeng Yin, Singapore (SG); Juping Zhu, Singapore (SG); Tianxiang Cai, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 1721 days.

(21) Appl. No.: 10/758,468

(22) Filed: Jan. 14, 2004

(65) Prior Publication Data

US 2005/0154625 A1 Jul. 14, 2005

(51) Int. Cl.
- *G06F 19/00* (2006.01)
- *G06F 17/00* (2006.01)
- *G06F 9/46* (2006.01)
- *G06Q 10/00* (2006.01)
- *G05B 19/418* (2006.01)

(52) U.S. Cl. ............ 700/100; 700/90; 700/99; 700/101; 705/1.1; 705/8

(58) Field of Classification Search .................... 700/90, 700/99, 100, 101
See application file for complete search history.

(56) References Cited

U.S. PATENT DOCUMENTS

| 4,896,269 A | 1/1990 | Tong |
| 5,093,794 A * | 3/1992 | Howie et al. .................. 700/100 |
| 5,099,431 A | 3/1992 | Natarajan |
| 5,148,370 A | 9/1992 | Litt et al. |
| 5,177,688 A | 1/1993 | Rentschler et al. |
| 5,212,791 A | 5/1993 | Damian et al. |
| 5,229,948 A | 7/1993 | Wei et al. |
| 5,233,533 A | 8/1993 | Edstrom et al. |
| 5,237,497 A | 8/1993 | Sitarski |
| 5,319,781 A | 6/1994 | Syswerda |
| 5,369,570 A | 11/1994 | Parad |
| 5,432,887 A | 7/1995 | Khaw |

(Continued)

FOREIGN PATENT DOCUMENTS

DE 4400031 7/1994

(Continued)

OTHER PUBLICATIONS

Proceeding of the 1999 IEEE International Symposium on Assembly and Task Planning, Porto, Portugal Jul. 1999, pp. 424-429.

(Continued)

*Primary Examiner* — Albert Decady
*Assistant Examiner* — Sunray R Chang
(74) *Attorney, Agent, or Firm* — Klarquist Sparkman, LLP

(57) ABSTRACT

In a method, device, and computer-readable medium for finite capacity scheduling, heuristic rules are applied in two integrated stages: Job Prioritization and Machine Selection. During Job Prioritization ("JP"), jobs are prioritized based on a set of JP rules which are machine independent. During Machine Selection ("MS"), jobs are scheduled for execution at machines that are deemed to be best suited based on a set of MS rules. The two-stage approach allows scheduling goals to be achieved for performance measures relating to both jobs and machines. For example, machine utilization may be improved while product cycle time objectives are still met. Two user-configurable options, namely scheduling model (job shop or flow shop) and scheduling methodology (forward, backward, or bottleneck), govern the scheduling process. A memory may store a three-dimensional linked list data structure for use in scheduling work orders for execution at machines assigned to work centers.

14 Claims, 32 Drawing Sheets

U.S. PATENT DOCUMENTS

| | | | |
|---|---|---|---|
| 5,444,632 | A | 8/1995 | Kline et al. |
| 5,524,077 | A | 6/1996 | Faaland et al. |
| 5,546,326 | A | 8/1996 | Tai et al. |
| 5,574,640 | A | 11/1996 | Sycara et al. |
| 5,623,404 | A | 4/1997 | Collins et al. |
| 5,630,070 | A | 5/1997 | Dietrich et al. |
| 5,671,361 | A | 9/1997 | Brown et al. |
| 5,721,686 | A * | 2/1998 | Shahraray et al. ............ 700/102 |
| 5,787,000 | A | 7/1998 | Lilly et al. |
| 5,826,236 | A | 10/1998 | Narimatsu et al. |
| 5,841,677 | A | 11/1998 | Yang et al. |
| 5,848,403 | A | 12/1998 | Gabriner et al. |
| 5,983,195 | A | 11/1999 | Fierro |
| 6,086,617 | A | 7/2000 | Waldon et al. |
| 6,092,000 | A | 7/2000 | Kuo et al. |
| 6,131,093 | A | 10/2000 | Maruyama et al. |
| 6,236,976 | B1 | 5/2001 | Ginsberg et al. |
| 6,266,655 | B1 | 7/2001 | Kalyan |
| 6,341,240 | B1 * | 1/2002 | Bermon et al. ................. 700/97 |
| 7,076,317 | B2 * | 7/2006 | Yamate et al. ................ 700/121 |
| 2003/0126023 | A1 * | 7/2003 | Crampton et al. ............. 705/22 |
| 2004/0199281 | A1 * | 10/2004 | Yamate et al. ................ 700/121 |

FOREIGN PATENT DOCUMENTS

| | | |
|---|---|---|
| EP | 0425405 | 5/1991 |
| EP | 1111858 | 6/2001 |
| WO | WO 0028451 | 5/2000 |

OTHER PUBLICATIONS

Proceeding of the 1999 IEEE International Symposium on Assembly and Task Planning, Porto, Portugal Jul. 1999, pp. 417-423.

Production Planning and Control, vol. 13 Issue: 4, 2002, pp. 401-406.

Production Planning and Control, vol. 9 Issue: 3, 1998, pp. 250-259.

International Journal of Production Research, vol. 35 Issue: 6, 1997, pp. 1575-1591.

International Journal of Advanced Manufacturing Technology, vol. 16 Issue: 12, 2000, pp. 902-908.

International Journal of Flexible Manufacturing Systems, vol. 13 Issue: 3, 2001, pp. 287-308.

International Journal of Flexible Manufacturing Systems, vol. 13 Issue: 1, 2001, pp. 71-88.

Computers and Industrial Engineering, vol. 44 Issue: 1, 2002, pp. 119-131.

International Journal of Production Economics, vol. 48 1997, pp. 87-105.

International Journal of Production Research, vol. 37 No. 16 1999, pp. 3823-3837.

International Journal of Production Research, vol. 35 No. 1 1997, pp. 281-309.

Computer and Industrial Engineering, vol. 33 Issue 1-2, pp. (2) 249-252, 1997.

International Journal of Production Economics, vol. 49 1997, pp. 225-335.

IEEE Transactions on Robotics and Automation, ETFA, vol. 2 Apr. 1998, pp. 303-313.

IIE Transactions (Institute of Industrial Engineers), vol. 32, issue 9, Sep. 2000, pp. 807-818.

Computer and Industrial Engineering, vol. 35, issue 1-2, Oct. 1998, pp. 113-116.

IEEE Symposium on Emerging Technologies and Factory Automation, ETFA, vol. 2, 2001, Page(s): 637-640.

Computer and Industrial Engineering, vol. 39 2001, pp. 307-324.

Industrial Engineering of Chemical Research, vol. 36 1997, pp. 1717-1726.

International Journal of Production Economics, vol. 51 1997, pp. 165-176.

IEEE Transactions of Evolutionary Computation, vol. 1 Issue 4, Nov. 1997, pp. 278-289.

International Journal of Production Research, vol. 37, Issue 1, 1999, pp. 111-123.

Journal of Operational Research Society, v 53, n 12, Dec. 2002, p. 1374-1379.

Computers and Industrial Engineering, vol. 44, issue 1, Jan. 2002, pp. 119-113.

IEEE International Performance, Computing and Communications Conference, Proceedings, 1998, pp. 15-22, CODEN 002588.

International Journal of Flexible Manufacturing Systems, vol. 13, issue 3, Jun. 2001, pp. 287-308.

European Journal of Operational Research, v 112, n 1, Jan. 1, 1999, p. 167-173.

* cited by examiner

| SCHEDULE BY MACHINE | | | | |
|---|---|---|---|---|
| USER ID: SSOP | START TIME: 24/10/2002 14:00 | | | |
| WOTS: 1920 | END TIME: 26/10/2002 24:00 | | | |
| OPERATION: WIREBOND | | | | |
| MACHINE | WO_# | QUANTITY | START TIME | END TIME |
| WBEE002 | W200243028200 | 3,840 | 24/10/2002 13:39 | 26/10/2002 02:43 |
| | W200243028210 | 1,793 | 26/10/2002 02:43 | 26/10/2002 06:30 |
| WBEE003 | W200243028203 | 2,000 | 25/10/2002 07:46 | 25/10/2002 20:01 |
| | CHANGEOVER | | 25/10/2002 20:01 | 26/10/2002 21:31 |
| | W200243028205 | 1,409 | 25/10/2002 21:31 | 26/10/2002 06:30 |
| OPERATION: DIEATTACH | | | | |
| DA05 | W200243028201 | 4,200 | 24/10/2002 13:59 | 25/10/2002 14:05 |
| | CHANGEOVER | | 25/10/2002 14:05 | 25/10/2002 16:20 |
| | W200243028202 | 1,200 | 25/10/2002 16:20 | 26/10/2002 20:30 |
| DA07 | W200243028204 | 2,000 | 24/10/2002 12:00 | 26/10/2002 20:01 |
| | W200243028206 | 3,500 | 24/10/2002 20:01 | 24/10/2002 20:01 |
| | CHANGEOVER | | | 26/10/2002 12:30 |

FIG. 7

⊠ = UNAVAILABLE TIME BLOCKS SUCH AS MEAL BLOCK, HOLIDAY, MACHINE DOWN, etc.

INITIAL STATUS:

CALCULATION:

ASSIGNMENT:

▨▨▨ = UNAVAILABLE TIME BLOCKS SUCH AS MEAL
BLOCK, HOLIDAY, MACHINE DOWN, etc.

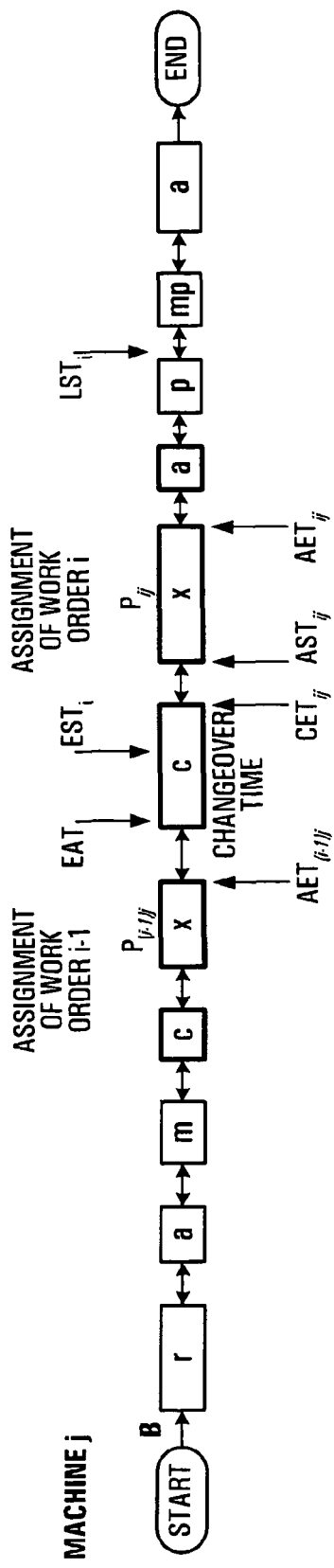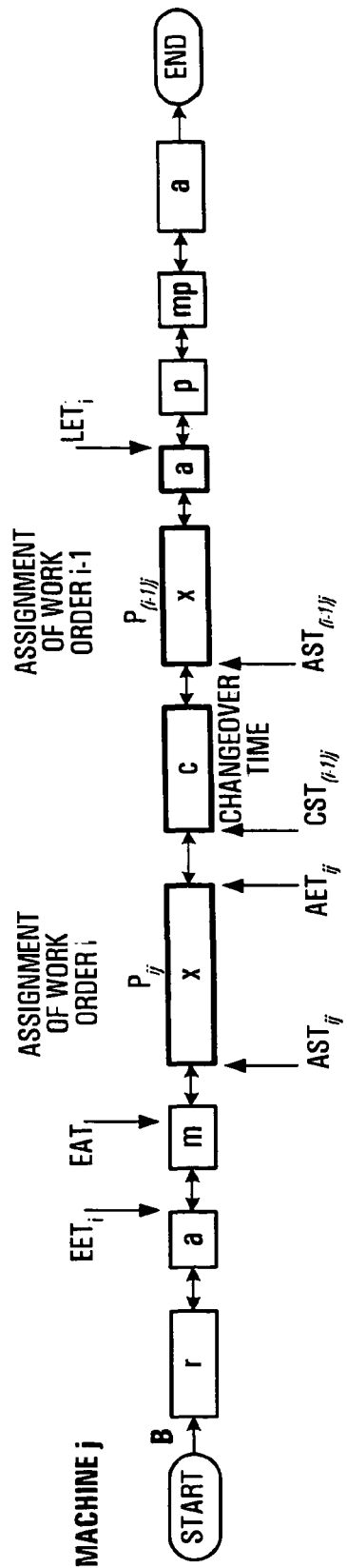
FIG. 22A
FIG. 22B $$D1 = AET_{M1} - AET_{M2}$$
$$D2 = AET_{M2} - AET_{M3}$$

FINITE CAPACITY SCHEDULING USING JOB PRIORITIZATION AND MACHINE SELECTION

FIELD OF THE INVENTION

This invention generally relates to a finite capacity scheduling and more specifically to finite capacity scheduling using job prioritization and machine selection.

BACKGROUND OF THE INVENTION

Scheduling involves the determination of a sequence of operations to satisfy a set of conditions and a set of goals concurrently. It is a process where limited resources, such as machines, material and tooling, are allocated over a period of time ("the scheduling horizon") among both parallel and sequential activities. Frequently, a scheduling task must account for conflicting objectives, multiple constraints, different configurations of shop floors, various simultaneous orders, renewable and non-renewable resources and so on. In many cases, the combination of multiple goals and constraints results in an exponentially growing search space. Such problems are known as NP-hard problems (French 1982, Cleveland and Smith 1989), which cannot be solved by deterministic methods within polynomial time.

In a typical scheduling task, a set of work orders is scheduled across a set of work centers. As is known in the art, a work order (also referred to as a "job" or a "lot") describes a set of operations that is to be performed to generate a product which may consist of a number of individual items. A work order typically includes a due date (i.e. a time by which completion of the work order is needed). A work center is a set of one or more machines on which a particular operation can be completed. A work center contains various machines having similar capabilities (e.g. in a semiconductor backend assembly environment, a "Wire Bond" work center may contain multiple wire bonders which come from different equipment manufacturers, yet they are all generally capable of completing the "wire bonding" operation). The relationship between work centers and operations can be one-to-one (e.g. as in the "Wire Bond" work centre for example) or one-to-many (e.g. in a typical precision machining job shop environment, a group of Computerized Numerical Control (CNC) machines may be considered as a "CNC Center" that is able to performing turning, milling, drilling, etc. operations.

Scheduling theory has received considerable attention from academic researchers, practitioners, management scientists, production and operation research workers and mathematicians since the early 1950s, such as those by Muth and Thompson (1963) and French (1982). Numerous approaches, such as operations research based techniques (Vairaktarakis and Elhafsi 2000, Hillier and Brandeau 2001, Mokotoff 2001), simulation-based and artificial intelligence (AI) based approaches (Murata et al. 1996, Kouiss et al. 1997, Khoo et al. 2001) have been suggested for solving scheduling problems or even the large-scale scheduling problems.

Due to the increasing competition and rising manufacturing costs, manufacturers must be more responsive to market conditions and customer requirements by employing new technologies, such as Finite Capacity Scheduling (FCS), in order to produce the desired quality and quantity of goods of the lowest cost at the right time. In recent years, FCS techniques have been adopted by a significant number of manufacturing firms.

Due to computational considerations, scheduling models are usually overly simplified. Within the scope of rigid simplifying assumptions, most scheduling models fail to provide practical implementable solutions for industry. Most of the mathematical models fail to incorporate decision-making based on the heuristics (i.e. the application of experience-derived knowledge to a problem). Some AI based methods are time-consuming in both phases of development and computation, and lack explanation capabilities, which are vital for the end user to understand the results. These models fail to account for the fact that a real manufacturing system is much more complex than a general job shop system, possibly having a stochastic environment, frequently varying virtual layout, dynamically changing states, multiple process plans, and other uncertainties. Often the static set of assumptions and input for those simplified models fail to consider such aspects of scheduling.

For these reasons, dispatching rules, such as shortest processing time, earliest due date, first in first out and least remaining slack time, have been applied to scheduling problems (Russell et al. 1987, Kutanoglu and Sabuncuoglu 1999). These procedures are designed to provide solutions to complex problems in real time.

Various performance measures pertaining to different factors, such as the time a job spends in the shop, performance relative to due date, utilization of production resources, and so on, have been identified to evaluate schedules. In most cases, the choice of a schedule is a trade-off among different performance measures. Some of the typical performance measures are:

Flow time: the amount of time a job spends from the moment it is ready until its completion;

Makespan: the amount of time for all jobs to complete processing;

Lateness: the amount of time a job is past its due date;

Earliness: the amount of time by which a job predates its due date;

Tardiness: equals lateness if the job is late, or zero if the job is early or on time;

Average Work in Progress (WIP) level: the mean value of the WIP. A higher WIP level means that more money is tied up in inventory; and Machine utilization: the fraction of available time spent processing jobs versus being idle.

Three scheduling procedures, namely, order-based scheduling, event-based scheduling (Taylor 2001) and resource-based scheduling (Plenert and Kirchmier 2000), are often employed.

In order-based scheduling (also known as "job-based scheduling", "blocked-time approach" or "horizontal loading"), orders are scheduled through all work centers based on priority: the job with highest priority is scheduled through all work centers first, then the job with the second highest priority is scheduled through all work centers, and so on, until all jobs have been scheduled. If a lower priority job can be scheduled ahead of a higher priority job at a particular machine without delaying the scheduled start time of the higher priority job, this is permitted.

The order-based scheduling technique works well in environments in which the capacity utilization is low or some rush jobs need to be assigned in the shortest possible time. However, because order-based scheduling focuses on jobs rather than on machines, it can suffer from excess unused time blocks that could be used to schedule waiting lots. In other words, jobs are put into the schedule in sequence without regard for gaps in the machine schedule. Assuming the technique is applied alone without incorporation of any supplementary procedures, it may result in low machine utilization and lengthy average order throughput times.

Event-based scheduling (also called the "event-driven approach", "simulation-based scheduling" or "vertical loading") works in a manner similar to a discrete-event simulation of a shop floor or a factory, which is shown as operations 50 in FIG. 1. In this approach, each operation to be performed has an associated queue. One or more machines may be capable of completing each operation. At time zero, all the events are initialized and the simulation clock is advanced to the time that the next event occurs. Basically, three types of events are generated in the procedure:

New order released: in response to the event, the new order is added to the queue of the first operation in routing.

Order completed: the order is moved to the next operation queue in routing and the machine which completed processing of the operation is set to idle.

Machine idle: in response to this event, the highest priority order in the queue is selected and processing starts.

The simulation clock is advanced and events are generated and processed until all the orders have been scheduled.

The event-based scheduling technique attempts to keep a machine busy if there is any job in the queue waiting for processing. This technique performs well in terms of the flow time and its variation, mean tardiness and makespan, and in environments in which high resource utilization is the main concern and all orders have similar priorities. However, if a pure event-based scheduling technique is applied, a higher priority order might be blocked by a lower priority order that arrives at the machine a short time earlier. Accordingly, this scheduling technique can only perform a local limited optimization instead of global optimization of the entire manufacturing system.

Resource-based scheduling is a technique that schedules bottleneck resources first to ensure that the utilization of these resources is maximized. The theory of constraints (TOC) is the basis of the technique. TOC can be described as a capacity-oriented system at the constraint and a material-oriented system at non-constraints. It generates schedules for the bottleneck resources over the entire scheduling horizon. All other schedules upstream and downstream from the bottleneck resources are then subordinated to this schedule. Although the conventional TOC approach attempts to maximize the throughput at a constraint by scheduling it first, scheduling of the upstream and downstream operations may not be performed.

What is needed is a scheduling approach which addresses at least some of the above-noted difficulties.

SUMMARY OF THE INVENTION

The present invention provides a method, device, and computer-readable medium for finite capacity scheduling based on heuristic rules. Heuristic rules are applied in two integrated stages: Job Prioritization and Machine Selection. During Job Prioritization ("JP"), jobs are prioritized based on a set of JP rules which are machine independent. During Machine Selection ("MS"), jobs are scheduled for execution at machines that are deemed to be best suited based on a set of MS rules. This two-stage approach allows scheduling goals to be achieved for performance measures relating to both jobs and machines. For example, machine utilization may be improved while product cycle time objectives are still met. Two user-configurable options, namely scheduling model (job shop or flow shop) and scheduling methodology (forward, backward, or bottleneck), govern the scheduling process. A memory may store a three-dimensional linked list data structure for use in scheduling work orders for execution at machines assigned to work centers.

In accordance with an aspect of the present invention there is provided a method of scheduling work orders defined by one or more operations at a plurality of work centers, each work center having a group of machines, each work center for performing an operation, the method comprising: receiving a shop model indication comprising one of a job shop model and a flow shop model; receiving an indication of a methodology comprising one of a forward scheduling methodology, a backward scheduling methodology, and a bottleneck scheduling methodology; and scheduling operations of said work orders based on said receiving a shop model indication and said receiving an indication of a methodology.

In accordance with another aspect of the present invention there is provided a method of scheduling work orders defined by one or more operations at a plurality of work centers, each work center having a group of machines, each work center for performing an operation, the method comprising: (a) classifying each of said work orders as a candidate for scheduling at one of said work centers, said classifying resulting in one or more candidate work orders; (b) assigning a priority to each of said candidate work orders based on a set of job prioritization rules; (c) selecting a highest priority candidate work order having a priority that is at least as high as any priority assigned to any other candidate work order; and (d) attempting to schedule an operation of said highest priority candidate work order at a machine of a work center for which said highest priority work order is a candidate based on a set of machine selection rules.

In accordance with another aspect of the present invention there is provided a method of scheduling work orders at a plurality of work centers, each work order defined by operations following a common sequence, each work center having a group of machines, each work center for performing an operation, the method comprising: (a) selecting one of said work centers based on said set of one or more operations, said selecting resulting in a selected work center; (b) assigning a priority to each of said work orders having an operation associated with the selected work center based on a set of job prioritization rules; (c) identifying a highest priority work order having an assigned priority that is at least as high as any priority assigned to any other work order at the selected work center; and (d) attempting to schedule an operation of said highest priority work order at a machine of said selected work center.

In accordance with another aspect of the present invention there is provided a computer readable medium containing computer-executable instructions which, when performed by a processor in a computing device, cause said computing device to: receive a shop model indication comprising one of a job shop model and a flow shop model; receive an indication of a methodology comprising one of a forward scheduling methodology, a backward scheduling methodology, and a bottleneck scheduling methodology; and schedule operations of said work orders based on said receiving a shop model indication and said receiving an indication of a methodology.

In accordance with another aspect of the present invention there is provided a computer readable medium containing computer-executable instructions which, when performed by a processor in a computing device, cause said computing device to: classify each of a set of work orders as a candidate for scheduling at one of a plurality of work centers to create a set of candidate work orders; assign a priority to each of said candidate work orders based on a set of job prioritization rules; select a highest priority candidate work order having a priority that is at least as high as any priority assigned to any other candidate work order; and attempt to schedule an operation of said highest priority candidate work order at a machine of a work center for which said highest priority work order is a candidate based on a set of machine selection rules.

In accordance with another aspect of the present invention there is provided a computer readable medium containing computer-executable instructions which, when performed by a processor in a computing device, cause said computing device to: select one of a plurality of work centers based on a sequence of operations common to a set of work orders to be scheduled, said selecting resulting in a selected work center; assign a priority to each of said work orders of said set having an operation associated with the selected work center based on a set of job prioritization rules; identify a highest priority work order having an assigned priority that is at least as high as any priority assigned to any other work order of said set at the selected work center; and attempt to schedule an operation of said highest priority work order at a machine of said selected work center.

In accordance with another aspect of the present invention there is provided a computing device comprising a processor and persistent storage memory in communication with said processor storing processor readable instructions for directing said device to: classify each of a set of work orders as a candidate for scheduling at one of a plurality of work centers to create a set of candidate work orders; assign a priority to each of said candidate work orders based on a set of job prioritization rules; select a highest priority candidate work order having a priority that is at least as high as any priority assigned to any other candidate work order; and attempt to schedule an operation of said highest priority candidate work order at a machine of a work center for which said highest priority work order is a candidate based on a set of machine selection rules.

In accordance with another aspect of the present invention there is provided a computing device comprising a processor and persistent storage memory in communication with said processor storing processor readable instructions for directing said device to: select one of a plurality of work centers based on a sequence of operations common to a set of work orders to be scheduled, said selecting resulting in a selected work center; assign a priority to each of said work orders of said set having an operation associated with the selected work center based on a set of job prioritization rules; identify a highest priority work order having an assigned priority that is at least as high as any priority assigned to any other work order of said set at the selected work center; and attempt to schedule an operation of said highest priority work order at a machine of said selected work center.

In accordance with another aspect of the present invention there is provided a method of determining a job prioritization rule and a machine selection rule to be applied during scheduling of work orders, comprising: receiving a scheduling criterion; and mapping said scheduling criterion to said job prioritization rule and said machine selection rule.

In accordance with another aspect of the present invention there is provided a memory storing a three-dimensional linked list data structure for use in scheduling work orders for execution at machines assigned to work centers, comprising: a first linked list having one or more work center nodes, each of said work center nodes being associated with a work center and having a second linked list of one or more machine nodes, each of said machine nodes being associated with a machine of said work center and having a third linked list of one or more time line nodes, each of said time line nodes representing a status of said machine during a time period.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate example embodiments of this invention:

FIG. 7 illustrates an exemplary production schedule which may be generated by the scheduling system of FIG. 2;

FIGS. 22A and 22B illustrate the scheduling of a work order during forward and backward work order scheduling (respectively);

DETAILED DESCRIPTION

Figure 2:
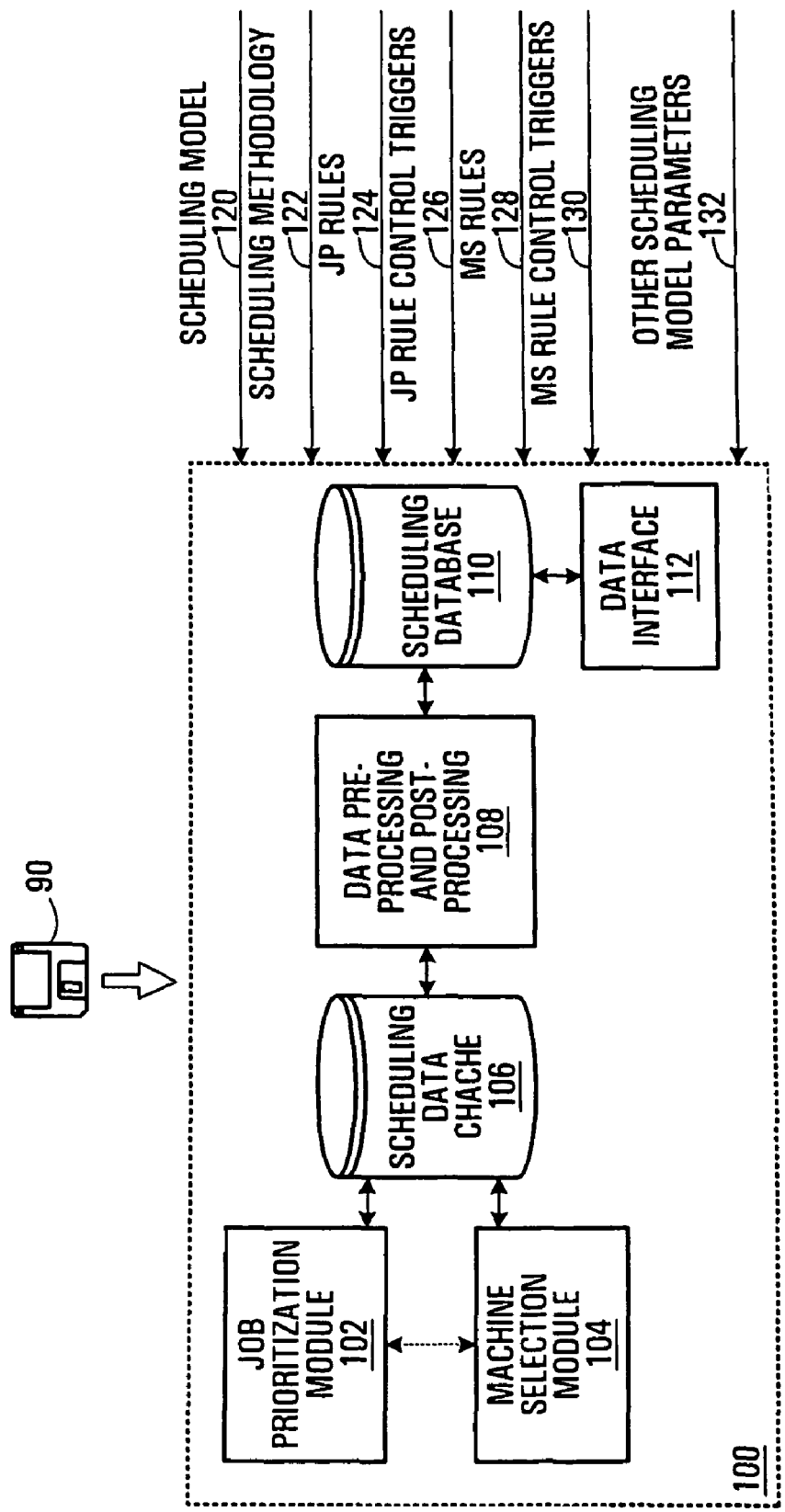
FIG. 2 is a schematic diagram illustrating a scheduling system exemplary of the present invention.

Referring to FIG. 2, a scheduling system 100 exemplary of an embodiment of the present invention is illustrated. The system 100 is capable of receiving information regarding a set of work orders to be scheduled, a set of machines on which the work orders are to be executed, and various operational constraints, and generate therefrom a schedule for each machine which will result in an efficient processing of the work orders. The output may take the form of a production schedule, dispatch list, Gantt chart or scheduling report for example. The system 100 may be a computer or other computing device executing software which implements the scheduling method described herein. The software may be loaded from a computer readable medium, such as a removable magnetic or optical disk 90. The system 100 is sufficiently flexible to generate schedules for a variety of operating environments.

As shown in FIG. 2, scheduling system 100 includes a Job Prioritization (JP) module 102, a Machine Selection (MS) module 104, a scheduling data cache 106, a data pre-processing and post-processing module 108, a scheduling database 110, and a data interface 112.

The Job Prioritization module 102 receives information regarding a set of work orders to be scheduled and prioritizes the work orders at each work center necessary to complete the work order's operations based on a set of job prioritization rules (JP rules). The work orders to be scheduled may entail different operations in different sequences (i.e. they do not all necessarily entail the same operations executed in the same sequence). The JP module repeatedly prioritizes the work orders which remain to be scheduled and invokes the MS module 104 in an attempt to schedule the current highest priority work order. The prioritization performed by the JP module 102 does not account for the capabilities of individual machines.

The Machine Selection (MS) module 104 is responsible for attempting to schedule work orders operations which have been identified by the JP Module 102 as currently having the highest priority. For each work order operation to be scheduled, the machines comprising the appropriate work center are categorized based on the suitability of the machine for completing the operation. Scheduling of the operation is then attempted as the best candidate machine on the basis of a set of Machine Selection rules (MS rules).

The Scheduling Data Cache (SDC) 106 is a cache memory used for storing interim products of the scheduling process carried out by the JP and MS modules 102 and 104. The cache 106 provides improved system performance due to the speed of the cache memory in comparison to slower memories. Notably, the interim products include a 3D linked list containing machine timeline information for each machine under consideration organized by the work center. Cache 106 is also used to store a work order tree structure which is maintained throughout the scheduling process. The information stored within the SDC 106 during a scheduling run is particular to the run and is deleted upon completion of the run.

Data pre-processing and post-processing module 108 performs initial data processing groundwork to prepare the system 100 for a scheduling run as well as post processing of data to finalize generated output.

The data pre-processing performed by the module 108 filters away scheduling data that is not required for the current scheduling run. It also checks data for integrity and checks the scheduling model for consistency to avoid errors during scheduling. The module 108 is further responsible for classifying parts into "changeover groups" based on the amount of time required to configure a machine which may have been processing other types of parts to process the parts. As well, the module 108 determines which of the work centers in the target production environment are necessary in order to process the current set of work orders.

The data post-processing performed by the module 108 includes manipulating the schedules of individual machines to ensure that work orders which have only been partially assigned to a machine are not scheduled.

Scheduling database 110 is a database used to store the scheduling model which governs the scheduling to be performed by the system 100. The model includes various information about the scheduling task, such as the current scheduling horizon, scheduling methodology (forward vs. backward scheduling), the mode of scheduling to be performed (job shop, flow shop or bottleneck), and work center and machine information. Database 110 may be stored in secondary storage (e.g. a hard drive).

Data interface 112 is an interface used by the system 100 to receive data (e.g. work orders to be scheduled, machine and work center information, operational constraints, etc.) and other input (e.g. the triggering of a scheduling run) and to present output (e.g. production schedules) to a user of the system 100. The interface 112 may include an input mechanism such as a keyboard and pointing device and an output mechanism such as a computer monitor displaying a Graphical User Interface (GUI). Alternatively the interface 112 may be a data integration mechanism which facilitates the input/output of data from/to existing systems such as Enterprise Resource Planning (ERP) systems or a Manufacturing Execution System (MES).

Various user-configurable parameters govern the scheduling that is performed by the scheduling system 100. These parameters, which are illustrated in FIG. 2, include:

1. Scheduling Model—the scheduling model parameter 120 is determined by the nature of the work orders to be scheduled and may be either one of a job shop model or flow shop model. In the job shop model, different work orders may involve different operations, possibly in various sequences (variable routing). In the flow shop model, all work orders involve the same operations in the same sequence (fixed routing) with the optional skipping of some operations; in other words, the operations of each work order follow a common or universal sequence. The latter model is commonly used in repetitive manufacturing and cellular production systems. The scheduling model parameter is considered to be a job prioritization configuration option as it has a strong bearing on the operation of the JP Module 102.

2. Scheduling Methodology—the scheduling methodology parameter 122 determines the high-level scheduling methodology to be applied during the scheduling process. Three options exist: forward scheduling, backward scheduling, and bottleneck scheduling. In the forward scheduling methodology, jobs are scheduled forward-chronologically within a scheduling time period. In the backward scheduling methodology, jobs are scheduled reverse-chronologically within the scheduling time period. In the Bottleneck Methodology, a "bottleneck" job is identified and scheduled first, after which the forward and/or backward scheduling methodologies are used with whichever scheduling model is appropriate to schedule the remaining jobs for execution prior to and/or after the bottleneck job. The scheduling methodology parameter is considered to be both a job prioritization configuration option and a machine selection configuration option as it bears on the operation of both the JP Module 102 and the MS module 104.

3. JP Rules—the JP rules parameter 124 defines the rules that are used within the JP module 102 to prioritize jobs. In the present embodiment, one JP rule is fixed and the remainder are optional. The fixed JP rule is the "Meet Due Date" rule. The "Meet Due Date" rule causes the JP module to sort the work orders by ascending Earliest Start Time (EST) for the Forward Scheduling methodology or by descending Latest Start Time (LST) for the Backward Scheduling methodology (regardless of whether a job can be completed by its due date). The remaining, optional JP Rules are described in Appendix I. Optional JP rules may be chosen by a user of the system 100 prior to a scheduling run in order to attempt scheduling based on a desired objective or set of objectives. In the present embodiment, the JP Rules are defined in a hierarchy which specifies a primary JP Rule, a secondary JP Rule, a tertiary JP Rule, etc., down to a chosen hierarchical level. JP rules at the second and higher levels are used progressively during job prioritization in order to break any ties which resulted from the application of the primary JP Rule, in an attempt to ensure that each job can be given a unique priority ranking. At least one JP Rule is required in order for the JP Module 102 to be able to perform job prioritization.

4. JP Rule Control Triggers—the JP rule control triggers parameter 126 is used to adjust the "sensitivity" of the JP Module's application of the various JP rules when assigning priorities to jobs. That is, this parameter sets the granularity of the different priority rankings that may be assigned to jobs by the JP Module 102. Each JP Rule Control Trigger is associated with the application of a corresponding JP Rule. For example, the "Due Date Range Setting" JP Rule Control Trigger is associated with the application of the "Meet Due Date" JP Rule, specifying a range value (for example, 10 hours) for the due date parameter. Based on this JP Rule Control Trigger, work orders will be treated as 'equally urgent' in terms of due date, if the difference among the due dates falls within the range set (i.e. is less than 10 hours). The value of a control trigger is typically related to a real operational constraint in the production environment. As will be appreciated, JP Rule Control Triggers determine when successive hierarchical JP rules may be engaged and generally allow job prioritization to be fine-tuned.

5. MS Rules—the MS rules parameter 128 defines the rules that are used within the MS module 104 to assign jobs to machines. MS Rules may for example seek a best-fit machine in terms of tooling, fixtures, operator, or material. MS Rules may be applied singularly or in combination, but at least one MS Rule should be specified. Various MS Rules are defined in Appendix I.

6. MS Rule Control Triggers—the MS rule control triggers parameter 130 governs the application of the various MS rules by MS module 102 when work orders are scheduled to machines. These parameters may be adjusted to fine-tune the MS rules in an attempt to improve the schedule generated by the scheduling system 100. MS Rule Control Triggers may for example be used to adjust the loading of machines of various types, to govern the selection of machines of a particular suitability to the work order and across different suitability categories, to control the selection of machines based on the amount of changeover required to set up the machine and to control the 'gap' (i.e. idle time on the machine) between two consecutive work orders on the same machine.

7. Other Scheduling Model Parameters—other parameters 132 which may be specified include:

Overlapped or non-overlapped operations—indicator of whether or not processing of one work order operation at one work center can be overlapped with the processing of a succeeding/preceding work order operation at another work center.

Work center specific parameters—work center specific scheduling parameters refer to those parameters that are specified at the work center level. Examples of such parameters are maximum buffer stock time (i.e. the highest allowable WIP level that can be accommodated between successive operations, due to physical limitations on the shop floor, management operational decision, or the like, measured in units of time), minimum buffer stocks (i.e. the minimum WIP level that can be maintained to avoid discontinuity between the two successive operations and hence avoid starvation of the latter operation, measured in units of time), transit time between operations, batching hours (i.e. the maximum production lot size, expressed in units of hours, for smaller production lots to be batched, in order to reduce the number of machine changeovers), batching days (i.e. the time interval within which production lots having similar part identifiers will be considered for batching). Job Prioritization and Machine Selection rules which have been specified for the center, the number of machines within the center, machine identifiers, JP and MS rule control trigger, and the like.

Fixed scheduling for a work order—optional scheduling of a particular work order during a particular time period specified by the user.

Figure 3:
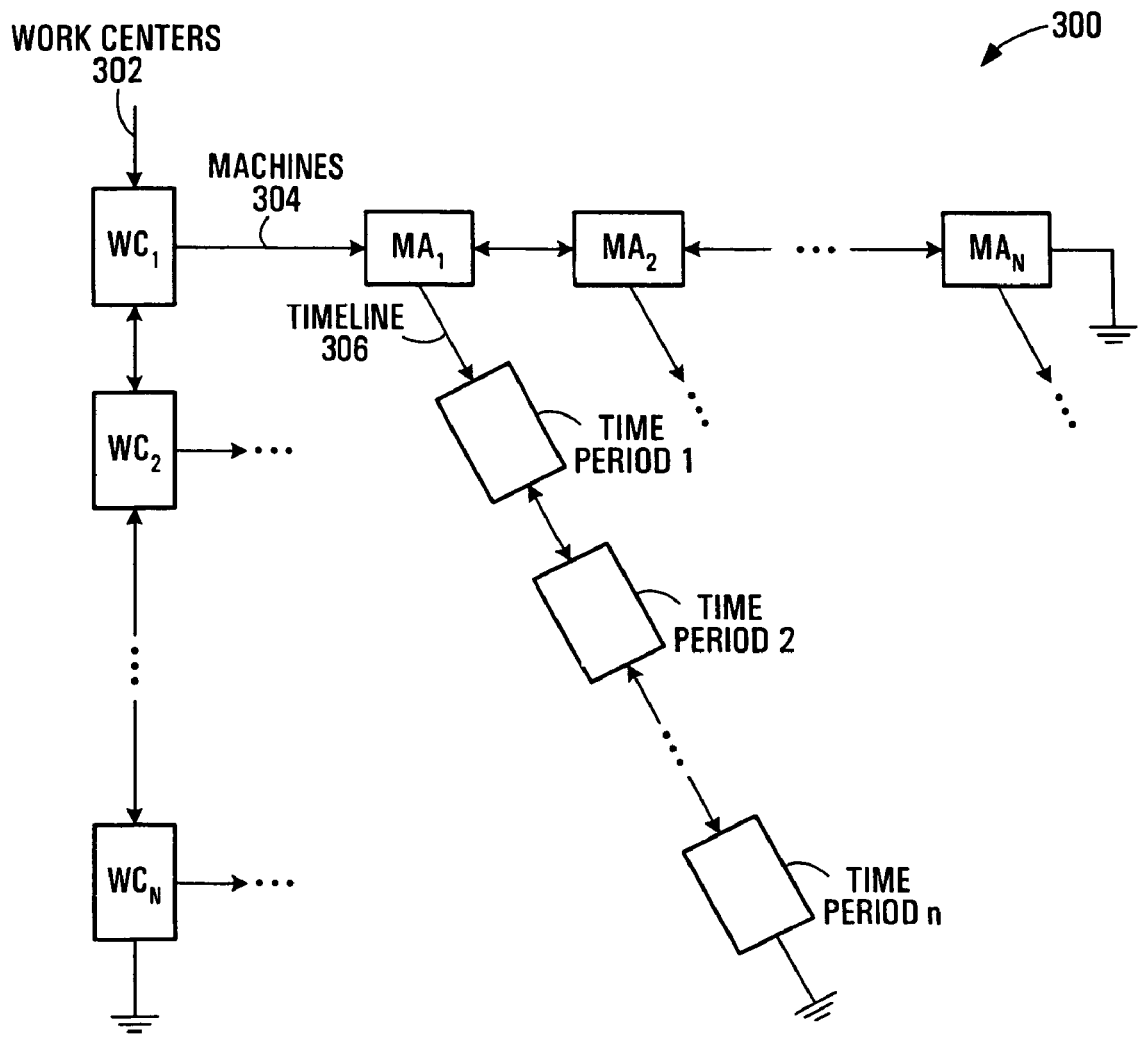
FIG. 3 illustrates a three-dimensional (3D) machine time line data structure utilized by the scheduling system of FIG. 2.

Turning to FIG. 3, a 3D machine timeline data structure 300, which is maintained in the SDC 106 during a scheduling run, is illustrated. The 3D machine data structure 300 timeline is a three dimensional linked list used by the scheduling system 100 to store, in a single data structure, information regarding all of the work centers at which scheduling is to be performed, all of the machines at these work centers, and all of the scheduled activities or machine states of each machine during every moment of the current scheduling time window. The advantage of this data structure is the convenience that is afforded by the storing of these three different data sets in one easily traversible data structure.

As can be seen in FIG. 3, the 3D machine timeline data structure 300 comprises a "work centers" linked list 302 in the first dimension. Each node of this linked list represents a work center at which schedules may be performed. Each work center node contains a pointer 304 to a "machines" linked list, which occupies the second dimension of the 3D machine timeline data structure 300. Each node in this linked list represents a machine at the work center represented by the parent work center node. Each machine node itself contains a pointer 306 to a further "timeline" linked list, which occupies the third dimension of the 3D machine timeline data structure 300. Each node in this linked list represents a time period during which a particular activity is to be performed at the machine represented by the machine node. The granularity of the time periods is minutes in the present embodiment, however this granularity can be increased or decreased as necessary in alternative embodiments. The nodes in the latter list describe the status of the associated machine during every minute of the scheduling horizon. As will be appreciated, the number of nodes is determined by the scheduled use of the machine. Each linked list is doubly linked to facilitate traversal of the data structure 300.

Each node in a "timeline" linked list 306 contains various information, e.g. in the form of fields, regarding the use of the associated machine during a particular time period. These may include machine status (also referred to as "node type"), start time, end time, an efficiency factor, and, in the event the processing of a particular operation has been scheduled, work order information such as work order number, part number and assignment information. Other information, such as shift or team identifiers, may also be stored in a timeline node.

The machine status field is a code, consisting of one or more component ASCII characters in the present embodiment, wherein each character is indicative of a particular machine status during the time period represented by the timeline node. Individual machine status characters fall into two categories: exclusive and non-exclusive. Exclusive machine characters represent machine statuses which cannot be combined with any other machine status. Non-exclusive machine characters, on the other hand, represent machine statuses which may be combined with any number of other non-exclusive machine statuses. For example, the following node types may be used:

'Exclusive' Node Types:
 'a': available block for assignment
 'x': work order scheduled for execution
 'c': changeover time
 'r': work order currently being executed
 'z': non-availability of machine
'Non-Exclusive' Node Types:
 'm': meal break
 'p': preventive maintenance
 'd': machine downtime
 'M': manual adjustment (block out)
 'S': shutdown (block out)
 'T': machine trial run (block out)
 'B': pilot run and manual assignment (block out)
 'N': any other block out event A node may for example have a machine status of 'mp', combining non-exclusive node types 'm' and 'p'. This means that an operator meal break and preventive maintenance are both scheduled during the same time period for the relevant machine.

The start time and end time fields simply indicate the time period during which the machine status contained in the node is valid.

The efficiency factor is a value which indicates the current efficiency of the associated machine. The efficiency factor may help to increase the accuracy of the final schedule by realistically accounting for machine efficiency, which may be affected by the machine's condition, by introduction of new parts into the production line, or by the running of a pilot/trial run at the machine.

If a work order is either scheduled for execution or being currently executed during a particular time period ('x' or 'r'), additional data about the work order may be recorded in the node structure. Typical additional data includes work order number, part number, and cumulative time since order releasing, fixture used and operator identifier.

In overview, operation of the scheduling system 100 is governed primarily by two user-configurable options: scheduling model (job shop or flow shop) and scheduling methodology (forward, backward, or bottleneck).

In the case where the job shop model has been chosen with the forward scheduling methodology, work order pools are initially created for each work center. A work order pool is a set of work orders that is to be performed at a particular work center during the present scheduling horizon. A work order will be included in a work order pool associated with a particular work center when the work order includes the operation with which the work center is associated. For example, all work orders containing a "wire bonding" operation will appear in the work order pool of the "wire bonding" work center.

The work orders in each pool are examined to identify starting candidates, for which machine selection will be attempted first. In the forward scheduling model, a work order will be deemed a starting candidate for assignment to a particular machine at a given work center when its first operation is one that is associated with that work center. Other factors exist which could affect whether or not a work order will be deemed a starting candidate, however these are temporarily disregarded for the purposes of the present overview. It will be appreciated that each work order will be a starting candidate at only one work center, however all work orders will not necessarily be starting candidates at the same work center (i.e. different work orders may be starting candidates at different work centers).

The starting candidates then undergo job prioritization, whereby the set of JP rules currently specified by the user are applied to assign a priority ranking to each candidate. Notably this job prioritization does not take into consideration the availability or suitability of machines for completing a given work order operation.

A highest priority candidate work order is then identified for all work centers, and an attempt is made to assign this highest priority candidate work order to a machine at the work center at which that work order is the highest priority candidate (which, in this initial case, will be the work center associated with the highest priority candidate's first operation). This attempted assignment is referred to as "machine selection" or, more accurately, as "attempted machine selection" as successful assignment to a machine is not guaranteed. During machine selection, an attempt is made to find an available machine that is best suited of all available machines for performing the desired operation. MS is governed by the MS Rules.

If machine selection is successful, the highest priority candidate work order is deemed to be a candidate for machine selection at its "succeeding" work center, i.e., at the work center associated with its next operation (if one exists). While remaining a candidate, the "highest priority" work order will no longer necessarily be the highest priority candidate.

If machine selection is unsuccessful, the highest priority candidate work order is removed from all of the work order pools. This is done because the finished product associated with a work order cannot be manufactured if some of the work order's operations cannot be scheduled for execution at a machine. Removal of the work order from all work order pools frees up the available machine capacity for other work orders.

This process continues, with a new highest priority candidate being determined and scheduling of same being attempted for every iteration, until each work order has either had machines selected for all of its operations or has been deleted from all work order pools due to the fact that one of its operations could not be assigned to a machine.

Alternatively, if the backward scheduling methodology rather than the forward scheduling methodology is employed with the job shop model, operation differs in two respects. First, starting candidate work orders at a given work center will be those work orders whose last operation (rather than first operation) are associated with that work center. Second, upon successful machine selection at a work center for a particular work order, that work order will be deemed to be a candidate for machine selection at the work center associated with its immediately preceding operation, rather than its next operation (if one exists).

If the flow shop model is chosen, operation is simplified by the fact that each work order will have the same operations in the same sequence with optional skipping of some operations. In this case, if the forward scheduling methodology has been chosen, then work orders are scheduled, work center by work center, starting from the work center associated with the first operation and ending at the work center associated with the last operation. If backward scheduling is chosen instead, the order is reversed.

Alternatively, if the bottleneck scheduling model is chosen, a user-identified bottleneck operation is scheduled first to maximize the likelihood that the bottleneck operation will be scheduled. The work orders are then split into two groups. The first group encompasses work orders which have downstream operations (i.e. operations which are to be performed after the bottleneck operation is completed). The second group includes work orders having operations upstream of the bottleneck operation. The first group is scheduled immediately following the bottleneck using the forward scheduling methodology, while the second group is scheduled immediately preceding the bottleneck using the backward scheduling methodology. The job shop model or the flow shop model is applied as appropriate to the scheduling of the first and second groups, based on the nature of the work orders to be scheduled and on the requirements of the actual production environment during implementation.

Operation of the present embodiment is illustrated in FIGS. 4 to 21, 22A, 22B, and 23 to 26.

Figure 4:
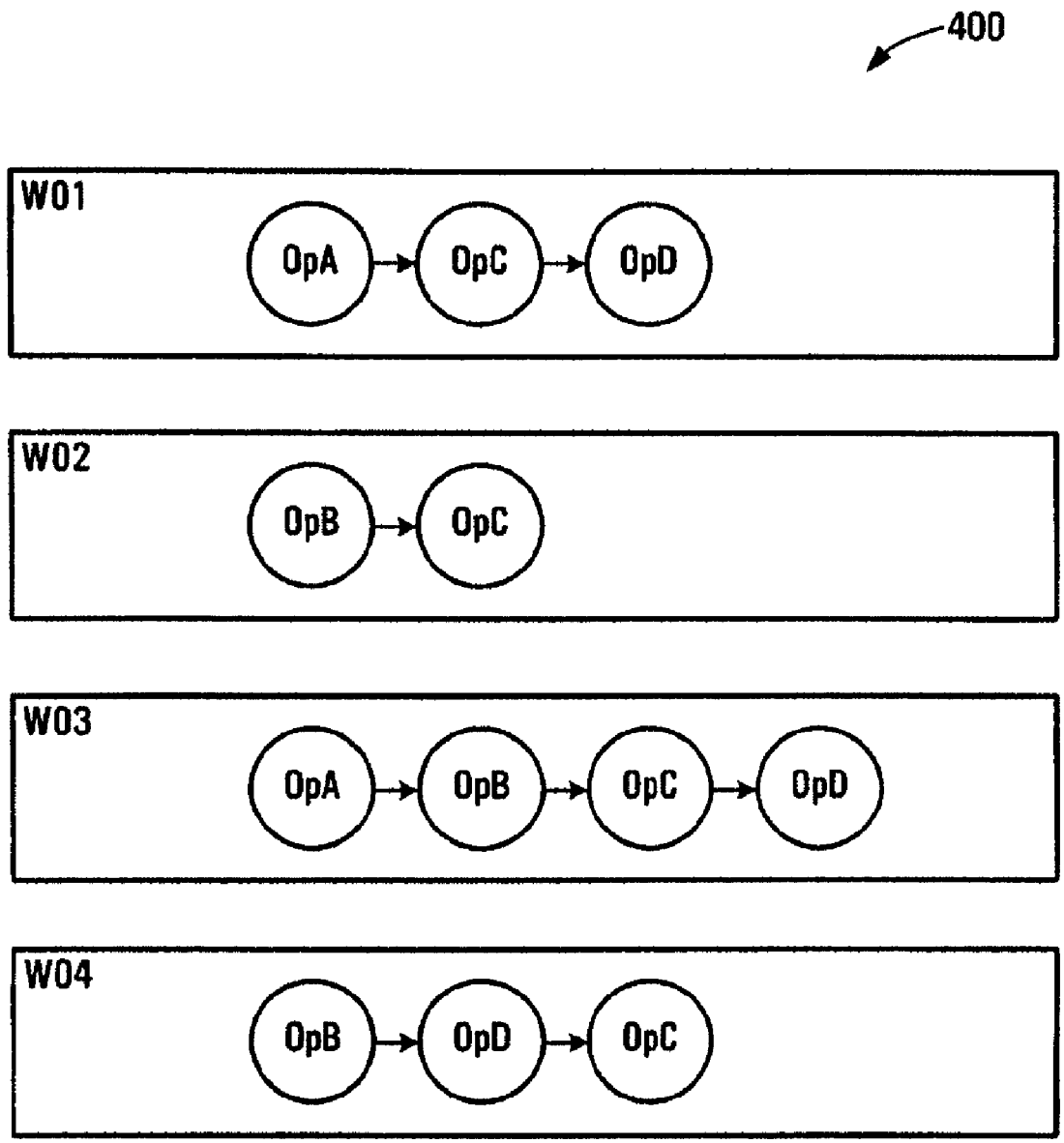
FIG. 4 illustrates an exemplary set of work orders to be scheduled.

FIG. 4 illustrates a set of four work orders 400 to be scheduled, namely work orders WO1, WO2, WO3, and WO4. Each work order is defined by a unique set of operations to be performed in a particular sequence. For example, work order WO1 is defined by three operations, OpA, OpC and OpD, which are to be performed in that sequence in order to complete the work order. The remaining work orders are defined by different sets of operations in different sequences. Accordingly, it will be appreciated that the job shop scheduling model should be applied when scheduling these work orders for execution (if each work order had the same operations in the same order, the flow shop model would instead be warranted).

It should be understood that the illustration of work orders in FIG. 4 is for illustration purposes only. Work orders are typically represented as electronic files and may contain a variety of information beyond a sequence of operations. It will also be appreciated that the number of work orders in a typical scheduling task and the number of operations in a typical work order may be much higher than illustrated in FIG. 4.

Figure 5:
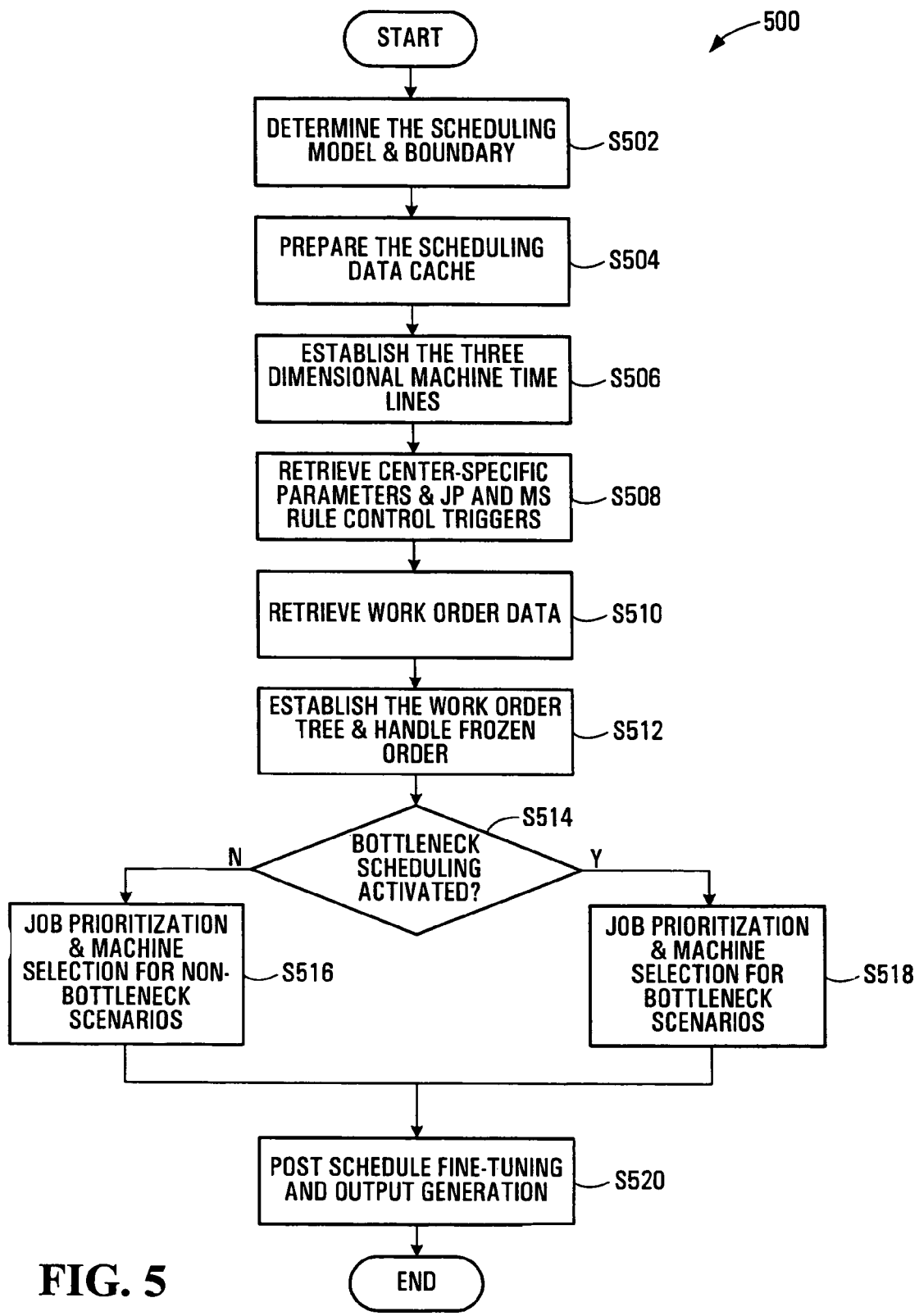
FIG. 5 is a flowchart illustrating operation of the scheduling system of FIG. 2 for scheduling work orders.

Referring to FIG. 5, operation 500 of the scheduling system 100 for scheduling work orders is illustrated. Operation 500 is executed once per scheduling run, and is equally applicable to all scheduling models and scheduling methodologies. Operation 500 is triggered by a use of the scheduling system 100.

Initially, scheduling model definitions and boundary conditions are retrieved. This information originates from a user or other source external to the scheduling system 100 and is received by way of the data interface 112, being stored in the scheduling database 110 prior to the scheduled run. The retrieved data includes scheduling horizon, scheduling model 120 (job shop, flow shop or bottleneck), scheduling methodology 122 (forward or backward), and work center and machine information.

Next, the SDC 106 is prepared for the upcoming scheduling run (S504). In the present embodiment, preparation of the SDC 106 includes the following:

- log files are created to record any exceptional events that may occur during scheduling
- mapping between actual and fiscal calendars is retrieved to facilitate computation of date information (which is based on the fiscal calendar in the present embodiment) by the scheduling system 100
- global configuration options and flags for optional features and constraints (e.g. tooling and fixture, material, operator constraints and the like, as will be described) are retrieved
- work center and machine options are set up within the SDC 106 (the present system provides the user with the option of varying the number of "effective" work centers and machines between different scheduling runs for "what-if" simulation purposes)
- retrieval of machine loading preferences (used for machine workload balancing)

Figure 6:
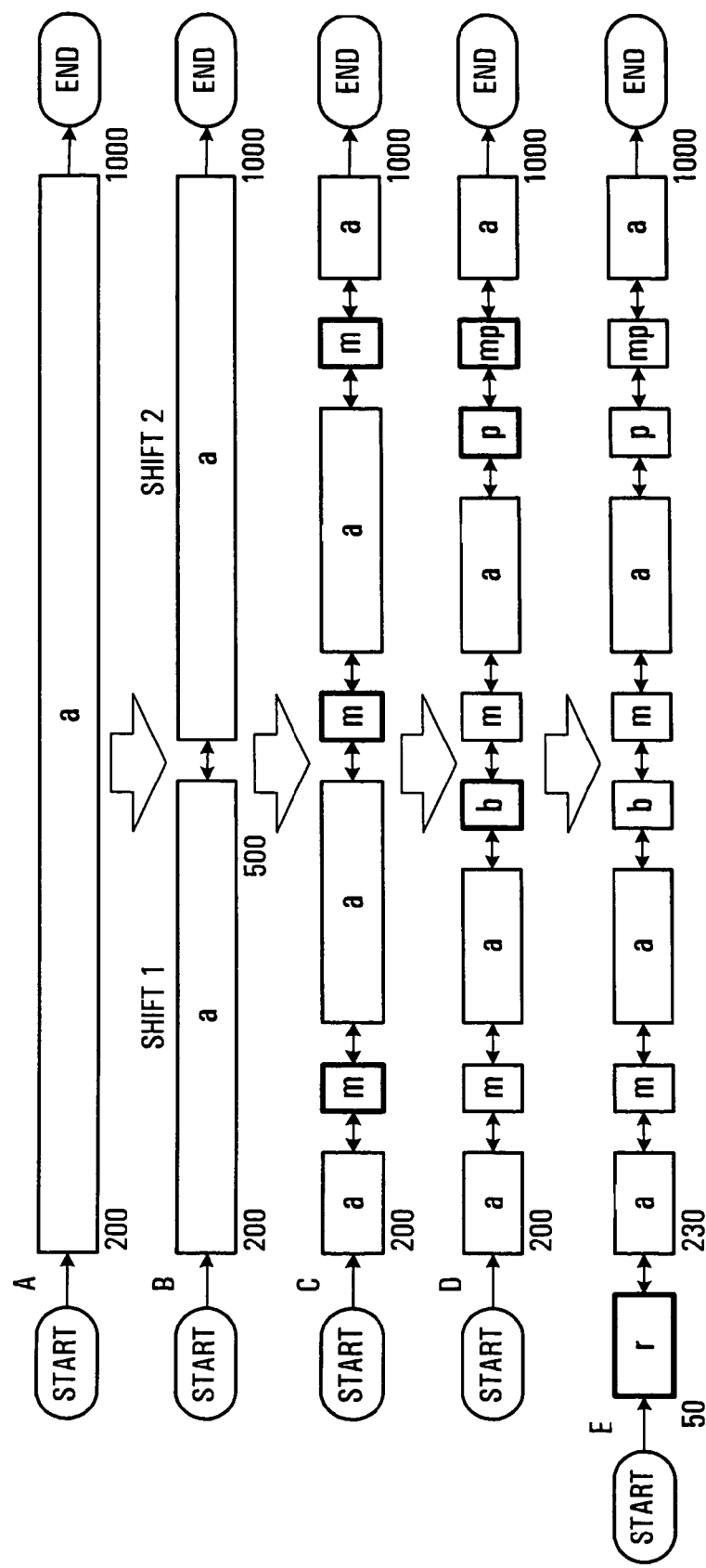
FIG. 6 illustrates initialization of an exemplary time line linked list within the 3D machine time line data structure of FIG. 3.

Subsequently, the three-dimensional machine time line data structure 300 (FIG. 3) is initialized in the SDC (S506). Initialization of the 3D machine time line data structure entails five steps. The five steps (A) through (E), which are illustrated in FIG. 6, are as follows:

(A) Initially, the time line for each machine is empty. The start time and end time of the time line are determined by the scheduling time period, also referred to as the Work Order Time Span (WOTS). Any attempt to schedule a work order outside the WOTS will cause scheduling to fail. For example in FIG. 6, the machine time line spans time 200 to time 1000 indicating the scheduling horizon is from time 200 to time 1000. The node is marked with a machine available status ('a').

(B) Operator shift information, which may be defined to the machine level in the production calendar, is built into the time line. For example, two shift nodes in the time line, namely, shift 1 from time 200 to time 500 and shift 2 from time 500 to 1000, may be defined as shown in FIG. 6.

(C) Meal blocks defined in each shift are introduced into the time line. As it can be seen in the example of FIG. 6, the number of meal blocks within each shift can vary according to the actual operating environment, as may be defined in the calendar definition.

(D) Preventive maintenance, machine downtime or any other kind of "block out" due to specific requirements are introduced into the time line to prevent any assignment of work orders during those time periods.

(5) Finally, the dispatching list from the previous scheduling run is checked to locate any work orders which were running at the end of the previous scheduling time period. Running work orders which were not finished during the previous scheduling time period will be scheduled first during the current scheduling time period. Each machine time line is backwardly extendable (i.e. extendable to begin at a time earlier than the start of the scheduling horizon) so as to facilitate inclusion of the entire running work order time period starting from the starting time (ST) of the lot, which can be retrieved directly from the scheduling database 110. The calculations associated with a running lot are as follows:

$$RPT = \max(0, TPT-APT)$$

$$ET = SD + M + B + RPT \qquad (1)$$

Where:
- ET: End time of the running lot.
- RPT: Remaining processing time of the running lot in the current time period.
- TPT: Total processing time of the running lot.

APT: Actual processing time the running lot has gone through.

SD: System date and time, from which the assignment of current scheduling runs starts.

M: Mealtime.

B: Block out time.

Following the initialization of the 3D machine timeline data structure, JP Rules 124, JP Rule Control Triggers 126, MS Rules 128 and MS Rule Control Triggers 130 and center-specific parameters are retrieved from the scheduling database (S508).

Thereafter, work order information is retrieved (S510). Work order information may include, for each work order: work order number, part identifier of the part being processed in the work order, quantity (i.e. lot size, that is, number of units being processed in the work order), release date, and due date. At the operation level, additional attributes may include operation code, operation sequence number (which dictates the order of the operations which make up a work order), and net production quantity. Work order arrays are initialized in the scheduling data cache 106 and each work order is segregated according to its current operation and status.

Next, the work order tree structure is established in the Scheduling Data Cache 106, and the assignment of "frozen work orders" is carried out (S512). A work order tree is a global data structure that stores information regarding each work order to be scheduled, including the current status of the work order at each of its operations. It is the "master" copy of the work order data from which the JP and MS modules 102 and 104 will retrieve necessary work order related data during operation. A "frozen" work order is a work order which is only executable on a particular machine during certain time period. The scheduling system 100 retrieves the work order tree information from a database table in the scheduling database 110. The work orders are linked to create a work order tree through the predecessor and successor relationships as defined by the sequence of their operations The release date for each work order is computed at the operation level and run rates are retrieved.

A number of operational issues in a production environment may cause a work order to be frozen. One of these issues is a desire to maintain continuity and minimize interruptions between the preceding schedule and the current schedule (i.e. the schedule resulting from the current scheduling run). The duration of the time period during which work orders are to be frozen and the number of work orders to be frozen are user configurable and are generally chosen based on the target production environment. Frozen work orders, as well as running work orders are scheduled at this stage, as these are not governed by the JP and MS rules 124 and 128.

If bottleneck scheduling has not been chosen by the user (S514), scheduling is performed by the JP Module 102 according to the operative scheduling model 120 (job shop or flow shop) and scheduling methodology 122 (forward or backward) (S516). Job shop scheduling occurs as described below in conjunction with FIG. 8. Alternatively, flow shop scheduling occurs as described below in conjunction with FIG. 16. Regardless of the chosen model, machine selection is performed by the MS Module 104 as described below in conjunction with FIG. 21. As will be appreciated, the operative methodology and model during a particular scheduling run in which bottleneck scheduling has not been chosen will thus be one of forward job shop, backward job shop, forward flow shop, and backward flow shop.

If, on the other hand, bottleneck scheduling is activated (S514), scheduling is performed according to the bottleneck scheduling model (S518). Bottleneck scheduling occurs as described below in conjunction with FIG. 17. Both of the JP Module 102 and MS Module 104 are employed in bottleneck scheduling.

Upon completion of work order scheduling, the system 100 manipulates the three-dimensional machine time line data structure 300 in the SDC 106 to fine-tune the generated schedule and generates the scheduling output (S520) as requested by the user.

During post-scheduling fine-tuning, any partially scheduled work orders will be removed, any work orders for which the Assigned End Time of the last operation post-dates the work order due date will be marked as late, and any finished and unfinished inventories for unassigned jobs will be deallocated.

Prior to output generation, the finalized scheduling information is read from the 3D machine timeline data structure 300 and stored in the scheduling database 110. The stored information is used to generate output of the form requested by the user. Output may take the form of a production schedule, Gantt chart, dispatching list, fixture usage report, work order cycle time report, unassigned job report, or daily/weekly machine utilization report. An exemplary production schedule 700 which may be generated by the system 100 is illustrated in FIG. 7. Operation 500 of the scheduling system 100 is thus concluded.

Figure 8:
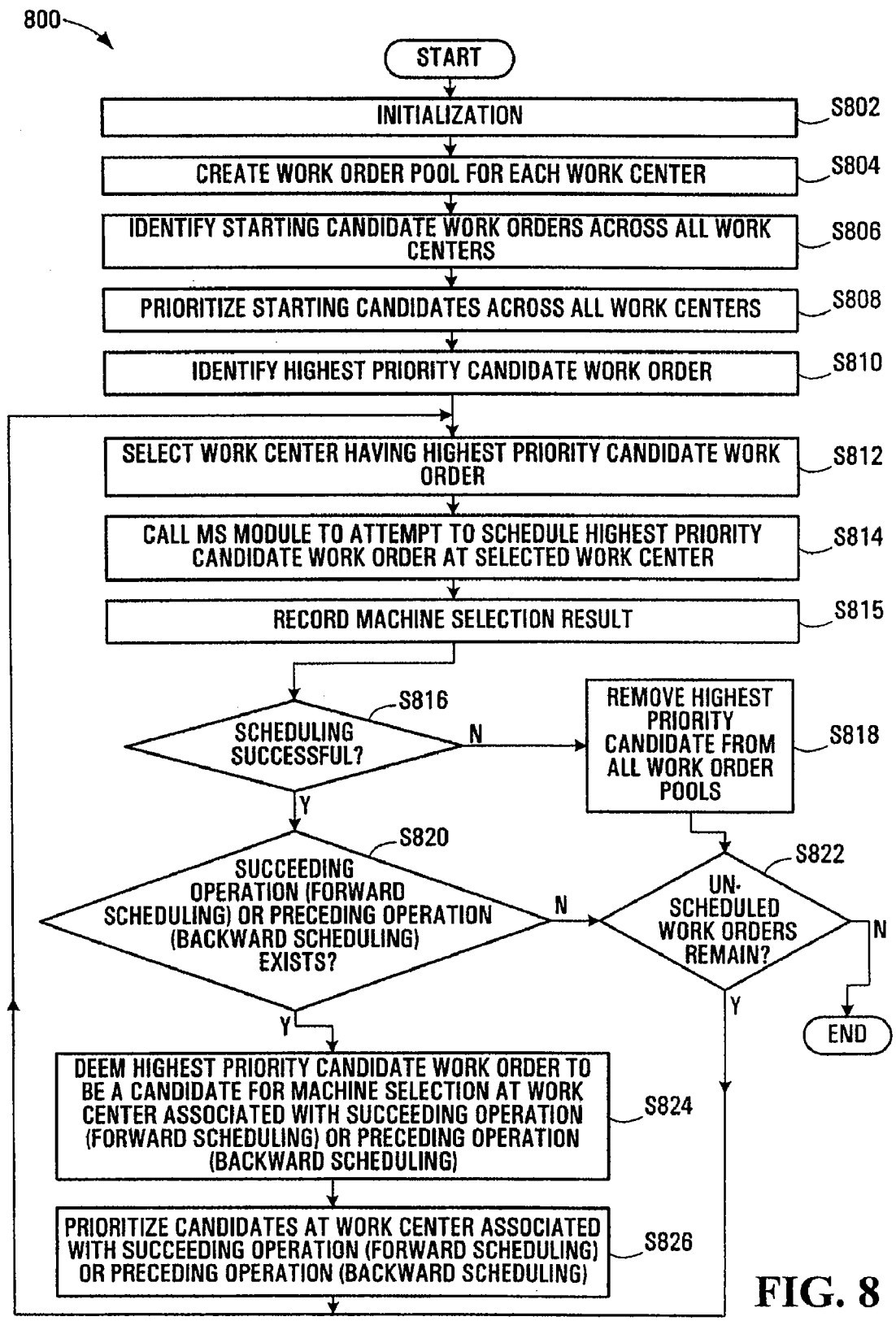
FIG. 8 is a flowchart illustrating operation of the scheduling system of FIG. 2 for scheduling work orders according to the job shop model.

Turning to FIG. 8, operation 800 of the JP Module 102 for scheduling work orders according to the job shop model is illustrated. Although operation 800 is equally applicable to both of the forward and backward scheduling methodologies, here it will be described assuming that the forward scheduling methodology has been chosen. In particular, operation for scheduling the work orders illustrated in FIG. 4 according to the forward scheduling methodology will be described. Various stages of completion of this scheduling task, illustrated in FIGS. 9A to 9F, will be referenced during the course of the description which follows.

Operation 800 begins with initialization (S802). Initialization entails memory allocation of the JP data structures (i.e. the work order tree, center-specific scheduling data, etc.), flags, parameters, and the like in the Scheduling Data Cache 106.

Following initialization, a work order pool is created for each work center (S804). As previously described, a work order pool is a set of work orders that is to be performed at a particular work center. The initial set of work order pools 910 is illustrated in FIG. 9A.

Figure 9A:
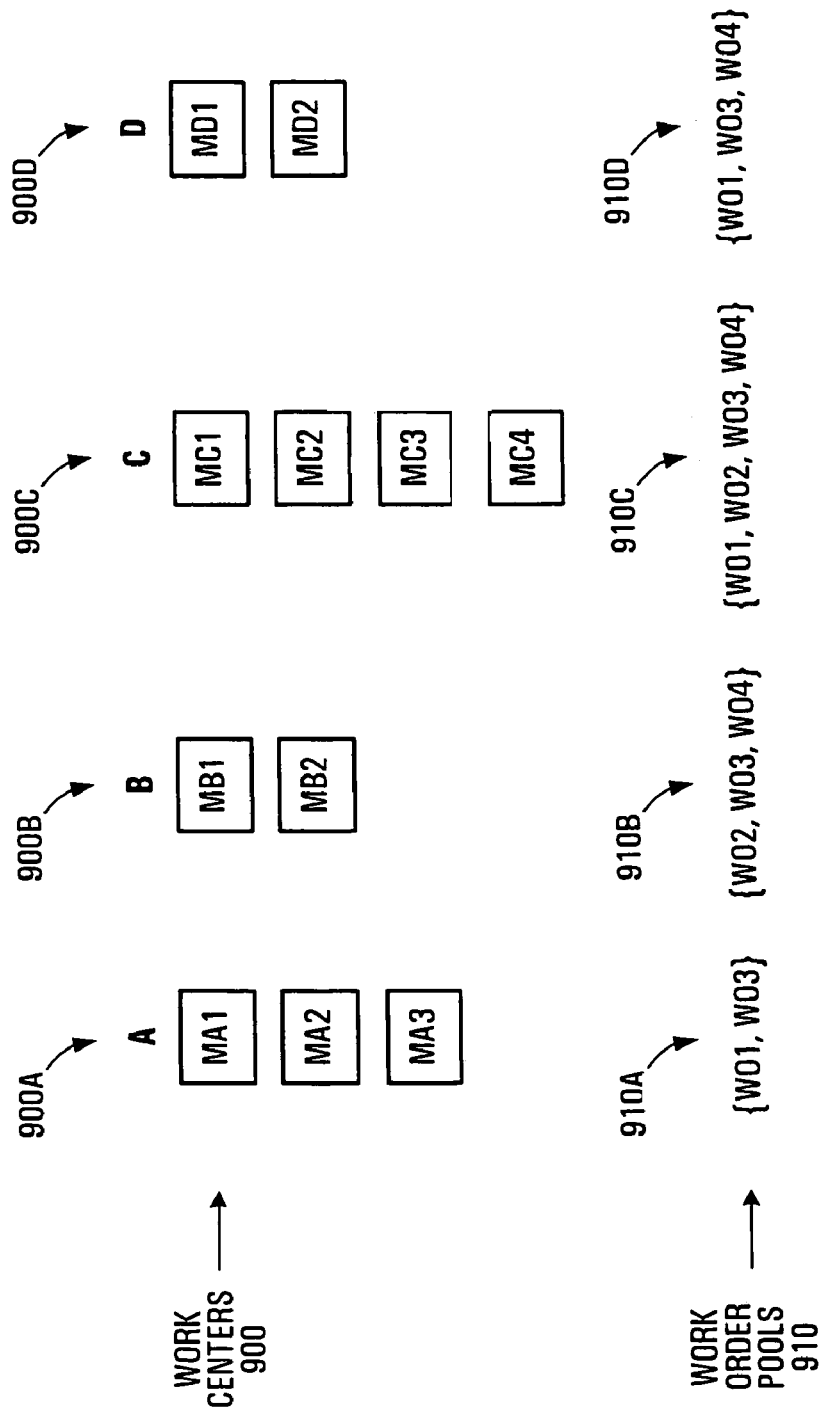
FIGS. 9A to 9G illustrate various stages during the scheduling of the work orders of FIG. 4.

FIG. 9A illustrates four work centers 900 at which scheduling is desired. Each work center 900A, 900B, 900C and 900D is associated with a single operation A, B, C and D, respectively. Each work center has at least two machines, with each machine having an identifier Mxn, where x is the relevant operation and n is an integer. It will be appreciated that work order pools 910A, 910B, 910C, and 910D are associated with work centers 900A, 900B, 900C and 900D respectively.

Creation of the work order pools 910 may entail duplication of operations from a global work order list, with relevant center-specific scheduling parameters being taken into account.

The work order pools are represented within a center-order data structure (not illustrated) which resides in the SDC 106. The centre-order data structure is used to store data regarding the work orders to be scheduled throughout the scheduling run. The work order data is organized by work center. The information that is maintained for each work order includes the work order identifier, sequence number, current operation identifier, preceding operation identifier, succeeding operation identifier, production quantity, release date, Earliest Start Time (EST), Latest Start Time (LST), work order scheduled flag, Assigned Start Time (AST), Assigned End Time (AET), assigned machine identifier, frozen flag, and the like.

Next, starting candidate work orders are identified across all work centers (S806) of FIG. 8. Given the operative forward scheduling methodology, a work order is a starting candidate at a given work center when its first operation is associated with that work center. If the backward scheduling methodology had been elected, a work order would be a starting candidate at a given work center when its last operation is associated with that work center.

In the present embodiment, a further requirement exists for a work order to be a starting candidate, namely, that the work order is not frozen.

Figure 9B:
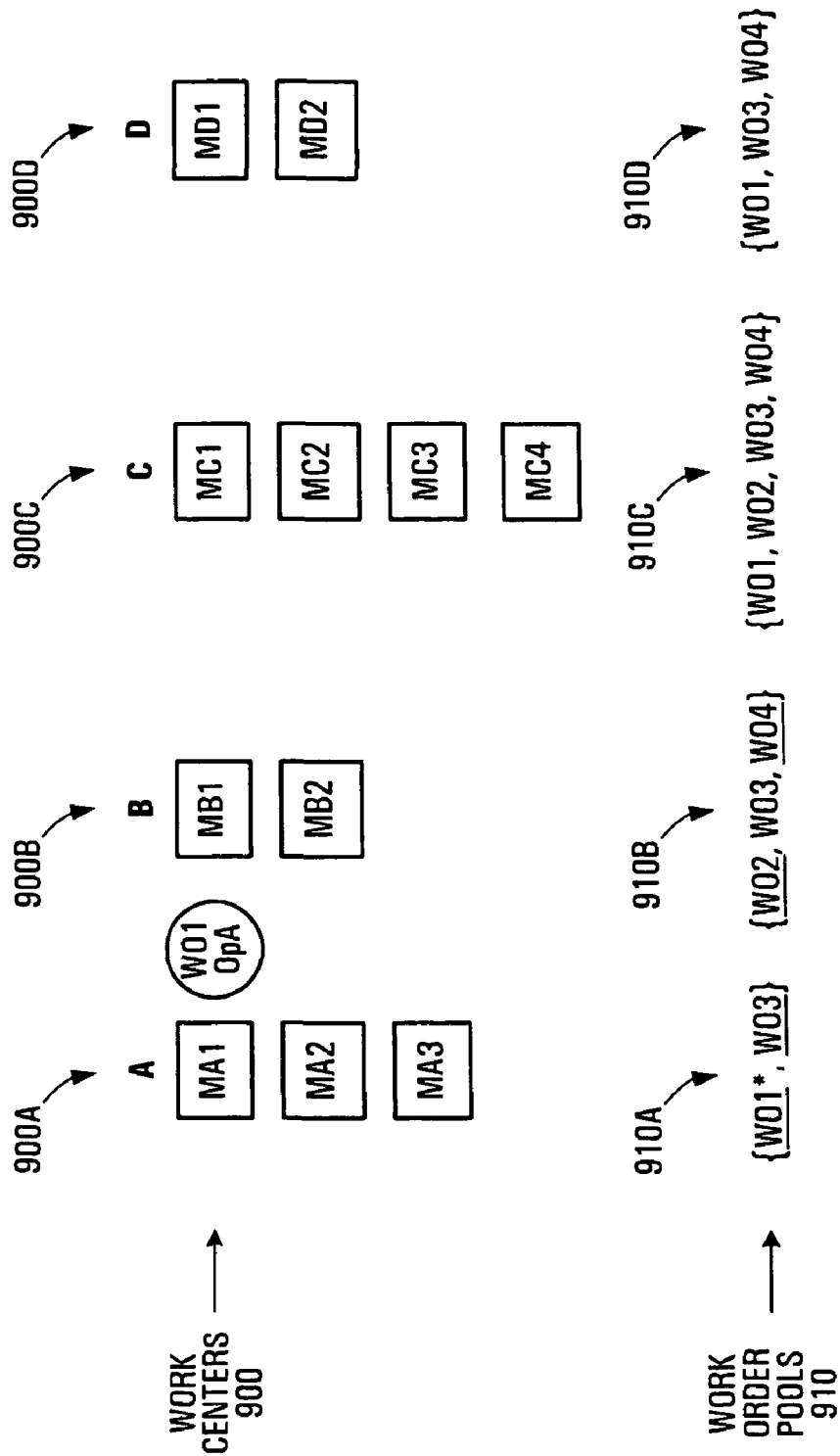

The starting candidates of the present example namely, work orders WO1 and W03 at work center 900A and work orders W02 and W04 at work center 900B are identified in FIG. 9B by the underlining of their identifiers. It will be observed that the number of starting candidates at a given work center may be greater than one, and that some work centers have no starting candidates.

Next, the starting candidate work orders are prioritized (S808). Prioritization is performed according to the operative JP Rules 124. Operation S808, which is performed by the JP module 102 is illustrated in greater detail as operation 1000 in FIG. 10.

Figure 11:
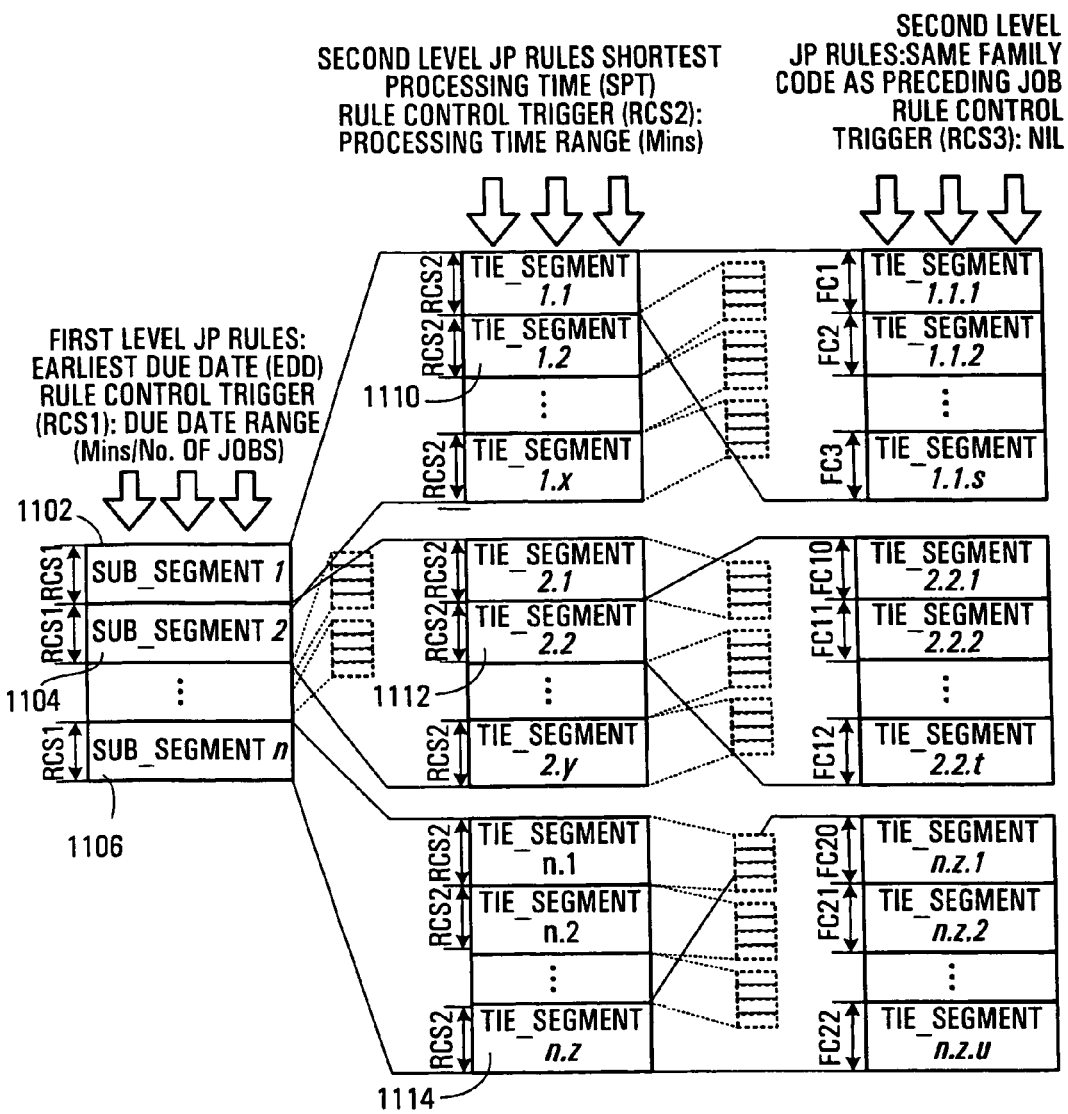
FIG. 11 illustrates a hierarchy of job prioritization (JP) rules applied by the scheduling system of FIG. 2.

In the present embodiment, the JP Rules are defined in a three-level hierarchy comprising a primary JP Rule, a secondary JP Rule, and a tertiary JP Rule. The purpose of the different levels of JP rules is to promote the assignment of a unique priority ranking to each job in the work order pool. The hierarchy is illustrated in FIG. 11. It will be appreciated that the three-level hierarchy illustrated in FIG. 11 is just an example; the actual number of levels or hierarchies depends upon the number of JP rules specified for that center/operation.

As can be seen in FIG. 11, a different JP rule has been assigned to each level of the three-level JP rule hierarchy: Earliest Due Date (EDD) has been assigned to level 1, Shortest Processing Time (SPT) to level 2, and Same Family Code As Preceding Job to level 3. The EDD rule is fixed as the primary JP Rule (i.e. it is "hard-wired"); the secondary and tertiary JP Rules have been configured by the user.

Figure 10:
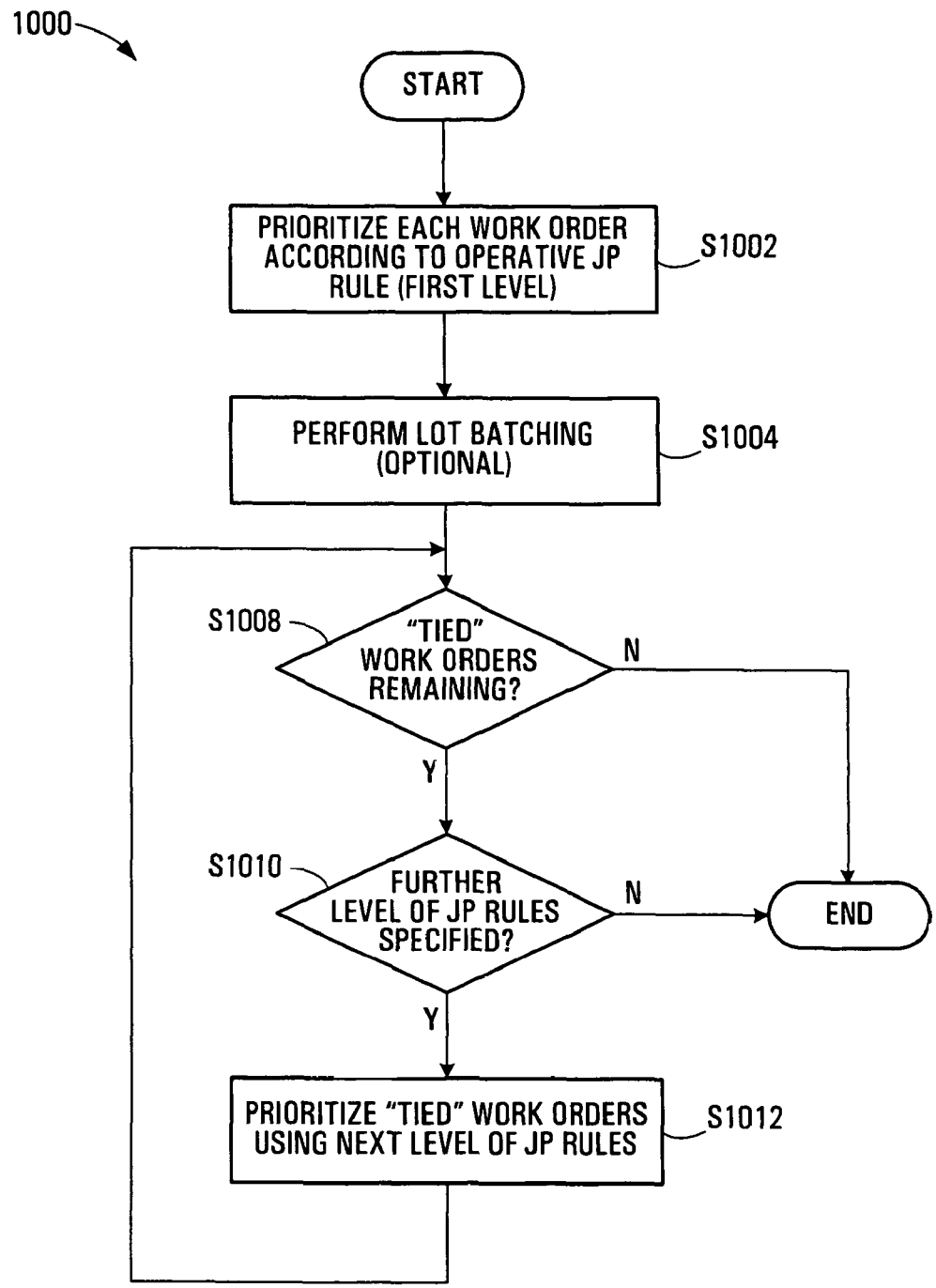
FIG. 10 is a flowchart illustrating operation for prioritizing candidate work orders.

Referring to FIG. 10, initially each starting candidate work order is prioritized according to the primary JP rule (S1002). In the present embodiment, the primary JP rule is the EDD rule. Application of the EDD rule with an operative scheduling methodology of forward scheduling entails ranking the starting candidate work orders within the pool based on ascending Earliest Start Time (EST). The Earliest Start Time for a work order represents the earliest time at which the execution of the work order may begin at a particular work center in order to meet the specified work order due date. Thus, candidate work orders with earlier EST will generally be ranked ahead of candidate work orders with later ESTs (although, depending upon the rule control trigger used in connection with the EST JP Rule and the characteristics of subsequent JP rules, it is actually possible for a candidate work order with a later EST to be ranked ahead of a work order with an earlier EST, as will be appreciated).

If the backward scheduling methodology had been operative, the work orders would have been ranked based on descending Latest Start Time (LST). The Latest Start Time for a work order represents the latest time at which the execution of the work order may begin at a particular work center in order to meet the specified due date. Thus, candidate work orders with the later LSTs will generally be ranked ahead of candidate work orders with earlier LSTs (although, depending upon the rule control trigger used in connection with the LST JP rule and the presence of subsequent JP rules, it is possible for a candidate work order with an earlier LST to be ranked ahead of a work order with a later LST).

It is noted that computation of LST is performed even when the forward scheduling methodology is operative, and EST even when the backward scheduling methodology is operative. This is because both EST and LST may be used by the MS Module 104. For other JP Rules, other metrics (e.g. Slack Time or Total Operation Remaining Time) may be computed.

When the EST is computed for the first operation of a work order, it is computed based on the due date of the entire work order offset by the total processing time for all the operations of the work order, the transit time in between the operations and the maximum buffer stock in between the operations. In the JP module, the processing time of each operation is calculated based on the work order quantity (i.e. number of items in lot) multiplied by the average number of units which can be manufactured per time interval (e.g. hour); no machine assignment is performed at this stage. Other parameters, which are related to the operational constraints of the current production environment such as transit time and buffer stock levels, are specified as parameters in the work center-specific setting of the other scheduling model parameters 132. The resultant EST value is compared with the start time of the scheduling window (or the current system time plus a time offset), and if the computed EST is greater (i.e. later in time), then the end user will have the option of setting it to the smaller time value (this is a configurable option in the scheduling system 100).

If the backward scheduling methodology were operative instead of forward scheduling, such that computation of an initial LST value (rather than an initial EST value) would have been warranted, the initial LST would be computed in a similar manner. As will later be described, the manner of computing the EST or LST values after at least one operation of the work order has been scheduled will be different from the initial EST computation.

The JP Rule Control Trigger associated with the EDD JP rule (which sets the granularity of the different priority rankings), is, the "Due Date Range (Mins/No. of Jobs)" JP Rule Control Trigger (code "RCS1"). This trigger is employed to distinguish work orders by EDD priority in S1002.

Following application of the first level EDD JP rule and associated RCS1 JP Rule control trigger, lot batching is performed (S1004). Lot batching is an optional operation, which may be selectively engaged by a user. Lot batching attempts to group work orders having the same part identifier together for further processing by the scheduling system 100. When work orders are batched, work orders within the same batch are treated as a unit during job prioritization If the priority ranking assigned to any two starting candidate work orders following prioritization is the same, i.e. their first level ranking has resulted in a "tie" (S1008), and if a further level of JP Rules has been specified in the JP Rules hierarchy (S1010), the "tied" work orders are prioritized by the next level of JP Rules in the hierarchy (S1012). This is repeated until either all candidates being ranked have been assigned a unique priority ranking or until no further levels of JP Rules exist in the JP Rules hierarchy.

Referencing FIGS. 8 and 9B, in the present example the work order WO1 is determined to have the highest priority (S810—FIG. 8) based on the fact that its EST is smaller (i.e. earlier) than all other starting candidates. The highest priority ranking for work order WO1 is indicated within the job pool 910A (FIG. 9B) with an asterisk ("*"). The work center 900A which contains the highest priority candidate is selected (S812).

Although unnecessary in the present example, the manner in which ties may be broken by application of the JP Rules of the second and third levels of the hierarchy is shown in FIG. 11. In particular, three sets 1102, 1104 and 1106 of "tied" work orders as shown to have the same priority ranking.

Accordingly, because a second level JP Rule has been specified (the "Shortest Processing Time" Rule), each of the three sets of "tied" work orders 1102, 1104 and 1106 is subjected to further prioritization using the second level JP Rule with the associated JP Rule Control Trigger ("Processing Time Range (Mins)"—code RCS2). This succeeds in assigning unique priorities to some of the previously tied work orders. However, three further sets 1110, 1112 and 1114 of "tied" work orders emerge which still the same priority ranking. Because a third level JP Rule has been specified (the "Same Family Code as Preceding Job" Rule), each of the three sets of "tied" work orders 1110, 1112 and 1114 is subjected to further prioritization using the third level JP Rule, which lacks a specific corresponding JP Rule Control Trigger. This third tie-breaking attempt succeeds in assigning unique priorities to the still tied work orders. It will be appreciated that the first work order of each work pool will not necessarily have the earliest EST within its pool, for the reasons stated previously.

It will also be appreciated that, in cases where a unique priority could not be assigned to each work order, no further prioritization will be performed and the prioritized list will be the priority sequence for each work order in the work order pools. It is thus possible for more than one starting candidate work order to exist per work order pool.

Thereafter, an attempt is made to schedule the highest priority starting candidate work order to a specific machine (S814). Machine selection is performed by the MS Module 104 as described in greater detail below.

Following the attempt at machine selection, the machine selection result is communicated to the JP Module 102 and recorded (S815) within the center-work order data structure (not shown). For example, a job assignment flag is set to indicate whether machine scheduling was successful, and the machine identifier, index, Assigned Start Time (AST) and Assigned End Time (AET) for the work order are recorded (if scheduling was successful).

Figure 9C:
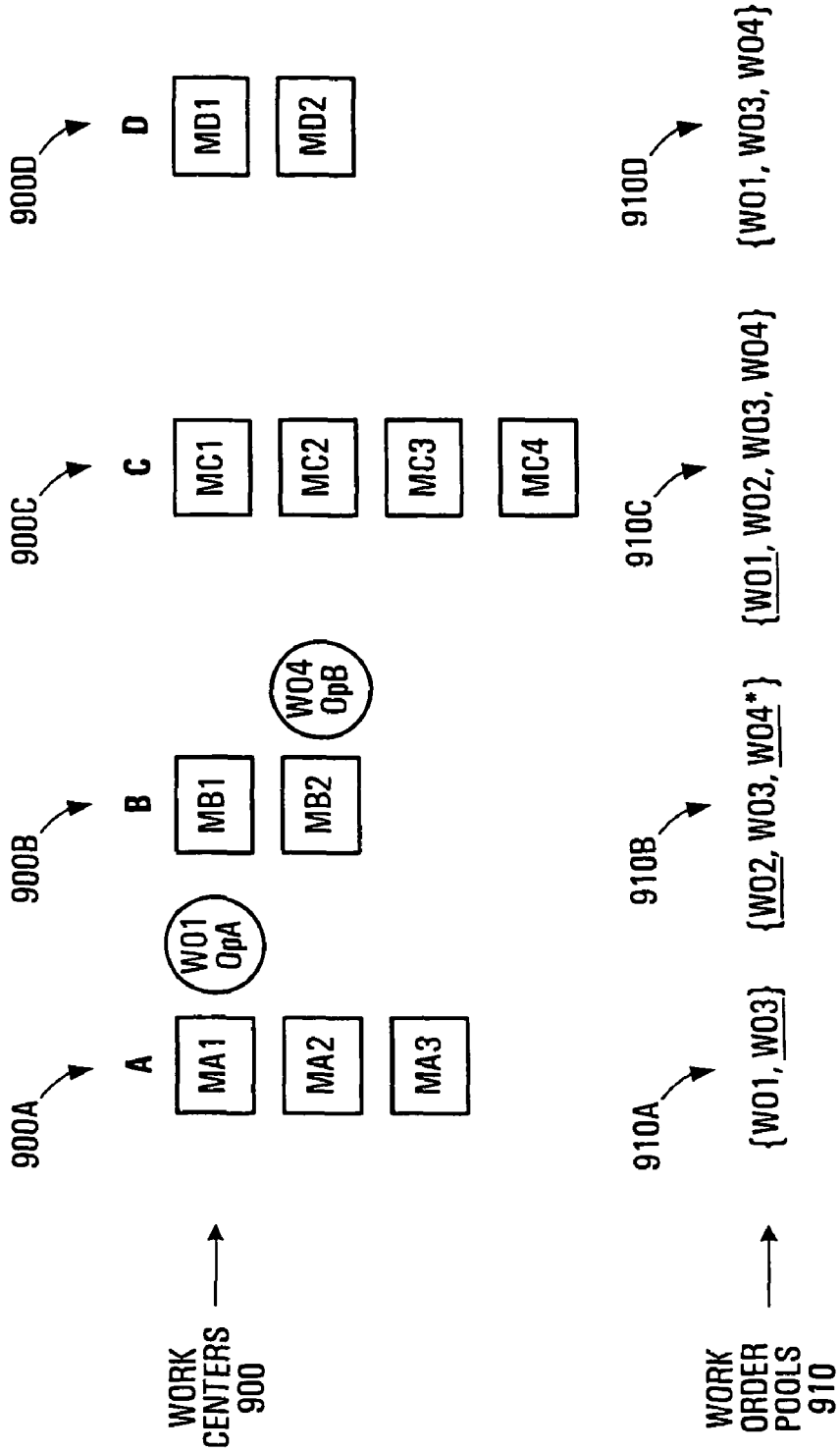

In the present example, it is determined that scheduling was in fact successful (S816). This is shown in FIG. 9B by the illustration of operation "WO1-OpA" proximate to machine MA1, which indicates that operation A of work order WO1 was successfully scheduled for execution at machine MA1 of work center 900A. Successful scheduling of the first operation of WO1 is also indicated in FIG. 9C by the check mark over the identifier "WO1" in work order pool 910A.

Next, it is determined that the highest priority starting candidate work order WO1 does in fact have a succeeding operation OpC to the just-scheduled operation OpA (S820). Accordingly, work order WO1 is deemed to be a candidate for machine selection at the work center associated with the succeeding operation (S824). This is indicated by the underlining of the identifier "WO1" in work order pool 910C. Note that work order WO1 is no longer a candidate in work order pool 910A, as reflected by the fact that the identifier "WO1" is no longer underlined in FIG. 9C.

If the backward scheduling methodology had been operative rather than the forward scheduling methodology, the highest priority work order would have been deemed to be a candidate for machine selection at the work center associated with the preceding (rather than succeeding) operation in S824.

Subsequently, the candidates at the work center associated with the succeeding operation (i.e. work center 900C in the present example) are prioritized. In this case, only work order WO1 is assigned a priority, as it is the only candidate at work center 900C. Note that no reprioritization of priority rankings previously computed for starting candidates at work centers 900A and 900B is performed, as they are unchanged. It is noted that, before WO1 at work center 900C is prioritized, its EST is computed first based on the Assigned Start Time of its preceding operation, i.e. WO1 at work center 900A.

After the re-priortization at work centre 900C all work centers are canvassed in a search for the work centre having the highest priority candidate work order (S826). The prioritization of S826 results in identifying a single work order, namely work order WO4 at work center 900B, as having the highest priority (as indicated by the asterisk in FIG. 9C). Work center 900B is therefore selected in S812.

Figure 9D:
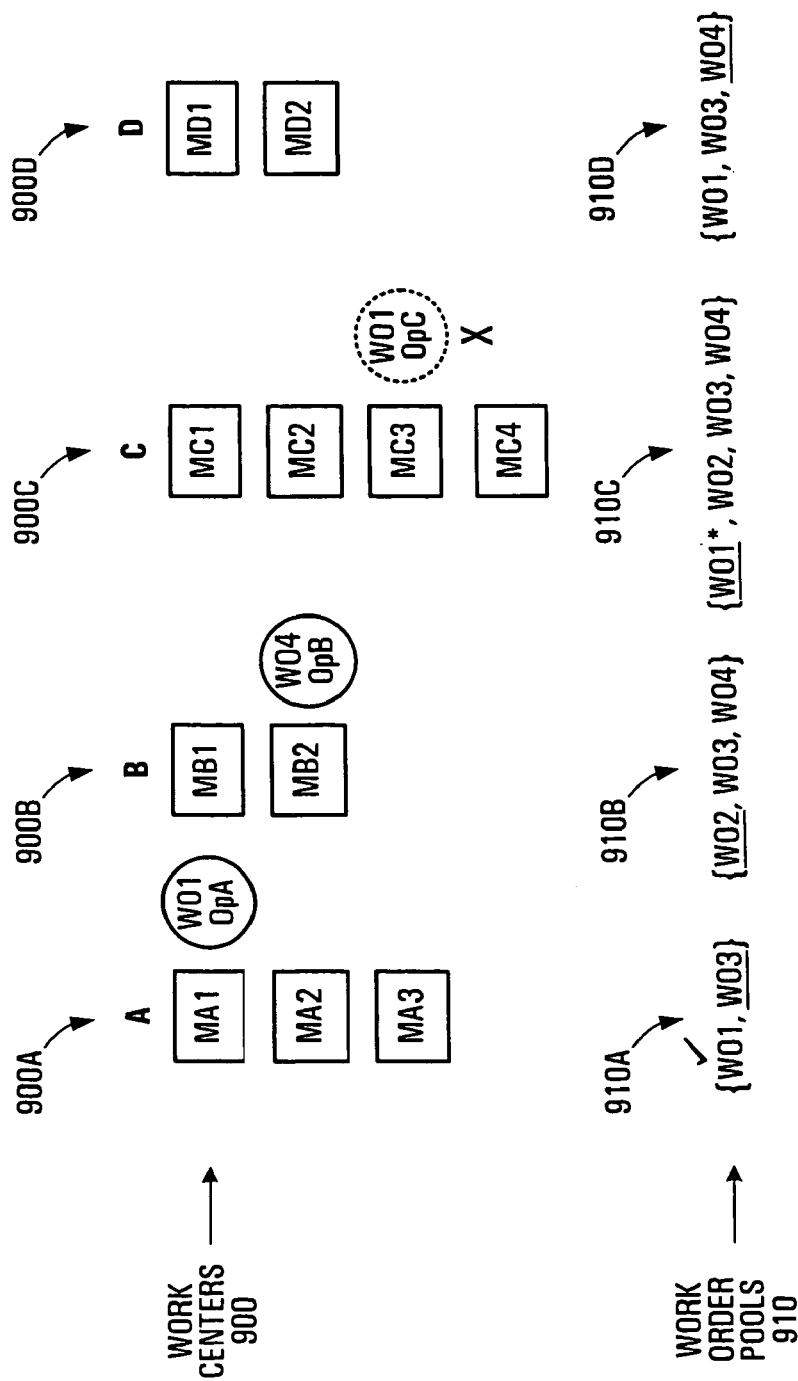

Operation continues with a successful scheduling of operation OpB of work order WO4 at machine MB2 of work center 900B (S814, S815, S816) and with the corresponding deeming of work order WO4 as a candidate for scheduling at work center 900D (indicated by the underlining of WO4 in FIG. 9D).

Figure 9E:
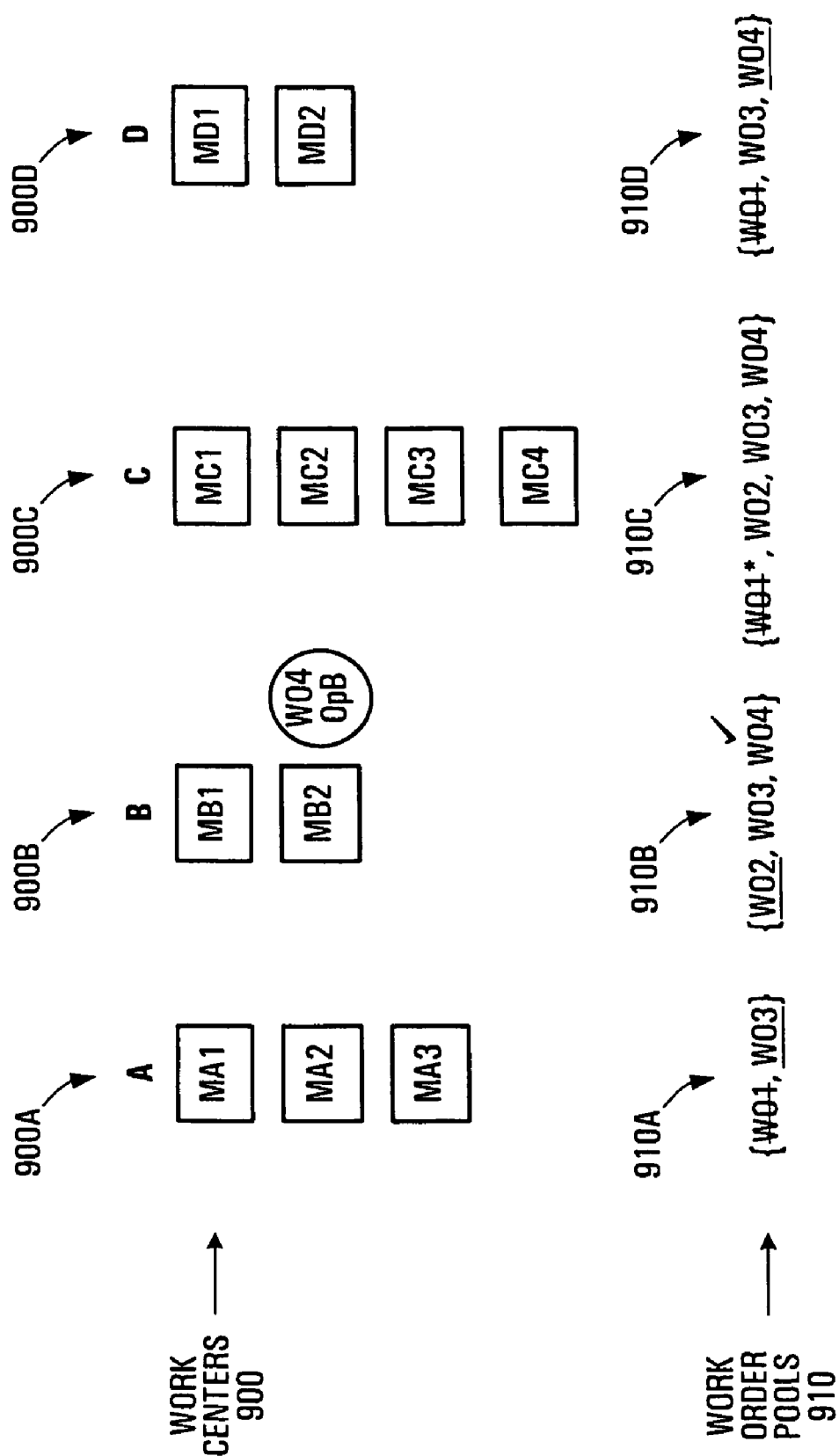

Following prioritization at work center 900D (S826), work order WO1 is found to be the highest priority candidate overall (S826). Accordingly, scheduling of operation OpC of work order WO1 is attempted (S812, S814, S815). However, in this case, machine selection was not successful (S816), as shown in FIG. 9D by the illustration of unscheduled operation "WO1-OpC" in dotted outline. Possible reasons for failed machine selection include a lack of available machines having fixtures or tooling necessary to complete the operation or a lack of operators. Accordingly, the work order WO1 is removed from all work order pools (S818), as shown in FIG. 9E by the strikeout of the identifier "WO1" from each of work order pools 910A, 910C and 910D. This is done because the finished product associated with work order WO1 cannot be manufactured if some of the work order's operations cannot be scheduled. Note that this results in the cancellation of the previously scheduled operation OpA of work order WO1 from machine MA1.

Figure 9F:
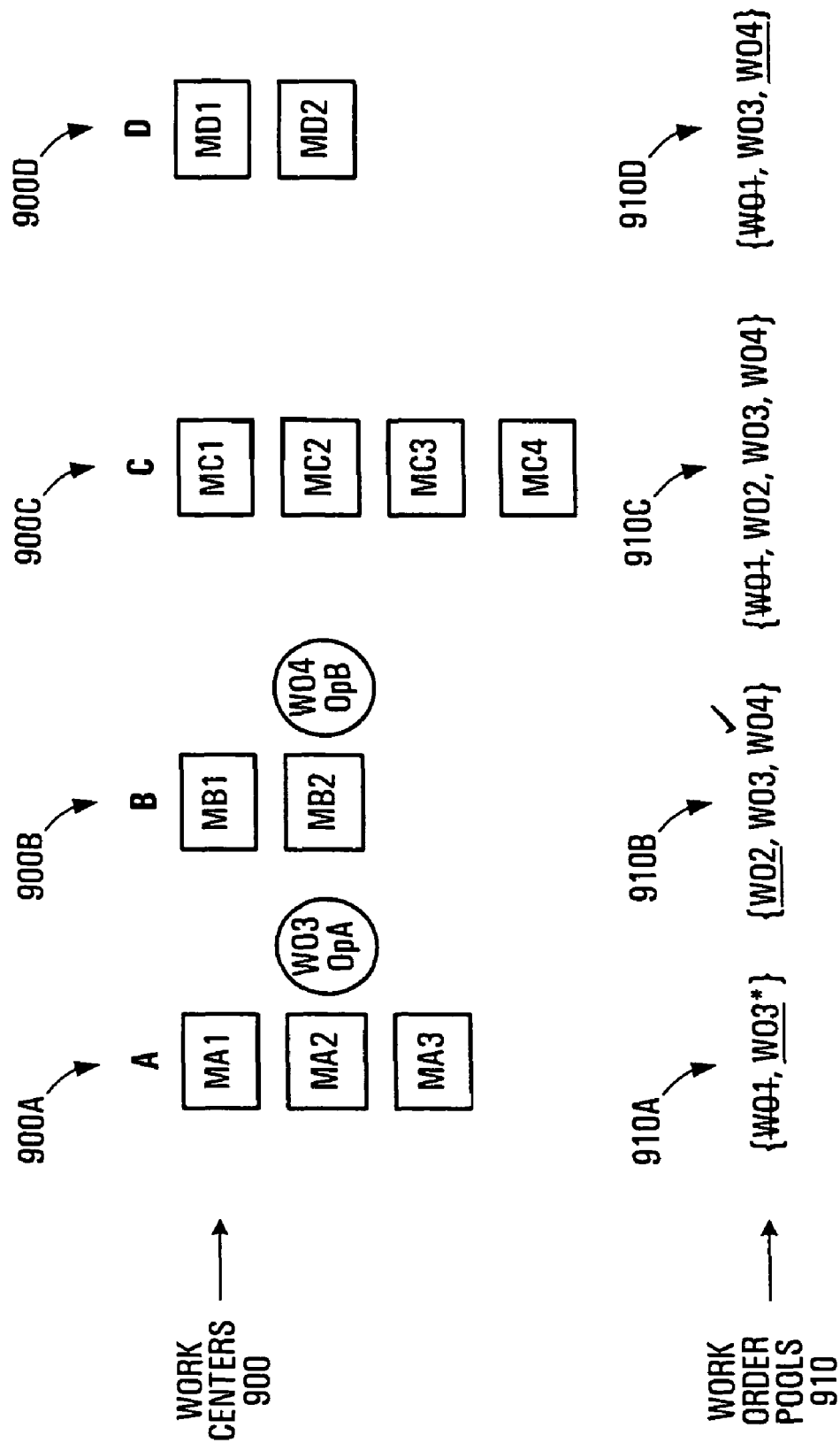
Figure 9G:
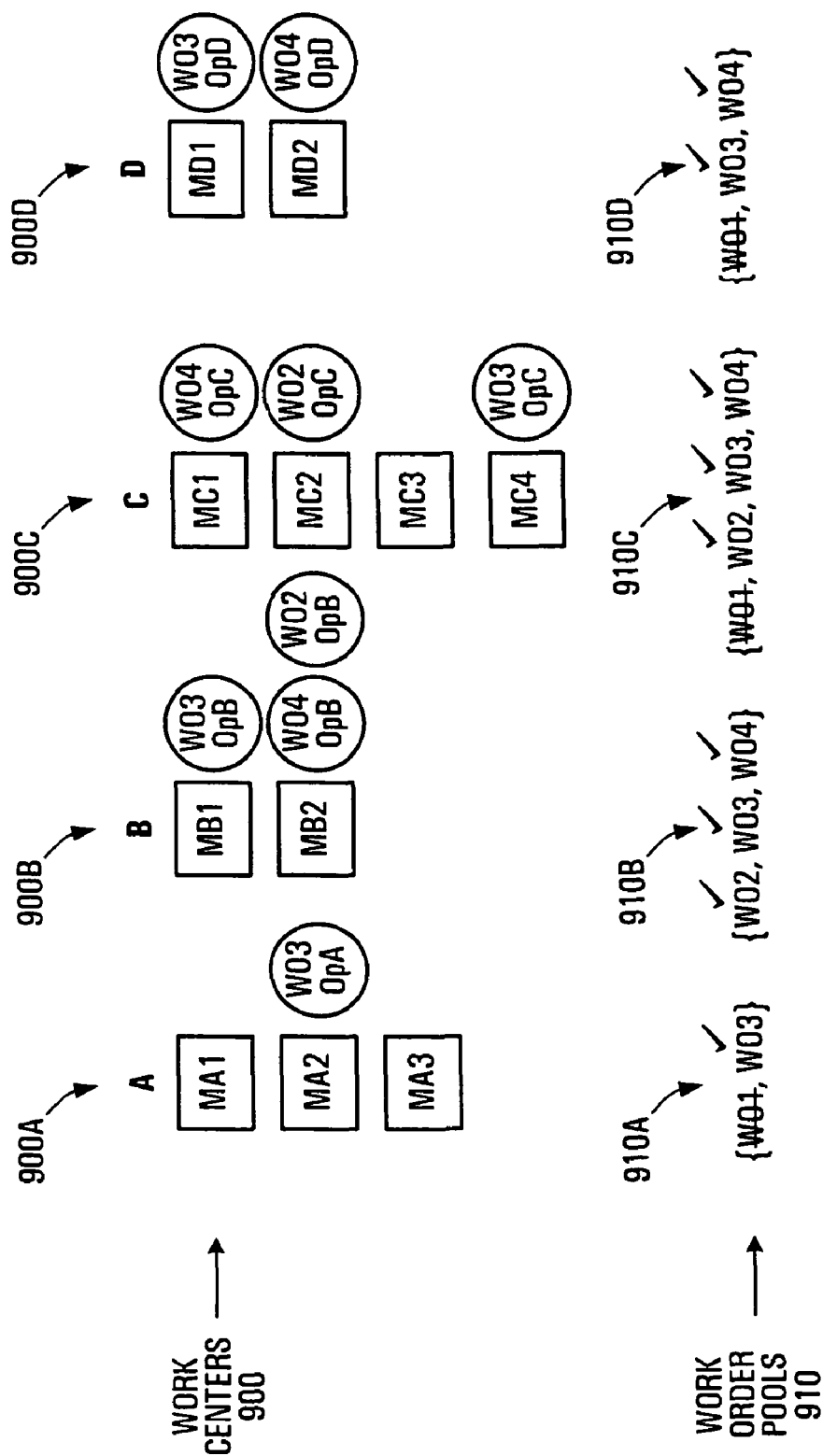

Further processing (S822, S812, S814, S815 and S816) results in the scheduling of operation OpA of work order WO3 at machine MA2 of work center 900A (FIG. 9F). Ultimately each of the remaining unscheduled work order operations are scheduled (FIG. 9G). Operation 800 is thus concluded.

As noted, the computation of EST for operations succeeding the first operation of a work order differs from the computation of EST for the first operation. In the former case, the EST computation utilizes the machine scheduling result of the previously scheduled operation. In particular, the EST computation utilizes the Actual End Time of the previously scheduled operation (in the case where operations cannot be overlapped) or the Actual Start Time of the previously scheduled operation (in the case where overlapping of operations is permitted). The same is true for the computation of LST for operations preceding the last operation of a work order.

It is noted that computation of the EST for operations succeeding the first operation of a work order and computation of LST for operations preceding the last operation of a work order vary depending on the chosen scheduling methodology (forward or backward), the work order processing option (overlapped or non-overlapped operations), and relative magnitude of the production rate between the two adjacent operations, and is affected by operational constraints between the current operation and its succeeding or preceding operation, such as the allowable maximum and minimum buffer stocks, the transit time between the two adjacent operations, and the processing time at the current operation. This is described in greater detail below.

In the forwarding scheduling methodology, the EST and LST of each work order is computed in accordance with the operation sequence specified in the part routing associated with the work order, beginning with the first operation and working through to the last operation. The computation of the EST and LST for a given Operation$_{i+1}$ is based on the assigned start time or assigned end time of the previous Operation$_i$, depending upon whether the operations in the work order are overlapped or non-overlapped.

Figure 12:
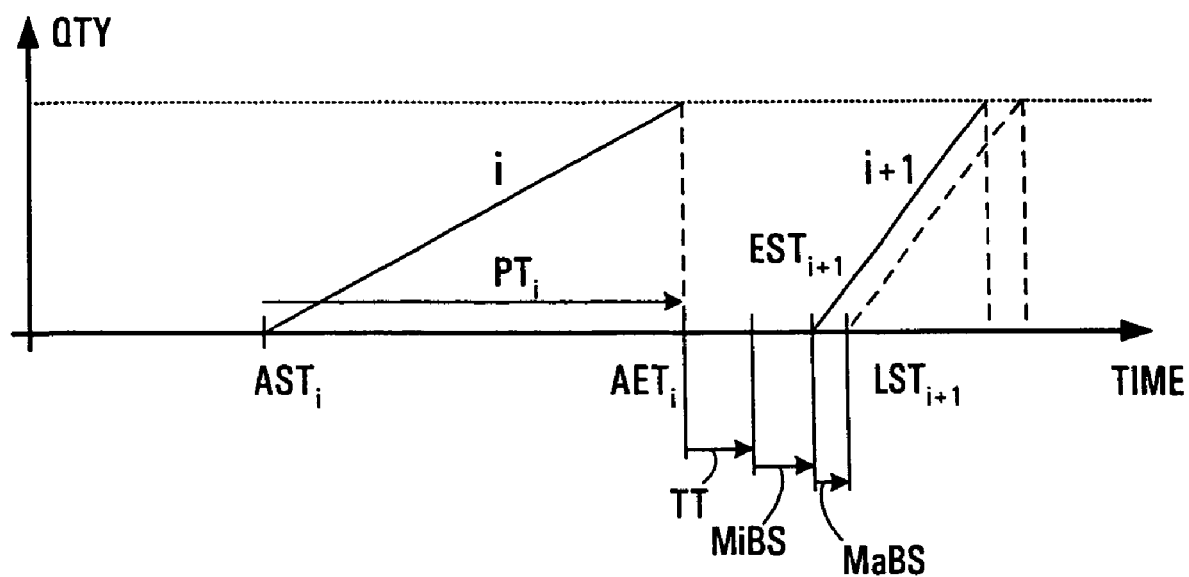
FIG. 12 illustrates the computation of Earliest Start Time (EST) and Latest Start Time (LST) for non-overlapped operations in the forward scheduling methodology.

When operations are non-overlapped, the relative magnitude between the production rates of the two adjacent operations does not affect the EST or LST, as the succeeding operation can only commence upon the completion of the entire work order quantity at the current operation. In this case computation of the EST and LST for a current Operation$_{i+1}$ is based on the assigned end time of the preceding Operation$_i$, as illustrated in FIG. 12 and in the following equations.

$$(EST)_{i+1} = AET_i + TT_i + MiBS_i \quad (2)$$

$$(LST)_{i+1} = AET_i + TT_i + MaBS_i \quad (3)$$

Figure 13A:
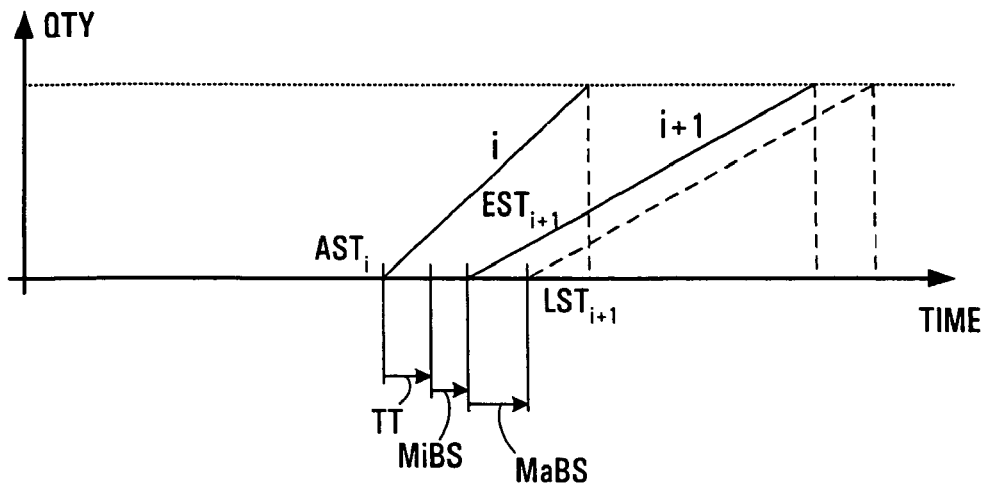
FIGS. 13A and 13B illustrate the computation of EST and LST for overlapped operations in the forward scheduling methodology.
Figure 13B:
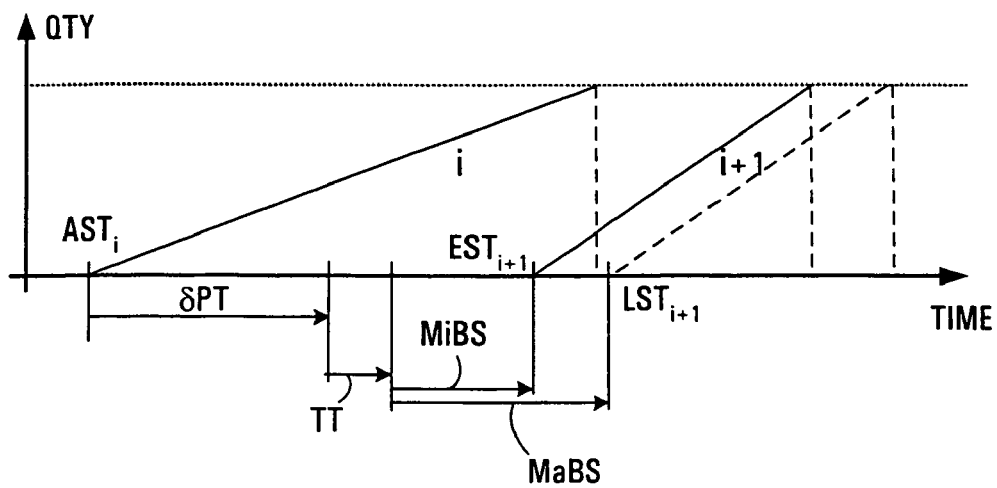

Where:
- $(EST)_{i+1}$: Earliest Start Time for Operation$_{i+1}$
- $(LST)_{i+1}$: Latest Start Time for Operation$_{i+1}$
- AETi: Assigned End Time for Operation$_i$
- TT$_i$: Transit Time from previous Operation$_i$ to current Operation$_{i+1}$
- MiBSi: Minimum Buffer Stock between Operation$_i$ to Operation$_{i+1}$
- MaBS$_i$: Maximum Buffer Stock between Operation$_i$ to Operation$_{i+1}$ In contrast, for overlapped operations, a partial transfer of the work order to the succeeding operation is permitted; it is not necessary to wait for the entire lot to complete the current operation. In such cases, the computation of the EST and LST takes into consideration the difference in production rates between two adjacent operations. FIGS. 13A and 13B depict two possible overlapped operation conditions.

When the production rate of the previous operation$_i$ is greater than the production rate for current operation$_{i+1}$ ("Case A"), the equations for the calculation of the EST and LST are as follows:

$$(EST)_{i+1} = AST_i + TT_i + MiBS_i + URT_i \quad (4)$$

$$(LST)_{i+1} = AST_i + TT_i + MaBS_i + URT_i \quad (5)$$

Where:
- $(EST)_{i+1}$: Earliest Start Time for Operation$_{i+1}$
- $(LST)_{i+1}$: Latest Start Time for Operation$_{i+1}$
- AST$_i$: Assigned Start Time for Operation$_i$
- TT$_i$: Transit Time from previous Operation$_i$ to current Operation$_{i+1}$
- MiBS$_i$: Minimum Buffer Stock between Operation$_i$ to Operation$_{i+1}$
- MaBS$_i$: Maximum Buffer Stock between Operation$_i$ to Operation$_{i+1}$
- URT$_i$: Unit Run Time for Operation$_i$ For clarity, it is noted that URTi represents the time required to complete processing of only a single unit of a work order, as opposed to completing a work order as a whole (i.e. completing a single unit rather than the entire lot).

When the production rate of the previous Operation$_i$ is slower than the current Operation$_{i+1}$ ("Case B"), the difference in the production rates is factored into the EST and LST computation in order to avoid discontinuity of the work order at the current operation. This is captured by the following equations:

$$(EST)_{i+1} = AST_i + TT_i + MiBS_i + \partial PT + URT_i \quad (6)$$

$$(LST)_{i+1} = AST_i + TT_i + MaBS_i + \partial PT + URT_i \quad (7)$$

Where:
- $(EST)_{i+1}$: Earliest Start Time for Operation$_{i+1}$
- $(LST)_{i+1}$: Latest Start Time for Operation$_{i+1}$
- ASTi: Assigned Start Time for Operation$_i$
- TT$_i$: Transit Time from previous Operation$_i$ to current Operation$_{i+1}$
- MiBS$_i$: Minimum Buffer Stock between Operation$_i$ to Operation$_{i+1}$
- MaBS$_i$: Maximum Buffer Stock between Operation$_i$ to Operation$_{i+1}$
- URTi: Unit Run Time for Operation$_i$
- $\partial PT$: Processing Time$_i$—Processing Time$_{i+1}$ For both the overlapped operations scenarios (i.e. Cases A and B), when the processing times (PT$_i$) is less than the specified minimum buffer stock between operation$_i$ to operation$_{i+1}$ (MiBS$_i$), the value of the MiBS$_i$ in the EST and LST equations should be substituted by PT$_i$. This scenario could happen when the production rate for Operation$_i$ is too high or the work order quantity is too low. For clarity, it is noted that PT$_i$ represents the time required to process an entire work order (as opposed to just one unit of the lot) at the previous operation. Of course, if the production rate of the previous operation is the same as the production rate for the current operation, either equation (4) or (6) may be used since equation (6) is the same as equation (4) when $\partial PT$ is equal to zero.

In the backward scheduling methodology, the calculation of EST and LST for a work order is similar to the computation of EST and LST in the forward scheduling methodology, except that the order in which individual operations are examined is reversed: rather than beginning with the first operation and working through to the last operation, computation of EST and LST starts at the last operation of the work order and works through to the first operation. The computation of the EST and LST for a given preceding Operations is based on the assigned start time of the current Operation$_{i+1}$, with the details of the computation being depending upon whether the operations in the work order are overlapped or non-overlapped.

Figure 14:
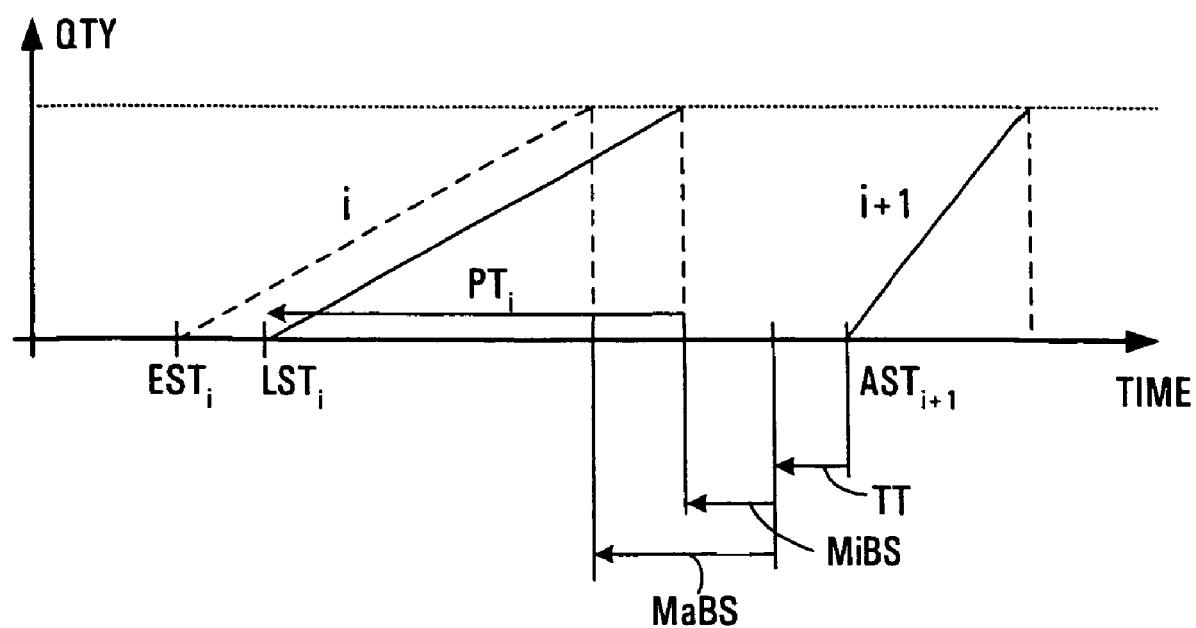
FIG. 14 illustrates the computation of EST and LST for non-overlapped operations in the backward scheduling methodology.

In the case of non-overlapped operations, the relative magnitude between the production rates of the two adjacent operations does not affect the formulation of the EST and LST, as the preceding operation can only commence upon the completion of the entire work order quantity at the current operation. The computation of the EST and LST for the preceding Operation$_i$ is based on the succeeding current Operation$_{i+1}$ as illustrated in FIG. 14.

In the backward scheduling methodology, non-overlapped case, the EST and LST are computed as shown in the following equations:

$$(EST)_i = AST_{i+1} - TT_i - MaBS_i - PT_i \quad (8)$$

$$(LST)_i = AST_{i+1} - TT_i - MiBS_i - PT_i \quad (9)$$

Figure 15A:
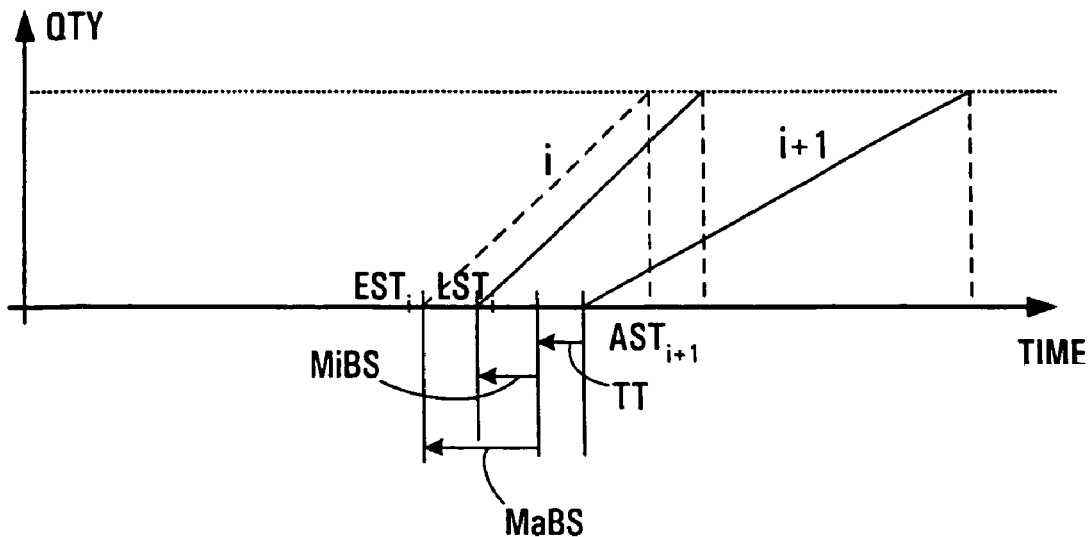
FIGS. 15A and 15B illustrate the computation of EST and LST for overlapped operations in the backward scheduling methodology.
Figure 15B:
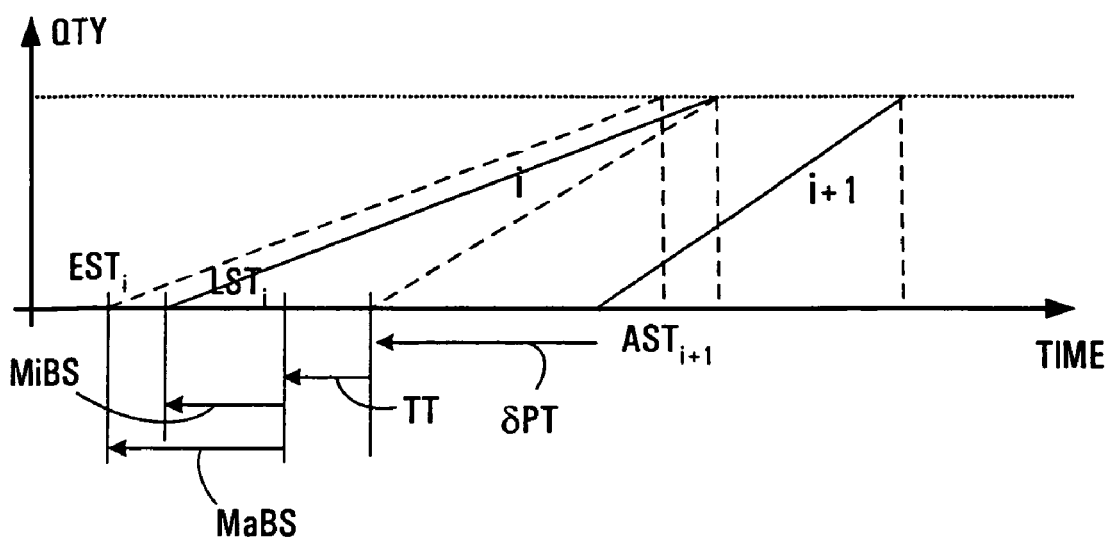

Where:
- $(EST)_i$: Earliest Start Time for Operation$_i$
- $(LST)_i$: Latest Start Time for Operation$_i$
- AST$_{i+1}$: Assigned Start Time for Operation$_{i+1}$ TT$_i$: Transit Time from current Operation$_{i+1}$ to preceding Operation$_i$ MiBS$_i$: Minimum Buffer Stock between Operation$_i$ to Operation$_{i+1}$ MaBS$_i$: Maximum Buffer Stock between Operation$_i$ to Operation$_{i+1}$ PT$_i$: Processing Time at Operation$_i$ In contrast, when the operations have been specified by the user to be overlapped, EST and LST are computed as illustrated in FIGS. 15A and 15B.

The equations for computing EST and LST are dependent on whether the production rate of the current Operation$_{i+1}$ is less than or greater than the production rate of the preceding Operation$_i$.

When the production rate of the current Operation$_{i+1}$ is slower than the production rate of the previous Operation$_i$ ("Case A"), the equations for the calculation of the EST and LST are as follows:

$$(EST)_i = AST_{i+1} - TT_i - MaBS_i - URT_i \quad (10)$$

$$(LST)_i = AST_{i+1} - TT_i - MiBS_i - URT_i \quad (11)$$

Where:

(EST)$_i$: Earliest Start Time for Operation$_i$ (LST)$_i$: Latest Start Time for Operation$_i$ AST$_{i+1}$: Assigned Start Time for Operation$_{i+1}$ TT$_i$: Transit Time from preceding Operation$_i$ to current Operation$_{i+1}$ MiBS$_i$: Minimum Buffer Stock between Operation$_i$ to Operation$_{i+1}$ MaBS$_i$: Maximum Buffer Stock between Operation$_i$ to Operation$_{i+1}$ URT$_i$: Unit Run Time for Operation$_i$ When the production rate of the current Operation$_{i+1}$ is faster than that of the preceding Operation$_i$ ("Case B"), the difference in the production rates is factored into the EST and LST computation in order to avoid discontinuity of the work order at the preceding operation, as follows:

$$(EST)_i = AST_{i+1} - TT_i - MaBS_i - \partial PT - URT_i \quad (12)$$

$$(LST)_i = AST_{i+1} - TT_i - MiBS_i - \partial PT - URT_i \quad (13)$$

Where:

(EST)$_i$: Earliest Start Time for Operation$_i$ (LST)$_i$: Latest Start Time for Operation$_i$ AST$_{i+1}$: Assigned Start Time for Operation$_{i+1}$ TT$_i$: Transit Time from preceding Operation$_i$ to current Operation$_{i+1}$ MiBS$_i$: Minimum Buffer Stock between Operation$_i$ to Operation$_{i+1}$ MaBS$_i$: Maximum Buffer Stock between Operation$_i$ to Operation$_{i+1}$ URT$_i$: Unit Run Time for Operation$_i$ ∂PT: Processing Time$_i$—Processing Time$_{i+1}$ As in the forward scheduling methodology, regardless of whether the production rate of the current Operation$_{i+1}$ is faster or slower than that of the preceding Operation$_i$, when the processing times (PT$_i$) is less than the specified minimum buffer stock between Operation$_i$ to Operation$_{i+1}$ (MiBS$_i$), the value of the MiBS$_i$ in the EST and LST formulae should be substituted by PT$_i$. This scenario could happen when the production rate for Operation$_i$ is too high or the work order quantity is too low.

Figure 16:
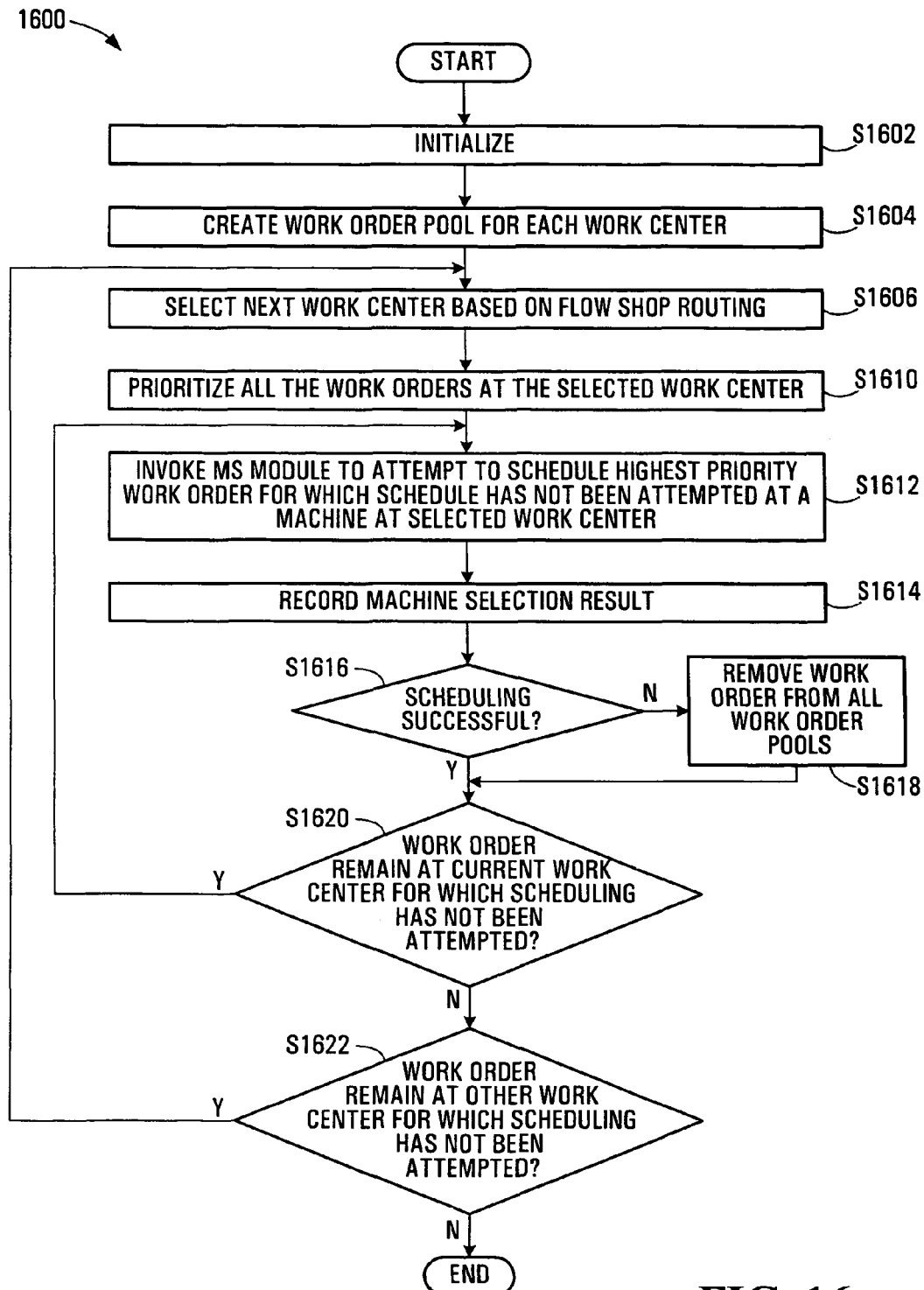
FIG. 16 is a flowchart illustrating operation of the scheduling system of FIG. 2 for scheduling work orders according to the flow shop model.

Referring to FIG. 16, operation 1600 of the JP Module 102 for scheduling work orders according to the flow shop model is illustrated. Operation 1600 is executed once per scheduling run and is applicable for either of the forward or backward scheduling methodologies.

As will be appreciated, the Job Prioritization procedure for the flow shop model is less complex than the Job Prioritization procedure for the job shop model due to the fact that each work order to be scheduled in a flow shop model scheduling task entails the same operations in the same sequence (barring any skipped operations).

Similar to the job shop model operation 800 described above, operation 1600 begins with initialization and memory allocation of JP data structure, flags, parameters, and the like in the Scheduling Data Cache 106 (S1602) and with the subsequent creation of a work order pool for each work center (S1604).

In the flow shop model, there is no need to search for starting candidates as was done in the job shop model given that each work order starts with the same operation. Instead, work order operations are scheduled work center by work center, starting from the work center associated with the first operation and ending at the work center associated with the last operation (assuming the forward scheduling methodology is operative; if backward scheduling is operative, the order is reversed).

Accordingly, the next work center is selected based on the global flow shop routing (S1606), and all of the work orders at the selected work center are prioritized (S1610). Job prioritization involves computation of EST and LST for each work order, with the computation of EST and LST again being different for the first/last operation of each work order than for the remaining operations, as described above in association with the job shop model. Slack Time and Total Operation Time Remaining may be computed, e.g., in the event that the JP rules 'Smallest Slack Time Available', or 'Largest Total Operation Time Remaining' are operative.

Thereafter, the MS Module 104 is invoked in an attempt to schedule the highest priority work order for which scheduling has not yet been attempted (S1612). Machine selection is performed by the MS Module 104 as described in greater detail below. Following the attempt at machine selection, the machine selection result is communicated to the JP Module 102 and recorded (S1614) within the center-work order data structure (not shown).

If scheduling is found to have been unsuccessful (S1616), e.g. because no machine suitable for completing the work order operation was available, the work order is removed from all work order pools (S1618). The rationale for this removal is the same as for the job shop model.

The process is repeated for the remaining unscheduled work orders of the current work center (S1620) and the other work centers (S1622). Operation 1600 terminates when no further work orders remain at any work center for which scheduling has not been attempted.

Figure 17:
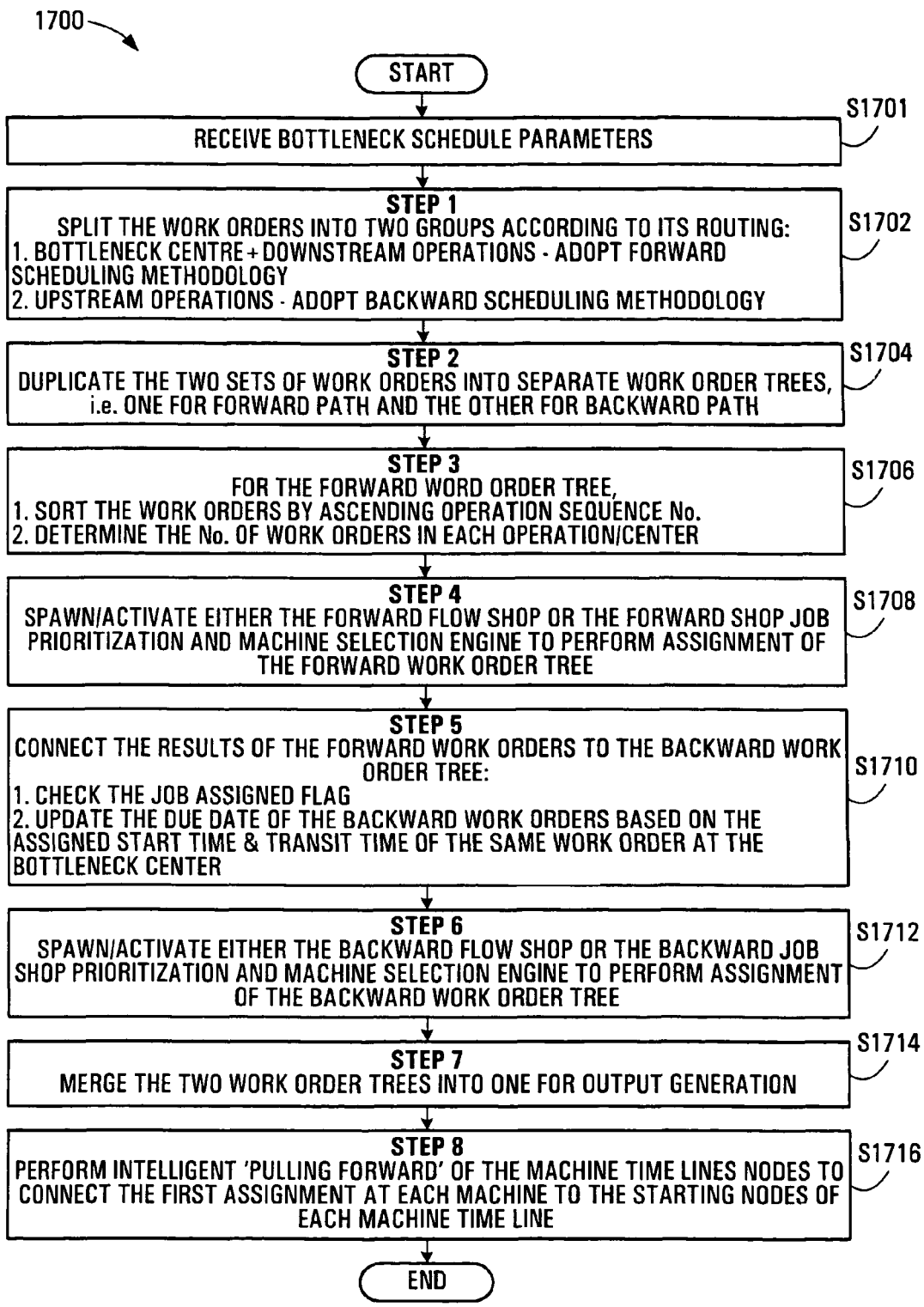
FIG. 17 is a flowchart illustrating operation of the scheduling system of FIG. 2 for scheduling work orders according to the bottleneck model.

Referring to FIG. 17, operation 1700 of the JP Module 102 for scheduling work orders according to the bottleneck scheduling methodology is illustrated. The bottleneck scheduling methodology may be chosen where a bottleneck operation exists in the production environment. A bottleneck operation is an operation whose capacity is less than the demand placed upon it. For example, a bottleneck machine or work center exists where jobs are processed at a slower rate than they are demanded. In the bottleneck scheduling model, work orders at the bottleneck operation are scheduled first to ensure that the throughput at the bottleneck operation is maximized; thereafter, the remaining work orders are scheduled either before or after the bottleneck operation, depending on the sequence of operations relative to the bottleneck operation. Operation 1700 is executed once per scheduling run and is only applicable for the bottleneck scheduling methodology. It is understood that the set of work orders for which the bottleneck scheduling methodology is selected will share a common bottleneck operation.

Figure 18:
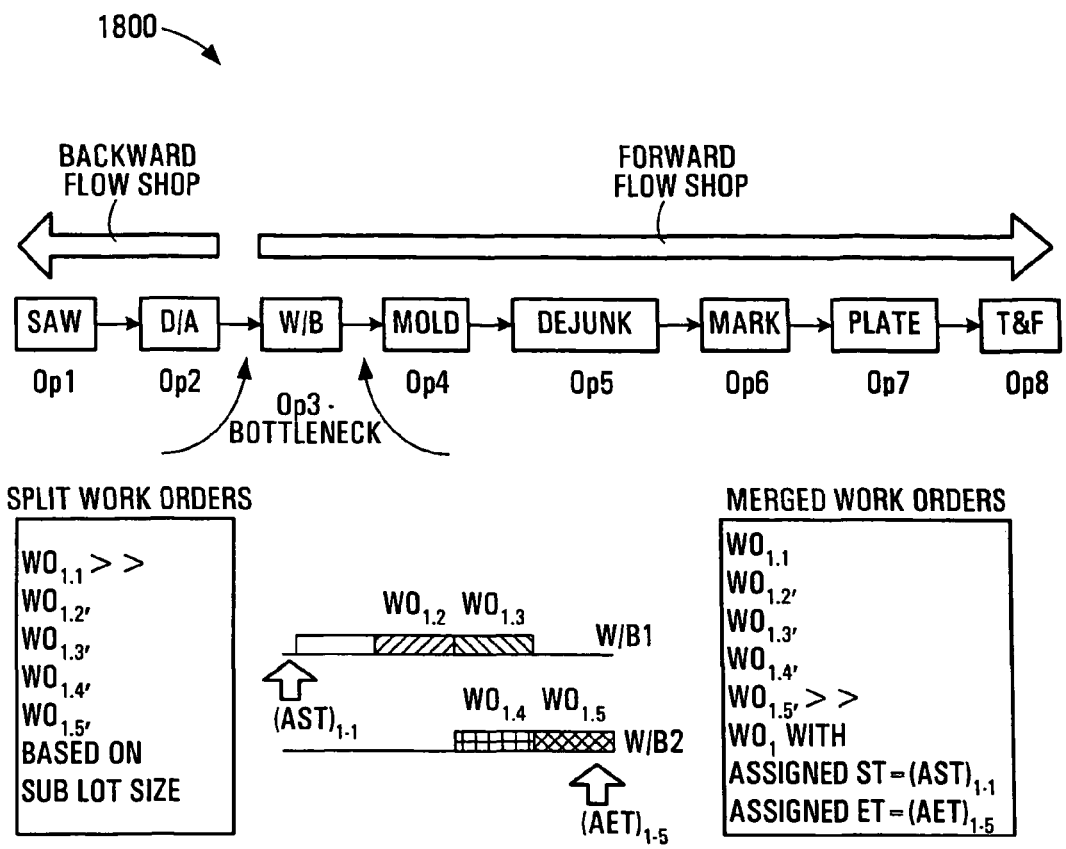
FIG. 18 illustrates the bottleneck scheduling of a scheduling methodology exemplary work order.

For purposes of illustration, the scheduling of a group of work orders each having the same set of operations as work order 1800 (operations Op1 through Op8) of FIG. 18 will be described.

Referring again to FIG. 17, bottleneck scheduling parameters are initially received at the JP module 102 (S1701). These parameters include the user-provided identification of the bottleneck operation (here, operation Op3—see FIG. 18) and a scheduling parameter "Offset Minutes For Bottleneck Operation". The latter parameter is a user-specified lead-time offset that represents the expected cumulative cycle time required for a work order to be processed from its first operation to the bottleneck operation, plus a safety time buffer. During bottleneck scheduling, this offset is added to the computed start date/time of the scheduled bottleneck operation and all subsequent operations to facilitate the scheduling of operations preceding the bottleneck operation within the scheduling time window. The safety time buffer is added to reduce the likelihood of the earliest predecessor operation being inadvertently scheduled to commence before the beginning of the scheduling time window.

Next, work order operations are split into two sets: the first set contains the bottleneck operation and downstream operations, and the second set contains upstream operations, for all work orders (S1702). Downstream operations are those which occur after the bottleneck operation according to the work order routing definition (operations Op4 to Op8 in FIG. 18), while upstream operations are those which occur prior to the bottleneck operation (operations Op1 and Op2). The purpose of this split is to allow the forward scheduling methodology to be used to schedule the operations of the first set with the bottleneck operation and the backward scheduling methodology to be used with the second set.

All the detailed information captured in the global work order tree is duplicated into two separate work order trees: a first work order tree for the forward scheduling path and a second work order tree for the backward scheduling path. This is done to facilitate the forward and backward scheduling paths for the bottleneck scheduling methodology. If, as in the present example, the work orders each have at least one operation in the first set and at least one operation in the second set, the first work order tree and the second work order tree will contain the same group of work orders (i.e. all work orders). In the general case, some degree of overlap typically exists between the group of work orders contained in the first work order tree and the group of work orders contained in the second work order tree, but identity between the groups will not necessarily occur.

For the forward work order tree, the work orders are sorted by ascending operation sequence number, and the number of work orders in each operation is determined for the purposes of memory allocation, use as counters in the for-next loops, etc. (S1706). Depending upon the routing variability among the bottleneck and the downstream operations, either the forward flow shop model or forward job shop model will be activated to perform the job prioritization and machine selection for the work orders in the forward work order tree, starting from the bottleneck operation (S1708).

Upon the successful completion of forward scheduling for the first set of work order operations, the machine selection result at the bottleneck operation is 'linked' to the first operation (Op2) of the backward scheduling path. That is, the machine assignment result for the bottleneck operation is updated to its preceding operation, to ensure continuity between adjacent operations. For each work order that has been successfully scheduled for execution at a machine in the forward scheduling path, the 'Due Date' of the last (i.e. latest) operation of that work order in the backward scheduling path is updated based on the following equation:

$$(DD_i)_{j-1} = (AST_i)_j + TT_j \quad (14)$$

Where:
- $(DD_i)_{j-1}$: Due Date for work order i at the upstream operation j-1
- $(AST_i)_j$: Assigned Start Time for work order i at the bottleneck operation j
- $TT_j$: Transit Time between upstream operation j-1 and the bottleneck operation j Backward flow shop or job shop scheduling is then activated to perform job prioritization and machine selection for all the work orders in the backward work order tree (S1712). When this is completed, both the work order trees are merged to facilitate output of the resultant schedule to the user (S1714).

Figure 19:
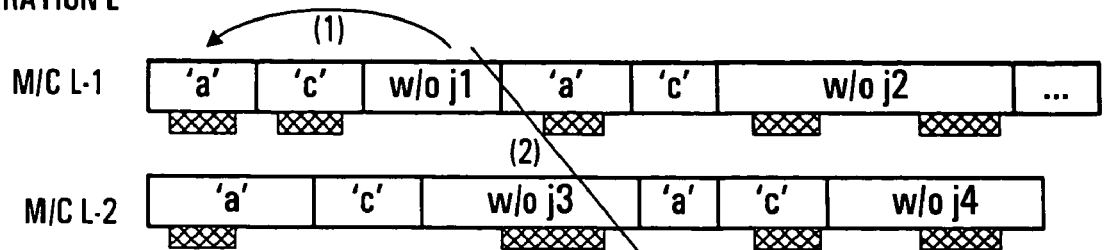
FIG. 19 illustrates gaps in machine schedules which may result from bottleneck scheduling.
Figure 19:
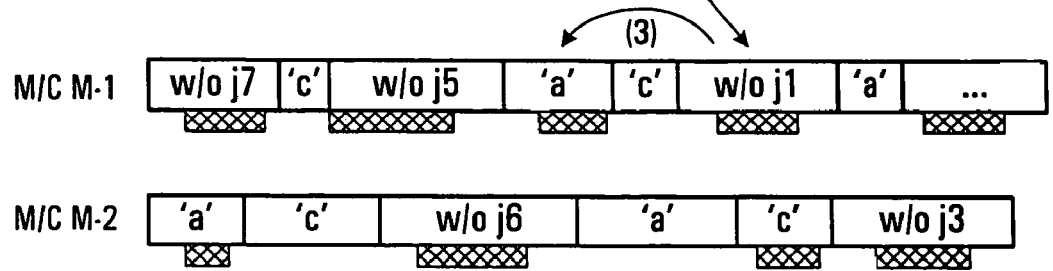

In the event that the user-specified "Offset Minutes For Bottleneck Operation" parameter was initially set too high, a gap of unused machine time may exist between the start time of the scheduling horizon and the scheduled commencement of the first scheduled operation for each machine, as illustrated in FIG. 19. Putting it another way, unused machine time may be available prior to the Actual Start Time assigned during machine selection and after the Earliest Start Time at which the first operation could be commenced. In such cases, a pegged orders forward displacement mechanism is activated to "pull forward" the first operation in the schedule and all subsequent operations (S1716).

Figure 20:
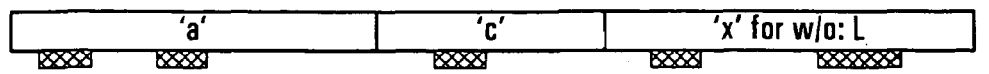
FIG. 20 illustrates the pegged orders forward displacement mechanism which may be used to eliminate gaps in machine schedules.
Figure 20:
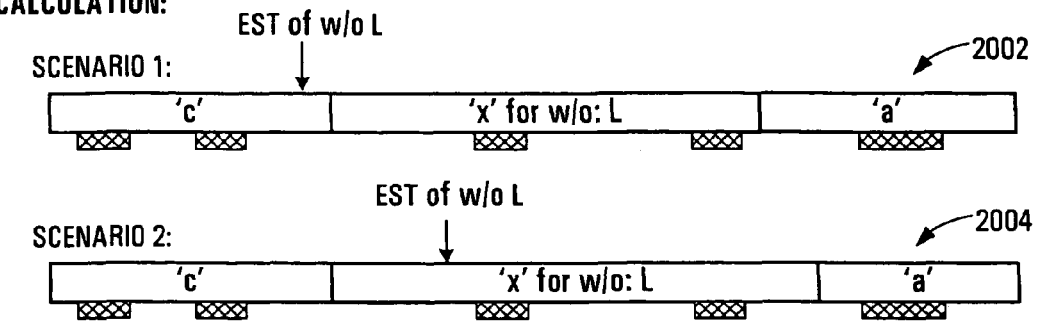
Figure 20:
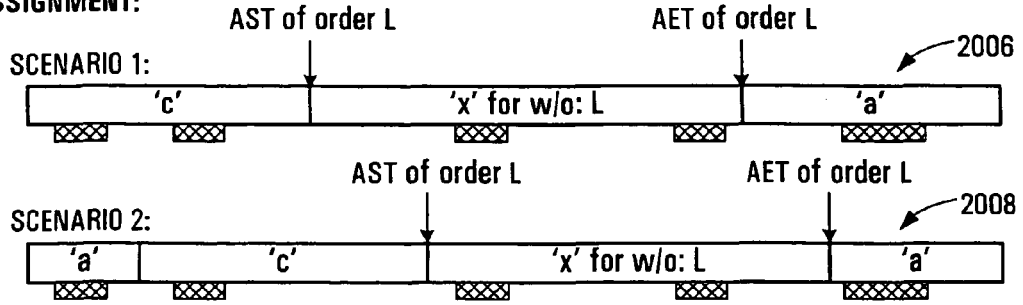

Manipulation of the machine schedules according to the pegged orders forward displacement mechanism is illustrated in FIG. 20. The initial machine schedule 2000 is broken into three time periods labelled 'a', 'c' and "'x' for w/o: L". The 'a' time period represents available (i.e. unused) machine time. The 'c' time period represents a changeover time period, i.e., the time required prior to the execution of a work order in order to prepare the relevant machine for processing the order (e.g. it may be necessary to "change over" fixtures and tooling at the machine). The "'x' for w/o: L" time period represents a scheduled operation of work order L at the relevant machine.

Initially, the pegged orders forward displacement mechanism sets the changeover time period 'c' to start at the beginning of the scheduling time window, since it is known that changeover will always be required prior to execution of the relevant operation of work order L.

Thereafter, the extent to which the scheduled operation of work order L can be pulled forward (that is, the extent to which the Actual Start Time for the relevant operation of work order L $(AST_L)$ can be made earlier in time) depends upon the Earliest Start Time for the operation $(EST)_L$ (which was computed during job prioritization at S808 of FIG. 8 or S1610 of FIG. 16) and the Changeover End Time (CET). In particular, $(AST)_L$ can be adjusted to the later of the $(EST)_L$ and the CET, with the proviso that $(EST)_L$ will be shifted back in time to the Earliest Available Time of necessary resources for work order L $((EAT)_L)$ if $(EST)_L$ was initially earlier than the $(EAT)_L$. This is summarized in the below equations:

$$(AST)_L = CET \text{ If } (EST)_L <= CET \quad (15)$$

$$(AST)_L = (EST)_L \text{ If } (EST)_L > CET \quad (16)$$

$$(EST)_L = (EAT)_L \text{ If } (EST)_L < (EAT)_L \quad (17)$$

Where:
- $(AST)_L$: Assigned Start Time for the current operation of work order L
- CET: Changeover End Time, i.e. end of the changeover time period 'c'
- $(EST)_L$: Earliest Start Time for the current operation of work order L (as computed during job prioritization)
- $(EAT)_L$: Earliest Available Time for optional resources, including fixture & tooling, material, and/or operator In FIG. 20, the scenario of equation (15) is illustrated at 2002 and 2006, and the scenario of equation (16) is illustrated at 2004 and 2008. In respect of the latter, it is noted that the 'a' and 'c' time periods are swapped to promote possible use of the 'a' node for other work orders.

If forward displacement of the first operation is successful, the newly Assigned End Time of the first operation work order L $(AET)_L$ is recorded and used for the calculation of the EST for succeeding operations. This is repeated until all the eligible work orders have been forwardly displaced.

Figure 21:
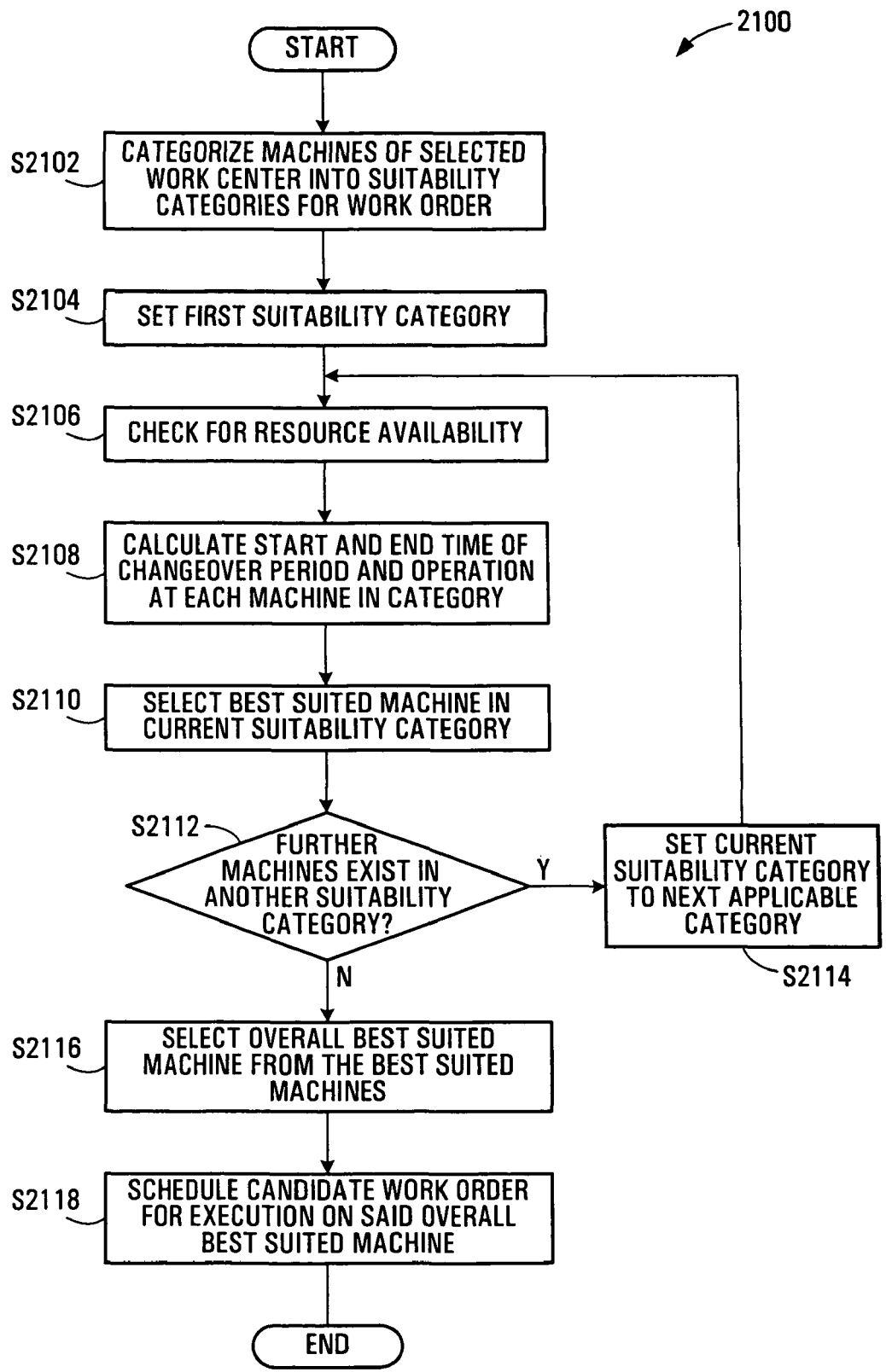
FIG. 21 is a flowchart illustrating operation for machine selection by the scheduling system of FIG. 2.

Referring to FIG. 21, operation 2100 of the MS Module 104 for attempting to schedule a work order operation for execution at a work center is illustrated. As described above, machine selection attempts to find, from among the machines at a specified work center, the machine that is best suited of the available machines for performing the desired operation. Operation 2100 may be invoked either during job shop model scheduling (see S814 of FIG. 8), flow shop scheduling (S1612 of FIG. 16), or bottleneck scheduling (in the context of either of the job shop or flow shop model scheduling which is performed during bottleneck scheduling). It will be appreciated that operation 2100 is executed multiple times per scheduling run.

Initially, the machines of the selected work center are categorized into suitability categories based on the suitability of each machine for completing the current work order operation (S2102). In the present embodiment, five different suitability categories exist: (1) Must—identifies machines that must be used for the current work order operation for reasons such as better throughput, tooling constraints, quality issues, and the like (more than one machine may be in this category for a particular work order operation); (2) Dedicated Preferred (DP)—identifies machines that, although not mandatory, are preferred for completing the current work order operation; (3) Shared Preferred (SP)—identifies machines that are preferred for completing the current work order operation but not as preferable as DP machines; (4) No-Preference (NP)—identifies machines that can be used to complete the current work order operation but should only be used if no DP or SP machines are available; and (5) Must Not—identifies machines that must not be used for the current work order operation. A preferred suitability category (e.g. DP) is referred to as being "more suitable" or as having a "greater suitability" than a less preferred suitability category (e.g. SP or NP).

Based on the categorization of machines, a first machine suitability category into which at least one machine has been categorized is set (S2104). Next, the availability of resources necessary for completing the current work order operation at each machine in the selected category is checked (S2106). Necessary resources typically include material, fixtures and tooling, and operator resources. The earliest available time (EAT) of each resource needed by the operation is determined, and the EAT for resources overall is set to the latest of these times, as described below.

The primary consideration in determining the EAT for material (EATM) is whether sufficient quantities of the material(s) necessary for completing the operation are available. Two types of quantities are considered: inventorized quantities and scheduled receipt quantities. Inventorized quantities are quantities of material immediately available in inventory at the stock location. Scheduled receipt quantities are quantities of material which are due to be received within a predetermined time period. The latter quantities of material can be used to complete a work order operation if the Assigned Start Time of the operation is equal to or later than the scheduled material receipt date.

At the beginning of each scheduling run, the system will retrieve the latest inventory status to ensure that any schedule that is generated will be based on real time material availability status. The calculation of earliest available time of material is based on the following equation.

$$EATM_i = d_{in} \qquad (18)$$

Subject to:

$$\sum_{j=0}^{n} q_{ij} \geq Q_i \qquad (19)$$

$$0 \leq n \leq m_i$$

Where:

$EATM_i$: Earliest available time of material $i$ while satisfying the quantity requirement.

$d_{i0}$: Inventory available time of material $i$.

$d_{ij}$: Scheduled $jth$ arrival time of material $i$.

$q_{i0}$: Currently inventorized quantity of material $i$.

$q_{ij}$: Scheduled quantity of $jth$ arrival of material $i$.

$Q_i$: Required quantity of material $i$ by current operation.

$m_i$: Number of scheduled arrivals of material $i$

The EAT for fixtures and tooling (EATF) is simply the earliest time at which a fixture or tooling necessary for completing the current work order operation is available.

When a work order is being completed on a machine, the associated fixture is unavailable from the start time to the end time of the work order operation. Thereafter, the fixture is released and returned back to the fixture pool. The MS module 104 will wait until the required fixture is released in case the required fixture has been exhausted from the fixture pool (i.e. the assigned start time of the work order at that operation will be delayed due to fixture unavailability). The equation for determining the earliest available time of a particular fixture is follows:

$$EATF_i = \min(r_{ij}) \qquad (20)$$

Where:
- $EATF_i$: Earliest available time of a fixture in fixture group $i$.
- $r_{ij}$: Release time of jth fixture of fixture group i.
- $r_{i0}$: Available time of any fixture of fixture group i in fixture pool.

The EAT for operators (EATO) may be based on the availability of operators needed for either setup of a machine (to change the fixture or tooling) or for running a machine during execution of the current work order operation. Each operator has a particular skill level, which is usually associated with their experience level. It may be necessary for a machine to be run by an operator who has a certain minimum skill level. It is noted that production rate may be adjusted based on the operator skill level. The equation for determining the earliest available time of a particular operator type is follows:

$$EATO_i = \min(o_{ij}) \quad (21)$$

Where:
- $EATO_i$: Earliest available time of operator satisfying requirement i.
- $o_{ij}$: Release time of jth operator satisfying requirement i.
- $o_{i0}$: Available time of any operator satisfying requirement i.

The EAT of resources for the work order under consideration is simply the maximum among EAT of material, fixture and operator, i.e.

$$EAT = \max(EATM, EATF, EATO) \quad (22)$$

After the availability of resources necessary for completing the current work order operation at each machine in the current suitability category has been checked, the start and end time of the changeover time period and work order operation processing time are determined for each machine in the current suitability category (S2108).

The changeover start and end times are determined based on the part identifiers of the previously scheduled order and current, to-be-scheduled order. Determination of changeover time duration may be simplified by classification of the changeover into one of a number of changeover types, each having an associated changeover time: (i) same part number with zero changeover time; (ii) intra product family changeover group with small changeover time; and (iii) inter product family changeover group with large changeover time. Different industries may warrant the use of a larger number of changeover types based on more detailed, industry-specific criteria. The changeover time is allocated into the earliest available time slot on the machine, assuming forward scheduling (or latest available time slot before the previous work order if backward scheduling). For example, in forward scheduling, if the operation requires a fixture for machine setup, the changeover starts from the EAT of the fixture, or the end time of last assigned order ($AET_{(i-1)j}$), whichever is later.

The work order operation processing time is calculated based on quantity, production rate, efficiency factor of the machine, and learning-in curve (if defined). For backward scheduling, the processing time period will be allocated immediately after the Changeover End Time ($CET_{ij}$), or the Earliest Start Time for the current operation of order L ($EST_i$), or the Earliest Available Time (EAT) of resources, whichever is later. This is illustrated in FIG. 22A. For backward scheduling, the allocation is right before the changeover start time ($CST_{(i-1)j}$), or the order's latest end time ($LET_i$), whichever is earlier, subject to the earliest available time of resources (EAT) required by the work order. This is illustrated in FIG. 22B.

The equation for calculating the processing time of a work order on a machine (in minutes) is as follows:

$$p_{ij} = \frac{60 \times q_i \times EF_j \times LR_{jkm}}{UPH_{ij}} \quad (23)$$

Where:
- $p_{ij}$: Processing time of order i on machine j, in minutes.
- $q_i$: Quantity of order i.
- $EF_j$: Efficiency factor of machine j, $EF_j = [0, 1]$.
- $LR_{jkm}$: Learning-in ratio of team k on machine j while procesing product m, $LR_{jkm} = [0, 1]$.
- $UPH_{ij}$ Unit per hour of order i on machine j, which indicates the number of parts that can be produced by the machine in one hour of time.

The learning-in ratio or "curve" is an optional feature whereby the production efficiency associated with a machine that is being used to process a new product or with an operator whose skill level is improving is taken into consideration during processing time determination. The feature may be turned on/off at the center/operation level. Options which may be additionally specified in association with the learning-in curve include:

Learning-in curve to product relationship: an indicator of the level at which the curve is to be applied. Two levels, product family level and part level, may be defined. If the learning-in curve is defined at product family level, each product family will have its own learning-in curve on each machine. If the learning-in curve is defined at part level, each part will have its own learning-in curve on each machine.

Production team flag: if the flag is on, each operator production team potentially operating a machine will maintain its own learning-in curve. Otherwise, all teams use the same curve.

The attributes of a learning-in curve typically include the following information:

The relationship of the learning-in curve with the product, machine and production team;

Normal output per shift of the product on the machine;

Quantity produced so far;

Definition of the various stages of learning-in curve: the number of product produced identifies each stage in the learning-in curve. For example, the team must produce 100 pieces of a product on a particular machine before entering the second stage and produce another 200 pieces before entering the next stage; and Percentage of output per shift at each stage.

Figure 23:
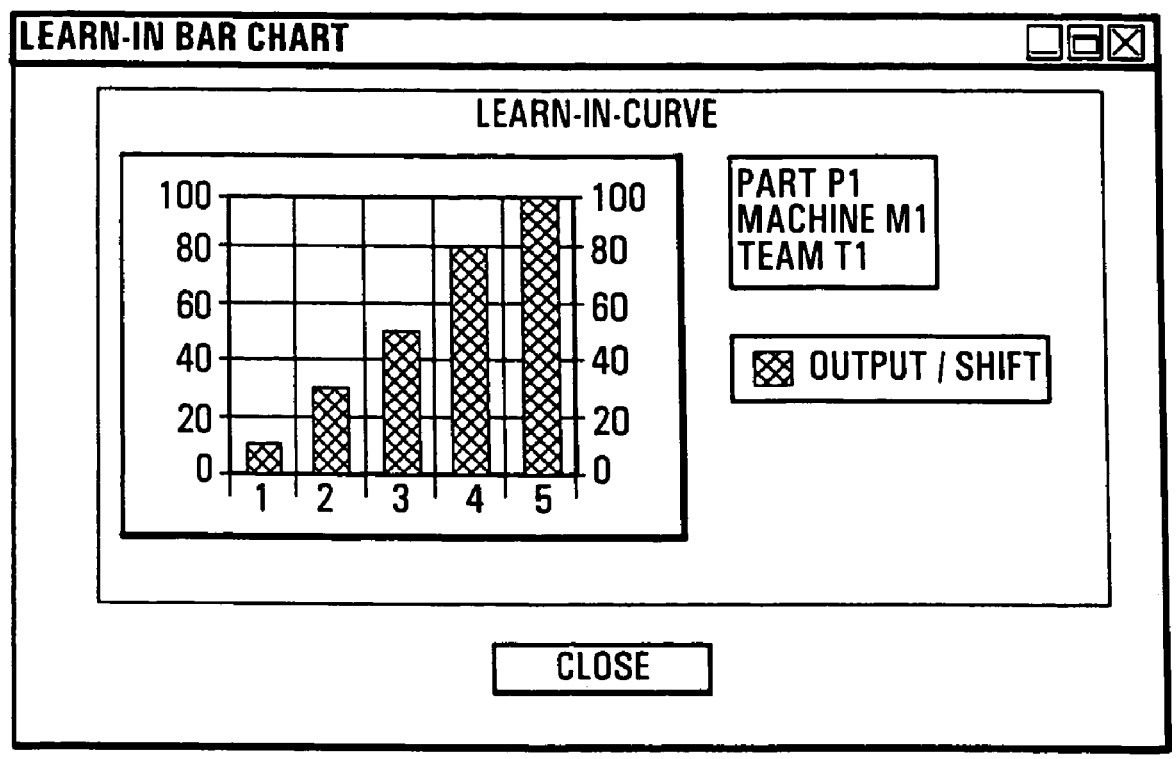
FIG. 23 illustrates a typical learning-in curve for a machine at which a work order may be scheduled.

A typical learning-in curve is depicted in FIG. 23. The curve shows the efficiency (percentage of normal capacity) of machine 'M1' when operated by production team 'T1' to process part 'P1' during various stages of learning. Five stages of learning are illustrated, each having an associated efficiency. For example, if the normal output per shift of part 'P1' on machine 'M1' is 100, then team 'T1' will produce only 10% of that amount (i.e. 10) in the first stage of learning. At the last stage, the percentage of the output per shift is 100. This means that the learning-in process is completed and the normal output rate will take effect as the product is considered to be fully learned-in by the machine and/or production team.

The MS Module 104 also calculates the Actual Start Time and Actual End Time of the work order operation on each machine under consideration during S2108. The manner in which this is done depends upon whether the forward scheduling methodology or the backward scheduling methodology has been chosen. For forward scheduling, the equations for calculating the actual start time and actual end time of a work order are as follows:

$$AST_{ij} = \max(CET_{ij}, EAT, EST_i) \quad (24)$$

Subject to:

$$AST_{ij} \leq LST_i \quad (25)$$

Where:
- $AST_{ij}$: Actual start time of order i on machine j.
- $CET_{ij}$: Changeover end time of order i on machine j.
- EAT: Earliest available time of resources.
- $EST_i$: Earliest start time of order i.
- $LST_i$: Latest start time of order i.

$$AET_{ij} = AST_{ij} + M + B + p_{ij} \quad (26)$$

Where:
- $AET_{ij}$: Actual end time of order i on machine j.
- M: Mealtime.
- B: Block out time.

For backward scheduling, the equations for calculating the actual start time and actual end time of a work order are as follows:

$$AET_{ij} = \min(CST_{(i-1)j}, LET_i) \quad (27)$$

Subject to:

$$AET_{ij} \geq EET_i \quad (28)$$

Where:
- $AET_{ij}$: Actual end time of order i on machine j.
- $CST_{(i-1)j}$: Changeover start time of order i−1 on machine j.
- $LET_i$: Latest end time of order i.
- $EET_i$: Earliest end time of order i.

$$AST_{ij} = AET_{ij} - M - B - p_{ij} \quad (29)$$

Subject to:

$$AST_{ij} \geq EAT \quad (30)$$

Where:
- $AST_{ij}$: Actual start time of order i on machine j.
- M: Mealtime.
- B: Block out time.
- EAT: Earliest available time of resources.

Subsequently, the best suited machine in the current suitability category is selected (S2110). This best suited machine is also referred to as a "candidate" machine.

The currently operative MS Rules and associated MS Rule Control Triggers will govern the selection of a candidate machine. If a single MS Rule is defined, it will be used to identify the candidate. For example, if minimizing the cycle time of the order is the only MS rule, the machine with earliest Actual End Time is chosen. In the present embodiment, the MS rule 'meet due date' is always applied (i.e. it is "hard-wired" as the highest priority rule for the MS module); this may not be true for alternative embodiments.

If multiple MS Rules are defined, they are progressively applied until the field is narrowed to a single candidate. MS Rules may be generic or industry specific. Examples of generic MS Rules include 'meet due date within maximum buffer stock', which selects machines that can complete the work order by the due date while satisfying the buffer constraint, and 'smallest loss time', which selects the machine with the smallest gap between the Earliest Available Time of the machine and the work order's scheduled start time.

Examples of industry specific MS rules include 'no splitting of Part Identifier and Wafer Lot Identifier' which attempts to assign work orders of the same part and wafer lot identifiers to the same machine, without exceeding the production cut-off time, and 'same wafer lot finished within the cycle time of its speed/lot type' which selects machine for the current work order based on the same wafer lot identifier, part identifier, product family and be able complete the processing within the targeted cycle time. These rules are specific to the semiconductor backend assembly environment.

Each MS Rule may have an associated MS Rule Control Trigger. An example of an MS Rule Control Trigger for the 'smallest loss time' MS Rule is a time period (e.g. 2 hours), such that eligible machines having loss times not exceeding the time period will be treated as 'equally competent' for the work order to be scheduled. Other examples of MS Rule Control Triggers are the 'End time tolerance and Processing time limit' Trigger and the 'Production cut off range' Trigger. The former trigger entails two separate thresholds: END_TIME_TOLERANCE and PROCESSING_TIME_LIMIT. END_TIME_TOLERANCE refers to a minimum amount of time by which a lower priority machine must complete an operation before a higher priority machine before the operation will be considered for scheduling at the lower priority machine. PROCESSING_TIME_LIMIT refers to a minimum duration of processing time of an operation before the operation will be considered for scheduling at the lower priority machine. The latter trigger entails a single threshold, namely PROD_CUTOFF_RANGE, which represents a minimum utilization (e.g. minimum number of operating hours in a particular shift/day) of a machine that should be met by all machines in the same category in order to balance the load on machines within the same category.

Figure 24:
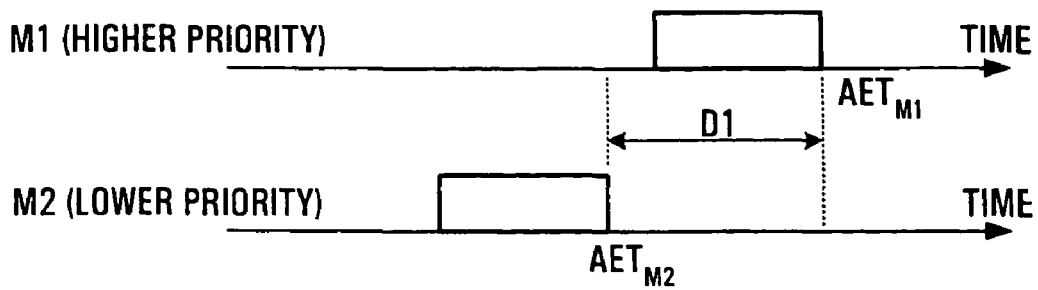
FIG. 24 illustrates the application of an exemplary machine selection (MS) Rule Control Trigger used during machine selection.

The 'End time tolerance and Processing time limit' Trigger and the 'Production cut off range' Trigger may be applied together to select a candidate machine. This is illustrated in FIG. 24. In this example, two machines (M1 and M2) are suitable for completing the current work order operation. M1 has higher priority in terms of the changeover level comparing to M2 (i.e. M1 requires less changeover time compared to M2), but the end time of the work order will be later than M2.

The selection procedure is as follows:

```
If D1 < END_TIME_TOLERANCE, then select M1
    Else If processing time on M2 < PROCESSING_TIME_LIMIT, then select M1
Else If D1 < PROD_CUTOFF_RANGE, then select M1
    Else Select M2
```

The third filter in this rule trigger causes machine M1 to be selected even though D1 has exceeded both the END_TIME_TOLERANCE and PROCESSING_TIME_LIMIT, as long as the D1 is less than the PROD_CUTOFF_RANGE value, which is normally the duration of the production shift.

The END_TIME_TOLERANCE and PROCESSING_TIME_LIMIT thresholds are essentially used to determine whether it is worthwhile to introduce another changeover if the lower priority machine can complete the work order earlier as shown in the example. These combined trigger tolerances indicate that if it is a small work order (PROCESSING_TIME_LIMIT is small) or the difference, of the end time (END_TIME_TOLERANCE) is within the tolerance, then M2 should not be selected as it incurs more changeovers.

Once a candidate machine has been identified within the current suitability category, subsequent suitability categories containing at least one machine are examined (S2112, S2114, S2106-S2110). The result will be a single candidate machine from each suitability category.

A best candidate (i.e. best suited overall) machine is then chosen from all of the candidate machines (S2116). If only one candidate exists, that machine is chosen. This will be the case when one machine has been defined as a "Must" machine for the current operation for example. If more than one candidate exists, the selection of the overall best suited machine among the machine categories is governed by the best-fit machine trigger parameter.

Figure 25:
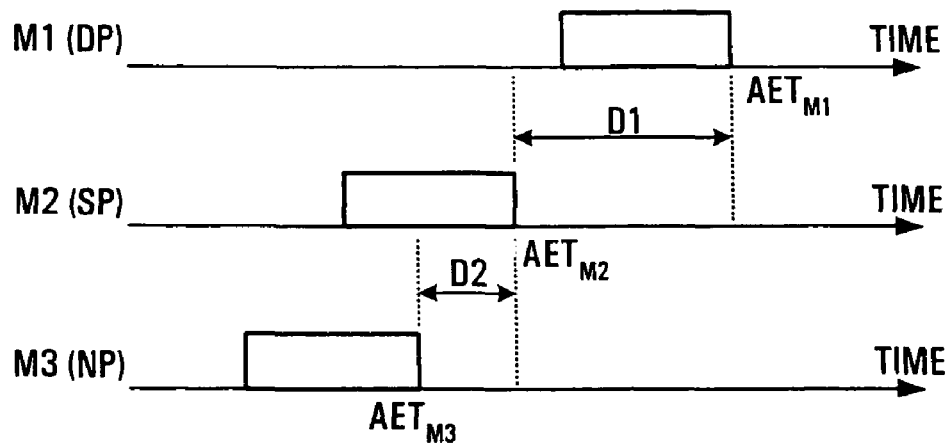
FIG. 25 illustrates the application of another exemplary MS Rule Control Trigger used during machine selection.

The best-fit machine trigger parameter controls the selection of the best candidate machine from different machine categories so as to balance the loading of machines in different suitability categories. An exemplary application of the best-fit machine trigger parameter is illustrated in FIG. 25. In this example, three candidate machines exist: one machine M1 from category DP, one machine M2 from category SP, and one machine M3 from category NP. The difference in end times between M1 and M2 is D1 and between M2 and M3 is D2. To choose a best candidate machine, the following selection procedure is applied:

---

If D1 < BEST_FIT_MACHINE_TRIGGER_PARAMETER, then select M1
    Else if D2 < BEST_FIT_MACHINE_TRIGGER_PARAMETER, then select M2
        Else select M3

---

In essence, the selection procedure chooses a best candidate machine in order of diminishing suitability based on whether the utilization quotas of machines in higher suitability categories have been met. This procedure is applicable to both of the forward scheduling and backward scheduling methodologies.

Once the best candidate machine has been identified, the work order operation in question is scheduled for execution on that machine (S2118). During scheduling, a forward searching and node splitting mechanism is applied by the MS module 104 to search for an available time slot or time slots during which the current operation may be scheduled. If an 'a' node representing a time interval which matches the processing time of the current operation is found, the node will be changed to an 'x' node to schedule the operation. Alternatively, if an 'a' node is found to represent a time period that is longer than the processing time of the current operation, the 'a' node will be broken apart into two nodes representing shorter time periods, wherein the first node will match the processing time of the current operation and will be given a machine status of 'x', and the second node will represent any leftover time and will be given a machine status of 'a'. In another alternative, the operation may be scheduled for execution during multiple time periods spanning across shifts or operator meal breaks, with each of these periods having an associated 'x' node. The latter case is illustrated in FIG. 26.

Figure 26:
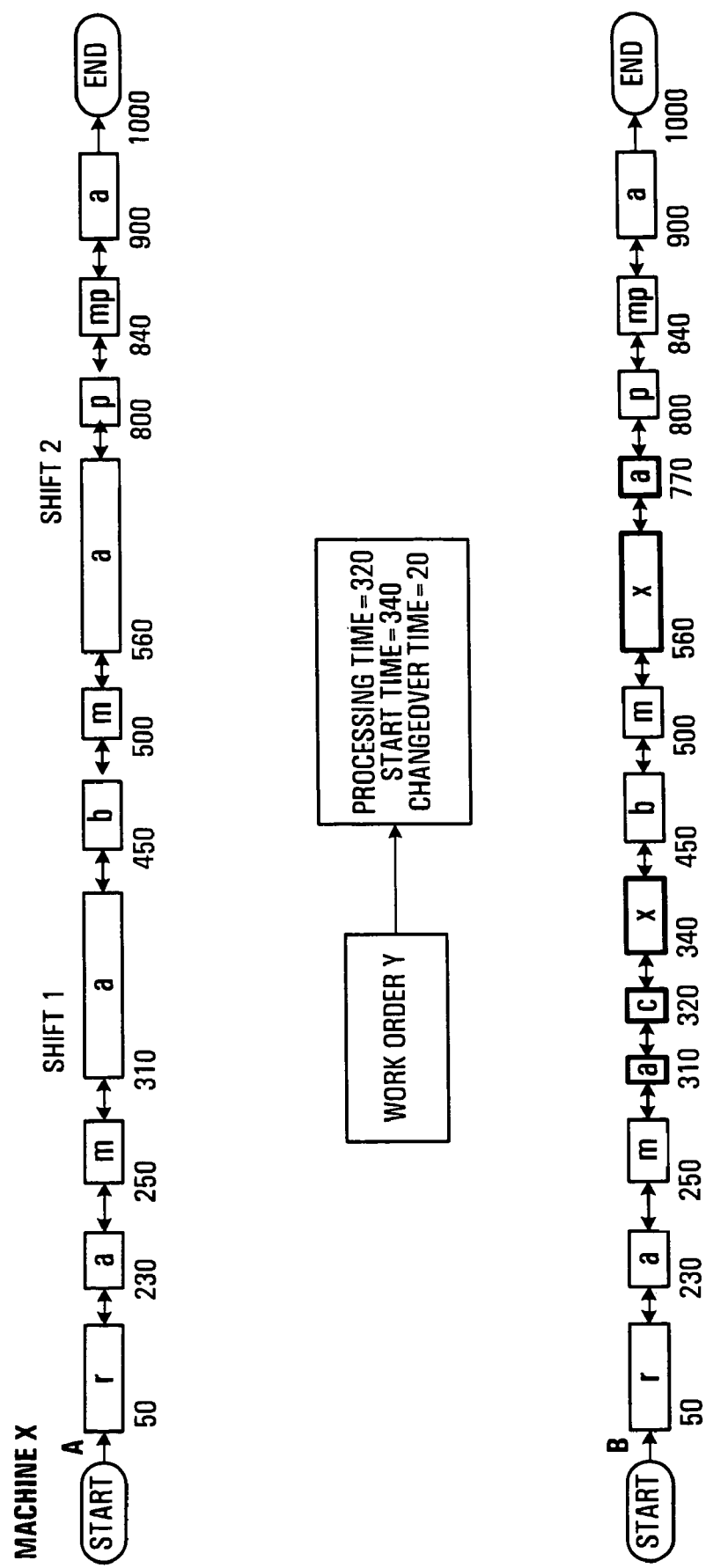
FIG. 26 illustrates the scheduling of a work order operation during multiple, non-contiguous time periods.

As shown in FIG. 26, work order y, with processing time of 320, start time of 340 and changeover time of 20, is to have one of its operations scheduled for execution at machine x. The forward searching and node splitting mechanism starts from the last assigned work order, which is currently running, and searches for an 'a' node having an end time greater (i.e. later) than the Actual Start Time of work order y (340). Nodes of type 'b' (block out) and 'm' (meal time) are ignored by the search procedure. In the result, an 'a' node is found which starts from time 310; this node is selected since it ends at time 450, which is greater than the work order start time of 340. A changeover block is allocated immediately before the start time of the work order. The 'a' node is then split into three nodes: the first node (time 310 to time 320) retains the machine status of 'a'; the second node (time 320 to time 340) is given a machine status of 'c'; and the third node (time 340 to time 450) is given a machine status 'x' with a duration of 110. Typical information that is written to an 'x' node includes work order number, part number, cumulative time since order released, and fixture used. The search procedure continues to search for an 'a' node for the remaining processing time 210 (i.e. total processing time 320 minus already scheduled time 110) of the work order y. An 'a' node starting at time 560 is located and split to accommodate the remaining processing time of work order y.

In the event that no best candidate machine could be identified in S2116, this result is reported back to the JP Module. To promote an improved scheduling success rate, the MS Module can optionally be configured to ignore the resource constraints and to assign the work order to an available machine even in violation of the EST or LST constraint. This may reduce the unscheduled orders.

As will be appreciated by those skilled in the art, modifications to the above-described embodiment can be made without departing from the essence of the invention. For example, various JP and MS rules applicable to a generic scheduling environment or a industry-specific environment, such as a semiconductor backend assembly environment, may be used within the scheduling system 100. The "hard-wiring" of one or more JP Rules or MS Rules is optional, although at least one of each of these types of rules should be specified. The rules may be changed or combined between scheduling runs to set different scheduling objectives and to observe their effect.

Figure 27:
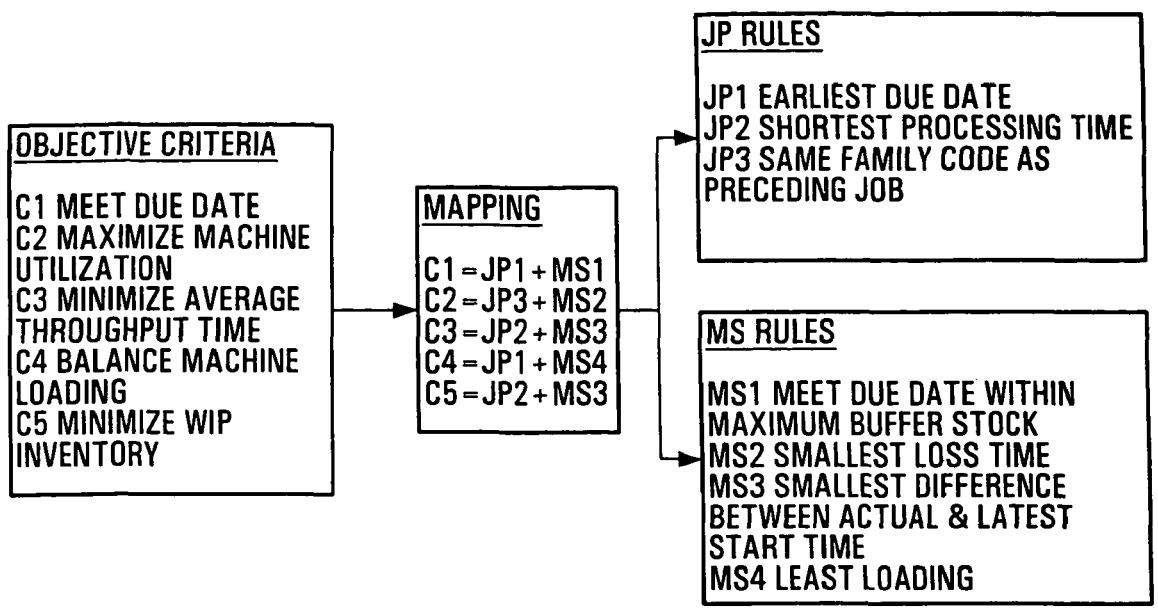
FIG. 27 illustrates the optional mapping of objective criteria to JP Rules and MS Rules.

It will also be recognized that specification of JP Rules and MS Rules may be difficult for users who do not understand the technical details embedded in the JP and MS rule descriptions. For this reason, it may be desirable to avoid the need for a user to specify JP and MS rules per se. Rather, specification of the JP and MS rules may be by way of objective or heuristic scheduling criteria representative of production goals which are more familiar to end users. Each objective criterion may be mapped to a JP Rule and an MS Rule, as shown in FIG. 27, for use by the scheduling system 100. In this manner, a broader target group of users may utilize the scheduling system 100.

Other modifications will be apparent to those skilled in the art and, therefore, the invention is defined in the claims.

APPENDIX I-JP AND MS RUL S

TABLE 1

| JP Rules Listing | | | |
|---|---|---|---|
| Rule ID | DESCRIPTION | Type | Remarks |
| 101 | Earliest Due Date | 1 | |
| 201 | Shortest processing time | 2 | |
| 202 | Same family code as preceding job | 2 | |
| 203 | Largest total operation time remaining | 2 | |
| 204 | Smallest slack time available | 2 | |
| 205 | Sort by due date | 2 | |
| 206 | Same part ID as preceding job | 2 | |

TABLE 1-continued

JP Rules Listing

| Rule ID | DESCRIPTION | Type | Remarks |
|---|---|---|---|
| 401 | Sort by lot priority | 4 | |
| 402 | Sort by cust_rel_date | 4 | Sort by release time |
| 403 | Sort by device | 4 | |
| 404 | Sort by padsize | 4 | |
| 405 | Sort by cust_priority | 4 | |
| 406 | Sort by prod_priority | 4 | |
| 407 | Sort by package | 4 | |
| 408 | Sort by leadcount | 4 | |
| 409 | Smallest balance Qty of wafer lot from upstream operations | 4 | |
| 410 | Smallest balance Qty of wafer lot on current operation | 4 | |
| 411 | Smallest number of sublot of wafer lot from upstream operations | 4 | |
| 412 | Wafer lot ID | 4 | |
| 413 | Wafer lot integrity | 4 | |
| 414 | Same family code as preceding job for SEMICON | 4 | For more information, see See |
| 415 | Speed Type | 4 | |
| 416 | Lot Type | 4 | |
| 417 | FIFO Based on local start time | 4 | |
| 418 | FIFO Based on release time | 4 | |
| 419 | Mother lot qty from upstream greater than *** | 4 | |
| 420 | Lot qty of current operation greater than *** | 4 | Lot size > * (in terms of qty) |
| 421 | Lot cumulative time greater than *** | 4 | Cumulative time > * (centre setting cumulative time). For more information, see JP Rule 421 |
| 422 | Lot processing time greater than *** | 4 | Lot size > * (in terms of processing time, centre setting - lot size). For more information, see JP Rule 422 |
| 423 | Standard Inventory of PkgLC greater than *** | 4 | Wip inventory > * (in terms of PkgLC qty). |
| 424 | Lot staging time greater than *** | 4 | For more information, see JP Rule 424 |
| 425 | Lot size equals mother lot size | 4 | |
| 426 | Sort by compound type | 4 | |
| 501 | Order By Earliest Start Time, PartID and WO | 5 | For more information, see JP Rule 501 |
| 502 | Order By Earliest Start Time, PartID WaferLotID and WO | 5 | For more information, see JP Rule 502 |
| 503 | Waferlot Integrity Within Max.Queue Time | 5 | For more information, see JP Rule 503 |
| 504 | Order by due date, waferlot balance qty from upstream, SPT | 5 | |
| 506 | Wafer lot integrity with max queue time based on cum time | 5 | For more information, see JP Rule 506 |
| 507 | wafter lot integrity, sort by average due date, EST | 5 | For EOL |

* Refer to Table 3 for the format of fields of type and job_rule_id

TABLE 2

MS Rules Listing

| Rule ID | DESCRIPTION | Type | Remarks |
|---|---|---|---|
| 101 | Meet Due Date Within Max. Buffer Stock | 1 | |
| 201 | Smallest loss time | 2 | |
| 202 | Smallest diff. between actual & latest start time | 2 | |
| 203 | Least loading | 2 | |
| 204 | Fixed time period constraints | 2 | consider fixed wo run time |
| 501 | Meet production cut-off | 5 | For more information, see MS Rule 501 |
| 502 | No splitting of part ID | 5 | For more information, see MS Rule 502. Must be used together with JP Rule 414. |
| 503 | same wafer lot finished within the cycle time of its speed/lot type | 5 | Try to assign the lots of same wafer lot to the same machine if they are within the cycle time. For more information, see MS Rule 503. Must be used together with JP Rule 414 (for d/a) |
| 504 | Lot finished within the cycle time of its speed/lot type | 5 | Same wafer lot is not necessary to assign to the same machine. For more information, see MS Rule 504. Must be used together with JP Rule 506. (for w/b) |

* Refer to Table 3 for the format of fields of type and job_rule_id

TABLE 3

JP and MS Rule Types

| Rules | Rule type | Type in table job_rule | Job_rule_id in table job_rule |
|---|---|---|---|
| Meet Due Date | Hard coded rule | 1 | 101 |
| Generic Rules | Single | 2 | >200 and <300 |
| | Compound | 3 | >300 and <400 |
| Semiconductor | Single | 4 | >400 and <500 |
| | Compound | 5 | >500 and <600 |

* The same format applies to Machine Selection rules (I) Detailed Descriptions of JP Rules
JP Rule 421: Lot Cumulative Time Greater than ***
For WIP:

Lot cumulative time=earliest start time−track in date

For new release lot:

Lot cumulative time=earliest start time−release date

Lot standard cumulative time: defined by the user at centre level using GUI centre setting→cumulative time.
All the lots are grouped into two sets. Lots with larger cumulative times than the standard cumulative time have higher priority.
JP Rule 422: Lot Processing Time Greater than ***
Lot processing time: estimated
Lot standard processing time: defined by the user at centre level using GUI centre setting→lot size.
All the lots are grouped into two sets. Lots with larger processing times than the standard processing time have higher priority.
JP Rule 424: Lot Staging Time Greater than ***
Lot staging time: earliest start time−track out date
Lot standard staging time: defined by the user at centre level using GUI centre setting→staging time.
All the lots are grouped into two sets. Lots with larger staging times than the standard staging time have higher priority.
The rule only applies to the current centre where the WIP is before scheduling. The following operations of the WIP are ignored.
JP Rule 414: Same Family Code as Preceding Job Work orders are sorted based on the following criteria before machine selection:
1. Cumulative time ratio, i.e. (cumulative time+processing time)/cycle time goal, divided into two group, greater than or equal to 1 (out of cycle time goal already) and less than 1
2. If out of cycle time goal, sort by lot priority,
3. Sort by family group based on the average ratio (Desc) Within same family group
4. Work order's priority, highest priority first.
5. Wafer lot average cumulative time ratio (Desc)
6. Work order's earliest start date, earliest first.
7. Part ID, in alphabetical order.
8. Wafer Lot ID, alphabetical order.
9. Work order's name, alphabetical order.
10. Mother lot id, based on the wafer lot order of a mother lot, the last sublot of the mother lot will be the last one in the list of the mother lot JP Rule 501:—Order by Earliest Start Time, PartID and Work Order Work orders are sorted based on the following criteria before machine selection:
1. Earliest start time based on a range of cut off time defined in the centre setting. The start time that is within the cut off time range is considered as the same priority.
2. Part ID's name in ascending order.
3. Work order's name in ascending order.

JP Rule 502:—Same Family Code as Preceding Job and Eearliest Start Time by a Cut Off Time Range Work orders are sorted based on the following criteria before machine selection:
1. Earliest start time based on a range of cut off time defined in the centre setting. The start time that is within the cut off time range is considered as the same priority.
2. Part ID's name in ascending order.
3. Wafer lot ID in ascending order.
4. Work order's name in ascending order.

JP Rule 503:—Wafer Integrity with Maximum Queue Time per Wafer Lot

Work orders are sorted based on the following criteria before machine selection:
1. Make the work orders' wafer lot ID into sub-group of maximum queue time based on the work orders' earliest start time.
2. Biggest earliest start time of sub-group of wafer lot ID with maximum queue time in ascending order.

JP Rule 506:—Wafer Integrity with Maximum Queue Time Based on Cum Time

For WIP, Work orders are sorted based on the following criteria before machine selection:
First Version:
1. Make the work orders' wafer lot ID into sub-group of maximum queue time based on the work orders' cumulative time.
2. Biggest cumulative time of sub-group of wafer lot ID with maximum queue time in ascending order.

Current Version:
1. Cumulative time ratio, i.e. (cumulative time+processing time)/cycle time goal, divided into two group, greater than or equal to 1 (out of cycle time goal already) and less than 1
2. If out of cycle time goal, sort by lot priority
3. Sort by wafer lot based on wafer lot average cumulative time ratio (DESC) Within same wafer lot
4. Work order's priority, highest priority first.
5. Work order's earliest start date, earliest first.
6. Part ID, in alphabetical order.
7. Work order's name, alphabetical order.

For new release lot or wip from upstream, Work orders are sorted based on JP Rule 503.

(I) Detailed Descriptions of MS Rules

MS Rule 501:—Meeting Center Cut-Off Range
1. Search through the group of machines within a family for the machines that have the same split work orders as the work order under consideration.
2. If there is machine that satisfies condition in step 1, go to step 3. Otherwise jump to step 6.
3. Search for machine with the same part ID and has the closest end time as the previously assigned split work order. If found, keep the information.
4. Search for machine that has the closest end time (Not considering part ID) as the previously assigned split work order. Keep the found information.
5. Compare result from steps 4 and 5, and choose a better machine based on a constant value (currently set to 30 minutes). Machine with the same part ID will be chosen if the different between end time of previously assigned split work order and current work order is less than 30 minutes compared to machine with different part ID but closer to the end time of previously assigned split work order. This comparison will make sure that the split work orders will complete at almost the same time.
6. Machines are selected based on the following criteria in the order of preference:
   a. Same part ID of the previously assigned work order as the work order under consideration, and the current work order can complete within one cut off time range.
   b. Different part ID of the previously assigned work order as the work order under consideration, and the current work order can complete within one cut off time range.
   c. Same part ID of the previously assigned work order as the work order under consideration, and the current work order will complete processing in more than one cut off time range.
   d. Different part ID of the previously assigned work order as the work order under consideration, and the current work order will complete processing in more than one cut off time range.
   e. From the above category of criteria, the category that can start at the lowest section will be considered.
   f. If there is more than one machine selected in any of the category above, the machine that can start to process the current work order at the earliest time will be chosen.

Figure 1:
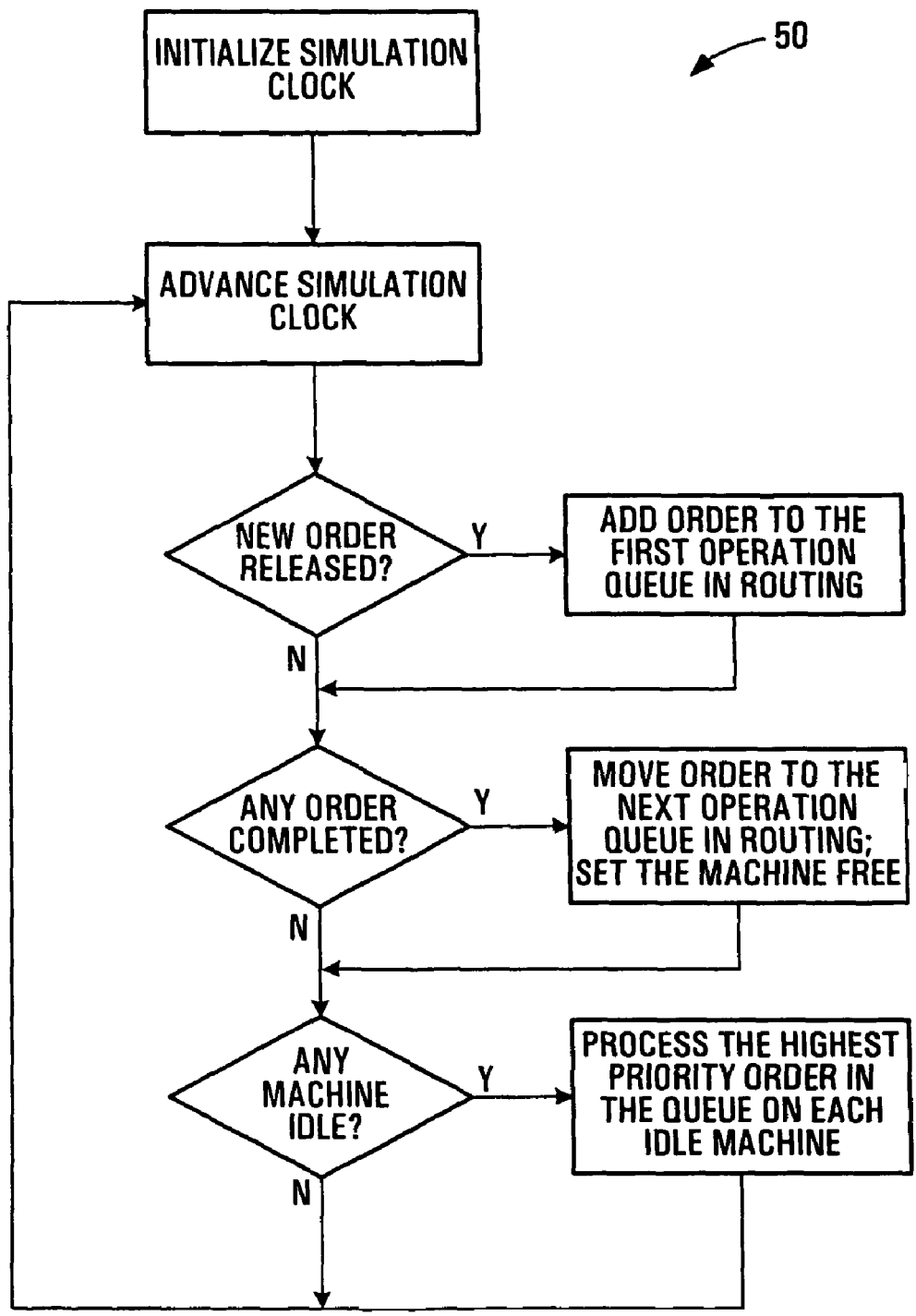
FIG. 1 is a flowchart illustrating event-based scheduling according to known methods.

FIG. 1: The definition of section and cut off time range

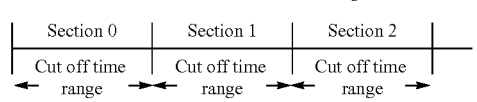

7. For the selection of between preferred and non-preferred machine family, the following rules apply:
   a. If the logic goes through steps 3 to 5, the selection will favor the machine with the same part ID and closest end time as previously assigned split work order.
   b. If the logic goes through steps 6, the selection of machines between preferred and non-preferred family groups is based on preference in steps 6a to 6d. Due date range come into play only if the preferred and non-preferred family groups satisfy the same criteria.

MS Rule 502:—No Splitting of Part ID and Wafer Lot ID

DEFINITION

Section—The scheduling time horizon is divided into many sections in which each section's duration is equal to the cut off time range defined in the centre settings.

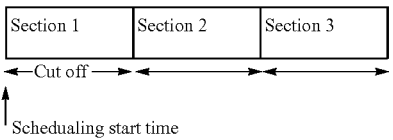

Selection Within the Same Group of Machines (Within Preferred, Non-Preferred, etc):
Note: Due date range setting will have no effect on the machine selection.
The selection of machines are in the following preferred order based on the work order, with part ID 'PartID' and wafer lot ID 'WaferID', which is to be assigned to the machine:
1. Machine with last processed work order, which has the same part ID and wafer lot ID to the work order to be assigned. The work order must be able to start and finish within a single section. If there are more than one machine satisfies this criteria, then use the machine that can start at the earliest time.
2. Machine with last processed work order, which has the same part ID and wafer lot ID to the work order to be assigned. However, the work order is not able to start and finish within a single section and the total wafer lot quantity is able to complete processing within a single cut off time range. If there are more than one machine satisfies this criteria, then use the machine that can start at the earliest time.
3. Machine with last processed work order, which has the same part ID to the work order to be assigned, and that can complete processing within a single section. If there are more than one machine satisfies this criteria, then use the machine that can start at the earliest time.
4. Machine with last processed work order, which has the different part ID to the work order to be assigned, and that can complete processing within a single section. If there are more than one machine satisfies this criteria, then use the machine that can start at the earliest time.
5. Machine with last processed work order, which has the same part ID to the work order to be assigned, and that cannot complete processing within a single section. If there are more than one machine satisfies this criteria, then use the machine that can start at the earliest time.
6. Machine with last processed work order, which has the different part ID to the work order to be assigned, and that can not complete processing within a single section. If there are more than one machine satisfies this criteria, then use the machine that can start at the earliest time.

Note that after the selection procedure above, only one machine or none will be chosen from within each group of machines.
Selection Between Different Groups of Machines (Between Preferred and Non-Preferred):
For the selection rule of preferred and non-preferred machines to have effect, there should be one machine chosen from each group of machines. In other words, this rule is required to choose between two machines, one from preferred group and one from non-preferred group.

The selection of machines are in the following preferred order based on the work order with part ID 'PartID' and wafer lot ID 'WaferID' that is to be assigned to the machine:
1. Preferred group machine with last processed work order which has the same part ID and wafer lot ID to the work order to be assigned.
2. Non-preferred group machine with last processed work order which has the same part ID and wafer lot ID to the work order to be assigned.
3. Use non-preferred group machine if its section that starts processing the work order is less than the section for the preferred group machine.
4. Use preferred group machine if its section starts processing the work order is less than the section for the non-preferred group machine.
5. If both the preferred and non-preferred group machines start processing the work order in the same section, then choose the machine that can complete processing the total wafer lot quantity within the same section.
6. Use preferred group machine if the difference between the start time of preferred and non-preferred machine is less than the due date range setting. Otherwise, use the non-preferred group machine.

MS Rule 503:—Same Wafer Lot Finished within the Cycle Time of its Speed/Lot Type
Selection Within the Same Group of Machines:
The selection of machines is in the following preferred order based on the wafer lot id, part id, family code, and cycle time, which is to be assigned to the machine:
1. same wafer lot id within cycle time
2. same part id within cycle time
3. same family code within cycle time
4. within cycle time
5. same wafer lot id
6. same part id
7. same family code
8. the available machine which has the earliest end time.
In case of max machine number for one wafer lot is defined, other machines will be disabled if assigned machine number hits the setting.
If (end time of the selected machine—the earliest end time of the available machine>cut off time range) and within cycle time then select the machine which has the earliest end time, except for the first priority (same wafer lot id within cycle time).
Otherwise (out of cycle time), choose the machine, which can complete the work order first.
If it is the last lot of a mother lot, simply assign it to the machine with the latest assigned sublot (in terms of the processing end time) of the mother lot.
Considering the last assigned product in the machine, machines are categorised into 6 groups:
0 nothing
1 has a wo with the same changeover group
2 has more than 1 wo with the same changeover group
3 has only one wo with the same part id
4 has one wo with the same part id and has wo(s) with the same changeover gruop
5 has more than 1 wo with the same part id
6 has wo(s) with the same changeover group and has more than one wo with the same part id
the current wo tries to assign to a machine with lower priority if the wo is different from all the last assigned product in the machines, which reduces the occurrence of occupying a machine which has the same part id or changeover group as one of the following wo in the job list.

Note that after the selection procedure above, only one machine or none will be chosen from within each group of machines.

Selection Between Different Groups of Machines:
For the selection rule of machines in different groups to have effect, there should be one machine chosen from each group of machines. In other words, this rule is required to choose between two machines, for example, one from preferred group and one from non-preferred group.
Here, the priorities of the machine groups are defined: Must, DP, SP, NP, Must Not.
1. select the machine which has the higher group priority, can finish the work order within cycle time;
2. select the machine which can finish the work order within cycle time;
3. select the machine which has the higher group priority and end time of the work order on the machine with higher group priority—end time of the work order on the machine with lower group priority<due date range;
4. select the lower group priority machine.

MS Rule 504: Lot Finished within the Cycle Time of its Speed/Lot type
Selection Within the Same Group of Machines:
The selection of machines is in the following preferred order based on the wafer lot id, part id, family code, and cycle time, which is to be assigned to the machine:
1. same part id within cycle time
2. same family code within cycle time
3. within cycle time
4. same part id
5. same family code
6. the available machine which has the earliest end time.

If (end time of the selected machine—the earliest end time of the available machine>cut off time range) and within cycle time, then select the machine which has the earliest end time. Otherwise (out of cycle time), choose the machine which can complete the wo earliest.

Considering the last assigned product in the machine, machines are categorised into 6 groups:
0 nothing
1 has a wo with the same changeover group
2 has more than 1 wo with the same changeover group
3 has only one wo with the same part id
4 has one wo with the same part id and has wo(s) with the same changeover gruop
5 has more than 1 wo with the same part id
6 has wo(s) with the same changeover group and has more than one wo with the same part id
the current wo tries to assign to a machine with lower priority if the wo is different from all the last assigned product in the machines, which reduces the occurrence of occupying a machine which has the same part id or changeover group as one of the following wo in the job list.

Note that after the selection procedure above, only one machine or none will be chosen from within each group of machines.

Selection Between Different Groups of Machines:
For the selection rule of machines in different groups to have effect, there should be one machine chosen from each group of machines. In other words, this rule is required to choose between two machines, one from preferred group and one from non-preferred group.
Here, the priorities of the machine groups are defined: Must, DP, SP, NP, Must Not.
1. select the machine which has the higher group priority, can finish the work order within cycle time;
2. select the machine which can finish the work order within cycle time;
3. select the machine which has the higher group priority and end time of the work order on the machine with higher group priority—end time of the work order on the machine with lower group priority<due date range;
4. select the lower group priority machine.

What is claimed is:

1. A computing device comprising:
a processor; and
persistent storage memory in communication with said processor storing processor readable instructions for directing said device to schedule a plurality of work orders, each work order of said plurality being defined by a plurality of operations to be scheduled at a plurality of work centers, each work center having a group of machines, each work center for performing an operation, the scheduling comprising, upon receiving a shop model indication comprising a job shop model and receiving an indication of a scheduling methodology comprising one of a forward scheduling methodology and a backward scheduling methodology:
(a) classifying each of said work orders as a candidate for scheduling at one of said work centers, said classifying resulting in one or more candidate work orders;
(b) assigning a priority to each of said candidate work orders based on a set of job prioritization rules;
(c) selecting a highest priority candidate work order having a priority that is at least as high as any priority assigned to any other candidate work order; and
(d) attempting to schedule an operation of said highest priority candidate work order at a machine of a work center at which said highest priority work order is a candidate based on a set of machine selection rules, said attempting occurring after a successful previous scheduling of another operation of said highest priority candidate work order followed by a successful scheduling of an operation of different one of said work orders; and
(e) upon a failure of said attempting to schedule said operation, canceling the previously scheduled operation of said highest priority candidate work order and refraining from further attempting to schedule any other operation of said highest priority candidate work order.

2. The computing device of claim 1 wherein said indication of a methodology is an indication of a forward scheduling methodology and wherein said classifying classifies each of said work orders as a candidate for scheduling at the work center associated with its first operation.

3. The computing device of claim 2 further comprising, if said attempting succeeds in scheduling said operation for execution at said machine: if said highest priority candidate work order has a successor operation: reclassifying said highest priority candidate work order as a candidate for scheduling at the work center associated with said successor operation, said reclassifying resulting in a reclassified candidate work order; and assigning a priority to said reclassified candidate work order based on said set of job prioritization rules.

4. The computing device of claim 1 wherein said indication of a methodology is an indication of a backward scheduling methodology and wherein said classifying classifies each of said work orders as a candidate for scheduling at the work center associated with its last operation.

5. The computing device of claim 4 further comprising, if said attempting succeeds in scheduling said operation at said machine, if said highest priority candidate work order has a predecessor operation: reclassifying said highest priority candidate work order as a candidate for scheduling at the work center associated with said predecessor operation, said reclassifying resulting in a reclassified candidate work order; and assigning a priority to said reclassified candidate work order based on said set of job prioritization rules.

6. The computing device of claim 1 wherein said job prioritization rules are based on at least one of earliest due date, shortest processing time, and same family code as preceding work order.

7. The computing device of claim 1 wherein said job prioritization rules comprise a plurality of rules and wherein said assigning a priority comprises progressively applying said plurality of rules until a unique priority is assigned to each candidate work order.

8. The computing device of claim 1 wherein said attempting to schedule an operation of said highest priority candidate work order comprises: categorizing the machines of the work center for performing said operation into suitability categories based on a determined suitability of each machine for completing said operation of said highest priority candidate work order; for each suitability category, identifying a candidate machine of the machines in said suitability category based on said set of machine selection rules, said identifying resulting in one or more candidate machines; identifying a best candidate machine from said one or more candidate machines based on said set of machine selection rules; and scheduling said operation of the work order at said best candidate machine.

9. The computing device of claim 8 wherein said suitability category is chosen from the set consisting of Must, Dedicated Preferred, Shared Preferred, No Preference, and Must Not.

10. The computing device of claim 9 wherein, if said categorizing has categorized any machine into the Must suitability category, said identifying identifies said machine as said best candidate machine.

11. The computing device of claim 9 wherein, if said categorizing has categorized any machine into the Must Not suitability category, said identifying will not identify said machine as said best candidate machine.

12. The computing device of claim 8 wherein said machine selection rules are based on at least one of meeting a work order due date with maximum stock remaining, smallest loss time, smallest difference between actual and latest start time, and most balanced loading across machines.

13. The computing device of claim 1 wherein said set of job prioritization rules is work centre specific.

14. A computer readable medium containing computer-executable instructions which, when performed by a processor in a computing device, cause said computing device to schedule a plurality of work orders, each work order of said plurality defined by a plurality of operations to be scheduled at a plurality of work centers, each work center having a group of machines, each work center for performing an operation, the scheduling comprising, upon receiving a shop model indication comprising a job shop model and receiving an indication of a scheduling methodology comprising one of a forward scheduling methodology and a backward scheduling methodology:
  (a) classifying each of said work orders as a candidate for scheduling at one of said work centers, said classifying resulting in one or more candidate work orders;
  (b) assigning a priority to each of said candidate work orders based on a set of job prioritization rules;
  (c) selecting a highest priority candidate work order having a priority that is at least as high as any priority assigned to any other candidate work order;
  (d) attempting to schedule an operation of said highest priority candidate work order at a machine of a work center at which said highest priority work order is a candidate based on a set of machine selection rules, said attempting occurring after a successful previous scheduling of another operation of said highest priority candidate work order followed by a successful scheduling of an operation of different one of said work orders; and
  (e) upon a failure of said attempting to schedule said operation, canceling any previously scheduled operation of said highest priority candidate work order and refraining from further attempting to schedule any other operation of said highest priority candidate work order.

* * * * *